US012323237B2

(12) United States Patent
Khoshnevisan et al.

(10) Patent No.: US 12,323,237 B2
(45) Date of Patent: Jun. 3, 2025

(54) DYNAMIC SWITCHING BETWEEN DIFFERENT MULTI-TRANSMISSION/RECEPTION POINT SCHEMES

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 18/067,539

(22) Filed: Dec. 16, 2022

(65) Prior Publication Data

US 2023/0129556 A1 Apr. 27, 2023

Related U.S. Application Data

(62) Division of application No. 16/789,321, filed on Feb. 12, 2020, now Pat. No. 11,563,514.
(Continued)

(51) Int. Cl.
*H04L 1/00* (2006.01)
*H04L 1/1812* (2023.01)
(Continued)

(52) U.S. Cl.
CPC .......... *H04L 1/0013* (2013.01); *H04L 1/1819* (2013.01); *H04W 8/24* (2013.01);
(Continued)

(58) Field of Classification Search
CPC .... H04L 1/0013; H04W 76/15; H04W 72/23; H04W 8/24; H04W 72/1273
See application file for complete search history.

(56) References Cited

U.S. PATENT DOCUMENTS

2010/0091919 A1 4/2010 Xu et al.
2014/0328204 A1 11/2014 Klotsche et al.
(Continued)

FOREIGN PATENT DOCUMENTS

CN 104618000 A 5/2015
GB 2565340 A 2/2019
(Continued)

OTHER PUBLICATIONS

CHTTL: "Discussion on Multi-TRP Transmission", 3GPP Draft, 3GPP TSG RAN WG1 Meeting #95, R1-1813278,3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 11, 2018 (Nov. 11, 2018), XP051555294, 5 Pages, Sect.s 2.2. 2.3.
(Continued)

*Primary Examiner* — Won Tae C Kim
(74) *Attorney, Agent, or Firm* — Holland & Hart LLP

(57) ABSTRACT

Methods, systems, and devices for wireless communications are described. In some systems, a network may schedule a user equipment (UE) for multiple transmission/reception point (TRP) communication. The network may transmit a single downlink control information (DCI) message to the UE to dynamically configure multiple transmission configuration indicator (TCI) states for the multiple TRPs. In a first example, the DCI message may include a bit field indicating a set of antenna ports and the multi-TRP scheme for transmission. In a second example, the DCI message may include a separate field indicating the multi-TRP scheme (e.g., based on UE capabilities). In a third example, the DCI may
(Continued)

indicate redundancy versions (RVs) for different TRPs in an RV field or across multiple fields. In a fourth example, the DCI may include an indication of a precoding resource block group (PRG) size that may be interpreted differently based on the indicated multi-TRP scheme.

38 Claims, 22 Drawing Sheets

Related U.S. Application Data

(60) Provisional application No. 62/805,661, filed on Feb. 14, 2019.

(51) Int. Cl.
  *H04W 8/24* (2009.01)
  *H04W 72/0446* (2023.01)
  *H04W 72/1273* (2023.01)
  *H04W 72/23* (2023.01)
  *H04W 76/15* (2018.01)

(52) U.S. Cl.
  CPC ... *H04W 72/0446* (2013.01); *H04W 72/1273* (2013.01); *H04W 72/23* (2023.01); *H04W 76/15* (2018.02)

(56) References Cited

U.S. PATENT DOCUMENTS

| | | |
|---|---|---|
| 2018/0013526 A1 | 1/2018 | Bayesteh et al. |
| 2018/0279274 A1 | 9/2018 | Sun et al. |
| 2018/0302889 A1 | 10/2018 | Guo et al. |
| 2018/0343653 A1 | 11/2018 | Guo |
| 2019/0372734 A1 | 12/2019 | Choi et al. |
| 2020/0015200 A1 | 1/2020 | Vilaipornsawai et al. |
| 2020/0145998 A1 | 5/2020 | Sun et al. |
| 2020/0228250 A1 | 7/2020 | Cheng et al. |
| 2020/0266919 A1 | 8/2020 | Khoshnevisan et al. |
| 2020/0267748 A1 | 8/2020 | Khoshnevisan et al. |
| 2020/0366398 A1 | 11/2020 | Takeda et al. |
| 2021/0266944 A1 | 8/2021 | Noh et al. |
| 2022/0150011 A1* | 5/2022 | Kim ..................... H04L 5/0048 |

FOREIGN PATENT DOCUMENTS

| | | |
|---|---|---|
| WO | WO-2018031397 A1 | 2/2018 |
| WO | WO-2018085374 A1 | 5/2018 |
| WO | WO-2020007293 A1 | 1/2020 |

OTHER PUBLICATIONS

Ericsson: "On Multi-TRP and Multi-Panel", 3GPP Draft, 3GPP TSG RAN WG1 Meeting Ad-Hoc Meeting 1901, R1-1900728 on Multi-TRP and Multi-Panel, 3rd Generation Partnership Project (3GPP), Mobile Competence Centre, 650, Route Des Lucioles, F-06921, Sophia-Antipolis Cedex, France, vol. RAN WG1, No. Taipei, Taiwan, Jan. 21, 2019-Jan. 25, 2019, Jan. 11, 2019 (Jan. 11, 2019), XP051576267, 9 pages, p. 2-p. 7, figure 1.
Huawei., et al., "Summary of AI: 7.2.8.2 Enhancements on Multi-TRP/Panel Transmission of Offline Discussion", 3GPP Draft, 3GPP TSG RAN WG1 Meeting #95, R1-1814003, Multi- TRP_FL_RAN1 95_V7, 3RD Generation Partnership Project (3GPP), Mobile Competence Centre, 650, Route Des Lucioles, F-06921, Sophia-Antipolis Cedex, France, vol. RAN WG1, No. Spokane, USA; Nov. 12, 2018-Nov. 16, 2018, Nov. 19, 2018 (Nov. 19, 2018), XP051494445, 32 pages, Section 4.
Huawei., et al., "Summary of AI: 7.2.8.2 Enhancements on Multi-TRP/Panel Transmission of Offline Discussion", 3GPP Draft, 3GPP TSG RANWG1 Ad-Hoc Meeting 1901, R1-1901371 Feature Lead Summary for Enhancements on Multi-TRP V3, 3rd Generation Partnership Project (3GPP), Mobile Competence Centre, 650, Route Des Lucioles, F-06921 Sophia-Antipolis CE, vol. RAN WG1, No. Taipei, Jan. 21, 2019-Jan. 25, 2019, Jan. 23, 2019 (Jan. 23, 2019), XP051594129, 39 Pages, Sections 2.2-2.3, p. 18-p. 24.
International Preliminary Report on Patentability—PCT/US2020/018170 The International Bureau of WIPO—Geneva, Switzerland, Aug. 26, 2021.
International Preliminary Report on Patentability—PCT/US2020/018173 The International Bureau of WIPO—Geneva, Switzerland, Aug. 26, 2021.
International Search Report and Written Opinion—PCT/US2020/018170—ISAEPO—Jul. 22, 2020.
International Search Report and Written Opinion—PCT/US2020/018173—ISA/EPO—Jun. 5, 2020.
Qualcomm Incorporated: "Multi-TRP Enhancements", 3GPP Draft, 3GPP TSG-RAN WG1 Meeting #99, R1-1912967, 3rd Generation Partnership Project (3GPP), Mobile Competence Centre, 650, Route Des Lucioles, F-06921 Sophia-Antipolis Cedex, France, vol. RAN WG1, No. Reno, Nevada, USA, Nov. 18, 2019-Nov. 22, 2019, Nov. 9, 2019 (Nov. 9, 2019), XP051823729, 21 pages, p. 1-p. 7, tables 1-5, p. 1, line 25-line 33.
Qualcomm Incorporated: "Multi-TRP Enhancements," 3GPP Draft, 3GPP TSG-RAN WG1 Meeting AH-1901, R1-1900905, Multi-TRP Enhancements, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593751, 26 pages, Sections 2.1, 4.1.2; Fig. 9.
Taiwan Search Report—TW109104679—TIPO—Sep. 1, 2023.
Ericsson: "On Multi-TRP and Multi-Panel", 3GPP TSG RAN WG1 Meeting Ad-Hoc Meeting 1901, R1-1900728, Taipei, Taiwan, Jan. 21, 2019-Jan. 25, 2019, pp. 1-10, section 2.
Taiwan Search Report—TW109104671—TIPO—Nov. 28, 2023.
NTT DOCOMO, Inc: "Enhancements on Multi-TRP/Panel Transmission", 3GPP TSG RAN WG1 Meeting #95, R1-1813333, Spokane, USA, Nov. 12-16, 2018, Nov. 3, 2018, pp. 1-20.
Qualcomm Incorporated: "Multi-TRP Enhancements", 3GPP TSG-RAN WG1 Meeting AH-1901, R1-1900905, Taipei, Taiwan, Jan. 21, 2019-Jan. 25, 2019, pp. 1-26, Jan. 12, 2019.
Huawei, et al., "Enhancements on multi-TRP/panel transmission", 3GPP TSG RAN WG1 Ad-Hoc Meeting 1901, R1-1900017, Taipei, Jan. 21-25, 2019, Jan. 12, 2019, 15 Pages.
Huawei, et al., "Summary of AI: 7.2.8.2 Enhancements on Multi-TRP/Panel Transmission of Offline Discussion", R1-1901371, 3GPP TSG RAN WG1 Ad-Hoc Meeting 1901 Taipei, Jan. 21-25, Jan. 23, 2019, 39 Pages.
NTT DOCOMO Inc: "Enhancements on multi-TRP/panel Transmission", R1-1900978, 3GPP TSG RAN WG1 Ad-Hoc Meeting 1901 Taipei, Jan. 21-25, Jan. 12, 2019, 19 Pages.
ZTE: "Enhancements on Multi-TRP/Panel Transmission", R1-1900087, 3GPP TSG RAN WG1 Ad-Hoc Meeting 1901 Taipei, Jan. 21-25, Jan. 12, 2019, pp. 1-16.

* cited by examiner

DYNAMIC SWITCHING BETWEEN DIFFERENT MULTI-TRANSMISSION/RECEPTION POINT SCHEMES

CROSS REFERENCE

The present application for patent is a divisional of U.S. patent application Ser. No. 16/789,321 by KHOSHNEVISAN et al., entitled "DYNAMIC SWITCHING BETWEEN DIFFERENT MULTI-TRANSMISSION/RECEPTION POINT SCHEMES," filed Feb. 12, 2020 which claims priority to U.S. Provisional Patent Application No. 62/805,661 by KHOSHNEVISAN et al., entitled "DYNAMIC SWITCHING BETWEEN DIFFERENT MULTI-TRANSMISSION/RECEPTION POINT SCHEMES," filed Feb. 14, 2019; each of which is assigned to the assignee hereof, and each of which is expressly incorporated herein.

BACKGROUND

The following relates generally to wireless communications, and more specifically to dynamic switching between different multi-transmission/reception point (TRP) schemes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, base stations may communicate with UEs using TRPs. For example, the network may communicate with a UE using a single TRP at a base station, using multiple TRPs corresponding to a same base station, or using multiple TRPs corresponding to multiple base stations. In cases where the network uses multiple TRPs to communicate with the UE, whether at the same base station or different base stations, the network may use a number of different multi-TRP schemes for the communication. Additionally, different communication schemes may require configuration of different scheme-specific parameters.

SUMMARY

The described techniques relate to improved methods, systems, devices, and apparatuses that support dynamic switching between different multi-transmission/reception point (TRP) schemes. Generally, the described techniques provide for indicating a specific multi-TRP scheme (e.g., a spatial division multiplexing (SDM) scheme, a frequency division multiplexing (FDM) scheme, a time division multiplexing (TDM) scheme, or any other multiplexing scheme) using one or more fields in a downlink control information (DCI) message. The payload size of the DCI message may remain the same independent of the indicated multi-TRP scheme.

In some wireless communications systems, a network may schedule a user equipment (UE) for communications using a multi-TRP scheme. The network may transmit a single DCI message to the UE to dynamically configure multiple transmission configuration indicator (TCI) states for the multiple TRPs. For example, a base station may generate information bits for the DCI message that indicate the selected multi-TRP scheme. In a first example, the DCI message may include a bit field indicating a set of antenna ports and the multi-TRP scheme for transmission. In a second example, the DCI message may include a separate field indicating the multi-TRP scheme (e.g., where the separate field is used to indicate the scheme if the UE is configured to operate according to a multi-TRP scheme). In a third example, the DCI message may indicate same or different redundancy versions (RVs) for different TRPs in an RV field or using multiple fields. In a fourth example, the DCI message may include an indication of a precoding resource block group (PRG) size that may be interpreted differently based on the indicated multi-TRP scheme (e.g., if the scheme is an FDM scheme). The UE may receive the DCI message, decode the information in the fields, and determine the indicated multi-TRP scheme for communication with the network.

A method for wireless communications is described. The method may include generating a first set of bits indicating a set of TCI states for communication with a UE, generating a second set of bits indicating a set of antenna ports and a multi-TRP scheme from a set of possible schemes for multi-TRP operation based on the first set of bits indicating the set of TCI states, and transmitting, to the UE, a DCI message including an indication of the first set of bits and the second set of bits. Using such a DCI message, the base station may dynamically switch between different schemes while maintaining a same DCI size independent of the scheme and/or parameters. A UE receiving the DCI message may interpret the second set of bits based on the first set of bits, such that the UE may identify that the DCI corresponds to more than one TCI state and may identify a scheme (e.g., a multi-TRP scheme) based on an antenna port(s) table specific to multiple TCI states.

An apparatus for wireless communications is described. The apparatus may include a processor, memory in electronic communication with the processor, and instructions stored in the memory. The instructions may be executable by the processor to cause the apparatus to generate a first set of bits indicating a set of TCI states for communication with a UE, generate a second set of bits indicating a set of antenna ports and a multi-TRP scheme from a set of possible schemes for multi-TRP operation based on the first set of bits indicating the set of TCI states, and transmit, to the UE, a DCI message including an indication of the first set of bits and the second set of bits.

Another apparatus for wireless communications is described. The apparatus may include means for generating a first set of bits indicating a set of TCI states for communication with a UE, generating a second set of bits indicating a set of antenna ports and a multi-TRP scheme from a set of possible schemes for multi-TRP operation based on the first set of bits indicating the set of TCI states, and transmitting, to the UE, a DCI message including an indication of the first set of bits and the second set of bits.

A non-transitory computer-readable medium storing code for wireless communications is described. The code may include instructions executable by a processor to generate a first set of bits indicating a set of TCI states for communication with a UE, generate a second set of bits indicating a set of antenna ports and a multi-TRP scheme from a set of possible schemes for multi-TRP operation based on the first set of bits indicating the set of TCI states, and transmit, to the UE, a DCI message including an indication of the first set of bits and the second set of bits.

Some examples of the method, apparatuses, and non-transitory computer-readable medium described herein may further include operations, features, means, or instructions for selecting, from a set of lookup tables, a lookup table mapping both the set of antenna ports and the multi-TRP scheme to the second set of bits, where the generating the second set of bits may be based on the selecting. Some examples of the method, apparatuses, and non-transitory computer-readable medium described herein may further include operations, features, means, or instructions for configuring the lookup table, the set of lookup tables, or a combination thereof, and transmitting, to the UE, an indication of the lookup table, the set of lookup tables, or a combination thereof. In this way, the UE may determine different schemes or parameters using different lookup tables, where at least one lookup table corresponds to single TRP operation and at least one lookup table corresponds to multi-TRP operation.

In some examples of the method, apparatuses, and non-transitory computer-readable medium described herein, the second set of bits further indicates a modulation order for at least one TCI state of the set of TCI states. In some examples of the method, apparatuses, and non-transitory computer-readable medium described herein, the second set of bits further indicates an RV for a transport block (TB) for at least one TCI state of the set of TCI states. In some such examples, indicating a modulation order, RV, or both using the second set of bits may further improve the signaling efficiency for the scheme parameters.

In some examples of the method, apparatuses, and non-transitory computer-readable medium described herein, the multi-TRP scheme includes a joint SDM scheme, a separate SDM scheme, a joint FDM scheme, a separate FDM scheme, a joint TDM scheme, a separate TDM scheme, or a combination thereof. In some examples of the method, apparatuses, and non-transitory computer-readable medium described herein, the second set of bits includes a same number of bits as a set of bits indicating a set of antenna ports for single TRP operation. In some cases, a UE may efficiently process DCI messages for multi-TRP operation and single TRP operation, as the UE may monitor for the same size message regardless of whether the DCI message corresponds to a single TRP scheme or a multi-TRP scheme.

In some examples of the method, apparatuses, and non-transitory computer-readable medium described herein, a lookup table mapping both the set of antenna ports and the multi-TRP scheme to the second set of bits may be pre-configured in memory.

In some examples of the method, apparatuses, and non-transitory computer-readable medium described herein, the multi-TRP operation includes communication with the UE by a set of TRPs at a base station or distributed across a set of base stations.

A method for wireless communications at a UE is described. The method may include receiving, from a base station, a DCI message including an indication of a first set of bits and a second set of bits, identifying, using the first set of bits, a set of TCI states for communication with the base station, and identifying, using the second set of bits, a set of antenna ports and a multi-TRP scheme from a set of possible schemes for multi-TRP operation based on the identifying the set of TCI states. The UE receiving the DCI message may interpret the second set of bits based on the first set of bits, such that the UE may identify that the DCI corresponds to more than one TCI state and may identify a scheme (e.g., a multi-TRP scheme) based on an antenna port(s) table specific to multiple TCI states. This may support the UE efficiently switching between different schemes and parameters.

An apparatus for wireless communications at a UE is described. The apparatus may include a processor, memory in electronic communication with the processor, and instructions stored in the memory. The instructions may be executable by the processor to cause the apparatus to receive, from a base station, a DCI message including an indication of a first set of bits and a second set of bits, identify, using the first set of bits, a set of TCI states for communication with the base station, and identify, using the second set of bits, a set of antenna ports and a multi-TRP scheme from a set of possible schemes for multi-TRP operation based on the identifying the set of TCI states.

Another apparatus for wireless communications at a UE is described. The apparatus may include means for receiving, from a base station, a DCI message including an indication of a first set of bits and a second set of bits, identifying, using the first set of bits, a set of TCI states for communication with the base station, and identifying, using the second set of bits, a set of antenna ports and a multi-TRP scheme from a set of possible schemes for multi-TRP operation based on the identifying the set of TCI states.

A non-transitory computer-readable medium storing code for wireless communications at a UE is described. The code may include instructions executable by a processor to receive, from a base station, a DCI message including an indication of a first set of bits and a second set of bits, identify, using the first set of bits, a set of TCI states for communication with the base station, and identify, using the second set of bits, a set of antenna ports and a multi-TRP scheme from a set of possible schemes for multi-TRP operation based on the identifying the set of TCI states.

Some examples of the method, apparatuses, and non-transitory computer-readable medium described herein may further include operations, features, means, or instructions for selecting, from a set of lookup tables, a lookup table mapping the second set of bits to both the set of antenna ports and the multi-TRP scheme, where the identifying the set of antenna ports and the multi-TRP scheme may be based on the selecting. Some examples of the method, apparatuses, and non-transitory computer-readable medium described herein may further include operations, features, means, or instructions for receiving, from the base station, a configuration of the lookup table, the set of lookup tables, or a combination thereof. In this way, the UE may determine different schemes or parameters using different lookup tables, where at least one lookup table corresponds to single TRP operation and at least one lookup table corresponds to multi-TRP operation.

Some examples of the method, apparatuses, and non-transitory computer-readable medium described herein may further include operations, features, means, or instructions for identifying, using the second set of bits, a modulation order for at least one TCI state of the set of TCI states. Some examples of the method, apparatuses, and non-transitory computer-readable medium described herein may further include operations, features, means, or instructions for identifying, using the second set of bits, an RV for a TB for at least one TCI state of the set of TCI states. In some such examples, identifying a modulation order, RV, or both using the second set of bits may further improve the signaling efficiency for the scheme parameters.

In some examples of the method, apparatuses, and non-transitory computer-readable medium described herein, the multi-TRP scheme includes a joint SDM scheme, a separate SDM scheme, a joint FDM scheme, a separate FDM scheme, a joint TDM scheme, a separate TDM scheme, or a combination thereof. In some examples of the method, apparatuses, and non-transitory computer-readable medium described herein, the second set of bits includes a same number of bits as a set of bits indicating a set of antenna ports for single TRP operation. In some cases, the UE may efficiently process DCI messages for multi-TRP operation and single TRP operation, as the UE may monitor for the same size message regardless of whether the DCI message corresponds to a single TRP scheme or a multi-TRP scheme.

In some examples of the method, apparatuses, and non-transitory computer-readable medium described herein, a lookup table mapping the second set of bits to both the set of antenna ports and the multi-TRP scheme may be pre-configured in memory.

In some examples of the method, apparatuses, and non-transitory computer-readable medium described herein, the multi-TRP operation comprises communication with a set of TRPs at the base station or distributed across a set of base stations including at least the base station.

Some examples of the method, apparatuses, and non-transitory computer-readable medium described herein may further include operations, features, means, or instructions for receiving a set of messages from the set of TRPs based on identifying the multi-TRP scheme.

A method for wireless communications is described. The method may include identifying that a UE is configured for multi-TRP operation, generating a first set of bits indicating one or more TCI states for communication with the UE, generating a second set of bits based on the UE being configured for multi-TRP operation, where the second set of bits indicates a multi-TRP scheme from a set of possible schemes for multi-TRP operation or a single-TRP scheme for single-TRP operation, and transmitting, to the UE, a DCI message including an indication of the first set of bits and the second set of bits.

An apparatus for wireless communications is described. The apparatus may include a processor, memory in electronic communication with the processor, and instructions stored in the memory. The instructions may be executable by the processor to cause the apparatus to identify that a UE is configured for multi-TRP operation, generate a first set of bits indicating one or more TCI states for communication with the UE, generate a second set of bits based on the UE being configured for multi-TRP operation, where the second set of bits indicates a multi-TRP scheme from a set of possible schemes for multi-TRP operation or a single-TRP scheme for single-TRP operation, and transmit, to the UE, a DCI message including an indication of the first set of bits and the second set of bits.

Another apparatus for wireless communications is described. The apparatus may include means for identifying that a UE is configured for multi-TRP operation, generating a first set of bits indicating one or more TCI states for communication with the UE, generating a second set of bits based on the UE being configured for multi-TRP operation, where the second set of bits indicates a multi-TRP scheme from a set of possible schemes for multi-TRP operation or a single-TRP scheme for single-TRP operation, and transmitting, to the UE, a DCI message including an indication of the first set of bits and the second set of bits.

A non-transitory computer-readable medium storing code for wireless communications is described. The code may include instructions executable by a processor to identify that a UE is configured for multi-TRP operation, generate a first set of bits indicating one or more TCI states for communication with the UE, generate a second set of bits based on the UE being configured for multi-TRP operation, where the second set of bits indicates a multi-TRP scheme from a set of possible schemes for multi-TRP operation or a single-TRP scheme for single-TRP operation, and transmit, to the UE, a DCI message including an indication of the first set of bits and the second set of bits.

In some examples of the method, apparatuses, and non-transitory computer-readable medium described herein, generating the second set of bits may include operations, features, means, or instructions for determining that the one or more TCI states include multiple TCI states and identifying the second set of bits based on a lookup table mapping the multi-TRP scheme for the set of TCI states to the second set of bits. Some examples of the method, apparatuses, and non-transitory computer-readable medium described herein may further include operations, features, means, or instructions for configuring the lookup table and transmitting, to the UE, an indication of the lookup table.

In some examples of the method, apparatuses, and non-transitory computer-readable medium described herein, the second set of bits may be generated based on whether the first set of bits indicates one TCI state or multiple TCI states. In other examples of the method, apparatuses, and non-transitory computer-readable medium described herein, the first set of bits may be generated based on whether the second set of bits indicates the multi-TRP scheme or the single-TRP scheme.

Some examples of the method, apparatuses, and non-transitory computer-readable medium described herein may further include operations, features, means, or instructions for receiving, from the UE, an indication of a capability of the UE, where the identifying that the UE is configured for multi-TRP operation may be based on the capability of the UE.

In some examples of the method, apparatuses, and non-transitory computer-readable medium described herein, the one or more TCI states include multiple TCI states and the multi-TRP scheme is an SDM multi-TRP scheme. Some examples of the method, apparatuses, and non-transitory computer-readable medium described herein may further include operations, features, means, or instructions for generating a third set of bits indicating a set of antenna ports for communication with the UE, where a first set of antenna ports of the antenna ports corresponds to a first TCI state of the set of TCI states and a second set of antenna ports of the antenna ports corresponds to a second TCI state of the set of TCI states, and where the DCI message further includes an indication of the third set of bits.

In some examples of the method, apparatuses, and non-transitory computer-readable medium described herein, the one or more TCI states include multiple TCI states. Some examples of the method, apparatuses, and non-transitory computer-readable medium described herein may further include operations, features, means, or instructions for generating a third set of bits indicating a set of antenna ports for communication with the UE and whether the multi-TRP scheme is an SDM multi-TRP scheme, where the second set of bits may be generated based on whether the multi-TRP scheme is the SDM multi-TRP scheme, and where the DCI message further includes an indication of the third set of bits.

In some examples of the method, apparatuses, and non-transitory computer-readable medium described herein, the one or more TCI states include multiple TCI states, and the second set of bits further indicates a modulation order for at least one TCI state of the set of TCI states. In some examples of the method, apparatuses, and non-transitory computer-readable medium described herein, the one or more TCI states include multiple TCI states, and the second set of bits further indicates an RV for a TB for at least one TCI state of the set of TCI states.

In some examples of the method, apparatuses, and non-transitory computer-readable medium described herein, a lookup table mapping the multi-TRP scheme for a set of TCI states to the second set of bits may be pre-configured in memory.

A method for wireless communications at a UE is described. The method may include receiving, from a base station, a DCI message including an indication of a first set of bits and a second set of bits, identifying, using the first set of bits, one or more TCI states for communication with the base station, and identifying, using the second set of bits and based on the UE being configured for multi-TRP operation, a multi-TRP scheme from a set of possible schemes for multi-TRP operation or a single-TRP scheme for single-TRP operation.

An apparatus for wireless communications at a UE is described. The apparatus may include a processor, memory in electronic communication with the processor, and instructions stored in the memory. The instructions may be executable by the processor to cause the apparatus to receive, from a base station, a DCI message including an indication of a first set of bits and a second set of bits, identify, using the first set of bits, one or more TCI states for communication with the base station, and identify, using the second set of bits and based on the UE being configured for multi-TRP operation, a multi-TRP scheme from a set of possible schemes for multi-TRP operation or a single-TRP scheme for single-TRP operation.

Another apparatus for wireless communications at a UE is described. The apparatus may include means for receiving, from a base station, a DCI message including an indication of a first set of bits and a second set of bits, identifying, using the first set of bits, one or more TCI states for communication with the base station, and identifying, using the second set of bits and based on the UE being configured for multi-TRP operation, a multi-TRP scheme from a set of possible schemes for multi-TRP operation or a single-TRP scheme for single-TRP operation.

A non-transitory computer-readable medium storing code for wireless communications at a UE is described. The code may include instructions executable by a processor to receive, from a base station, a DCI message including an indication of a first set of bits and a second set of bits, identify, using the first set of bits, one or more TCI states for communication with the base station, and identify, using the second set of bits and based on the UE being configured for multi-TRP operation, a multi-TRP scheme from a set of possible schemes for multi-TRP operation or a single-TRP scheme for single-TRP operation.

In some examples of the method, apparatuses, and non-transitory computer-readable medium described herein, the one or more TCI states include multiple TCI states. Some examples of the method, apparatuses, and non-transitory computer-readable medium described herein may further include operations, features, means, or instructions for identifying the multi-TRP scheme based on a lookup table mapping the second set of bits to the multi-TRP scheme for the set of TCI states. Some examples of the method, apparatuses, and non-transitory computer-readable medium described herein may further include operations, features, means, or instructions for receiving, from the base station, a configuration of the lookup table.

In some examples of the method, apparatuses, and non-transitory computer-readable medium described herein, the multi-TRP scheme or the single-TRP scheme may be identified based on whether first set of bits indicates one TCI state or multiple TCI states. In other examples of the method, apparatuses, and non-transitory computer-readable medium described herein, the one or more TCI states may be identified based on whether the second set of bits indicates the multi-TRP scheme or the single-TRP scheme.

Some examples of the method, apparatuses, and non-transitory computer-readable medium described herein may further include operations, features, means, or instructions for transmitting, to the base station, an indication of a capability of the UE, where the capability of the UE indicates that the UE is configured for multi-TRP operation.

In some examples of the method, apparatuses, and non-transitory computer-readable medium described herein, the DCI message may include an indication of a third set of bits, the one or more TCI states may include multiple TCI states, and the multi-TRP scheme may be an example of an SDM multi-TRP scheme. Some examples of the method, apparatuses, and non-transitory computer-readable medium described herein may further include operations, features, means, or instructions for identifying, using the third set of bits, a set of antenna ports for communication with the base station, where a first set of antenna ports of the antenna ports corresponds to a first TCI state of the set of TCI states and a second set of antenna ports of the antenna ports corresponds to a second TCI state of the set of TCI states.

In some examples of the method, apparatuses, and non-transitory computer-readable medium described herein, the DCI message may include an indication of a third set of bits and the one or more TCI states may include multiple TCI states. Some examples of the method, apparatuses, and non-transitory computer-readable medium described herein may further include operations, features, means, or instructions for identifying, using the third set of bits, a set of antenna ports for communication with the base station and whether the multi-TRP scheme includes an SDM multi-TRP scheme, where the multi-TRP scheme or the single-TRP scheme may be identified based on whether the multi-TRP scheme includes the SDM multi-TRP scheme.

In some examples of the method, apparatuses, and non-transitory computer-readable medium described herein, the one or more TCI states include multiple TCI states. Some examples of the method, apparatuses, and non-transitory computer-readable medium described herein may further include operations, features, means, or instructions for identifying, using the second set of bits, a modulation order for at least one TCI state of the set of TCI states. Some examples of the method, apparatuses, and non-transitory computer-readable medium described herein may further include operations, features, means, or instructions for identifying, using the second set of bits, an RV for a TB for at least one TCI state of the set of TCI states.

In some examples of the method, apparatuses, and non-transitory computer-readable medium described herein, a lookup table mapping the second set of bits to the multi-TRP scheme for a set of TCI states may be pre-configured in memory.

A method for wireless communications is described. The method may include determining to transmit to a UE using a set of TCI states, performing a rate matching procedure that includes joint rate matching or separate rate matching of a TB for a first TCI state of the set of TCI states and a second TCI state of the set of TCI states, generating a set of bits based on the rate matching procedure, where the set of bits indicates a joint RV for the first TCI state and the second TCI state if the rate matching procedure includes joint rate matching and the set of bits indicates a first RV for the first TCI state and a second RV for the second TCI state if the rate matching procedure includes separate rate matching, and transmitting, to the UE, a DCI message including an indication of the set of bits.

An apparatus for wireless communications is described. The apparatus may include a processor, memory in electronic communication with the processor, and instructions stored in the memory. The instructions may be executable by the processor to cause the apparatus to determine to transmit to a UE using a set of TCI states, perform a rate matching procedure that includes joint rate matching or separate rate matching of a TB for a first TCI state of the set of TCI states and a second TCI state of the set of TCI states, generate a set of bits based on the rate matching procedure, where the set of bits indicates a joint RV for the first TCI state and the second TCI state if the rate matching procedure includes joint rate matching and the set of bits indicates a first RV for the first TCI state and a second RV for the second TCI state if the rate matching procedure includes separate rate matching, and transmit, to the UE, a DCI message including an indication of the set of bits.

Another apparatus for wireless communications is described. The apparatus may include means for determining to transmit to a UE using a set of TCI states, performing a rate matching procedure that includes joint rate matching or separate rate matching of a TB for a first TCI state of the set of TCI states and a second TCI state of the set of TCI states, generating a set of bits based on the rate matching procedure, where the set of bits indicates a joint RV for the first TCI state and the second TCI state if the rate matching procedure includes joint rate matching and the set of bits indicates a first RV for the first TCI state and a second RV for the second TCI state if the rate matching procedure includes separate rate matching, and transmitting, to the UE, a DCI message including an indication of the set of bits.

A non-transitory computer-readable medium storing code for wireless communications is described. The code may include instructions executable by a processor to determine to transmit to a UE using a set of TCI states, perform a rate matching procedure that includes joint rate matching or separate rate matching of a TB for a first TCI state of the set of TCI states and a second TCI state of the set of TCI states, generate a set of bits based on the rate matching procedure, where the set of bits indicates a joint RV for the first TCI state and the second TCI state if the rate matching procedure includes joint rate matching and the set of bits indicates a first RV for the first TCI state and a second RV for the second TCI state if the rate matching procedure includes separate rate matching, and transmit, to the UE, a DCI message including an indication of the set of bits.

In some examples of the method, apparatuses, and non-transitory computer-readable medium described herein, the set of bits may be a first set of bits and the method, apparatuses, and non-transitory computer-readable medium described herein may further include operations, features, means, or instructions for generating a second set of bits indicating whether the rate matching procedure includes joint rate matching or separate rate matching, where the DCI message further includes an indication of the second set of bits. In other examples of the method, apparatuses, and non-transitory computer-readable medium described herein, the set of bits further indicates whether the rate matching procedure includes joint rate matching or separate rate matching.

Some examples of the method, apparatuses, and non-transitory computer-readable medium described herein may further include operations, features, means, or instructions for selecting between a first lookup table mapping the joint RV to the set of bits and a second lookup table mapping a combination of the first RV and the second RV to the set of bits, where the generating may be based on the selecting. In some examples of the method, apparatuses, and non-transitory computer-readable medium described herein, the first lookup table, the second lookup table, or a combination thereof may be pre-configured in memory. Some examples of the method, apparatuses, and non-transitory computer-readable medium described herein may further include operations, features, means, or instructions for configuring the first lookup table, the second lookup table, or a combination thereof, and transmitting, to the UE, an indication of the first lookup table, the second lookup table, or a combination thereof.

In some examples of the method, apparatuses, and non-transitory computer-readable medium described herein, generating the set of bits may include operations, features, means, or instructions for identifying the set of bits based on a lookup table mapping one or more RVs to the set of bits. In some examples of the method, apparatuses, and non-transitory computer-readable medium described herein, the lookup table may be pre-configured in memory. Some examples of the method, apparatuses, and non-transitory computer-readable medium described herein may further include operations, features, means, or instructions for configuring the lookup table, and transmitting, to the UE, an indication of the lookup table.

In some examples of the method, apparatuses, and non-transitory computer-readable medium described herein, the rate matching procedure may be an example of separate rate matching and the method, apparatuses, and non-transitory computer-readable medium described herein may further include operations, features, means, or instructions for performing a slot aggregation procedure for the TB over a set of slots, where the set of bits further indicates the first RV for the first TCI state and the second RV for the second TCI state for each slot of the set of slots.

A method for wireless communications at a UE is described. The method may include receiving, from a base station, a DCI message including an indication of a set of bits, determining a rate matching procedure performed by the base station, where the rate matching procedure includes joint rate matching or separate rate matching of a TB for a first TCI state of a set of TCI states and a second TCI state of the set of TCI states, and identifying, using the set of bits and based on the rate matching procedure, a joint RV for the first TCI state and the second TCI state if the rate matching procedure includes joint rate matching or a first RV for the first TCI state and a second RV for the second TCI state if the rate matching procedure includes separate rate matching.

An apparatus for wireless communications at a UE is described. The apparatus may include a processor, memory in electronic communication with the processor, and instructions stored in the memory. The instructions may be executable by the processor to cause the apparatus to receive, from a base station, a DCI message including an indication of a set of bits, determine a rate matching procedure performed by the base station, where the rate matching procedure includes joint rate matching or separate rate matching of a TB for a first TCI state of a set of TCI states and a second TCI state of the set of TCI states, and identify, using the set of bits and based on the rate matching procedure, a joint RV for the first TCI state and the second TCI state if the rate matching procedure includes joint rate matching or a first RV for the first TCI state and a second RV for the second TCI state if the rate matching procedure includes separate rate matching.

Another apparatus for wireless communications at a UE is described. The apparatus may include means for receiving, from a base station, a DCI message including an indication of a set of bits, determining a rate matching procedure performed by the base station, where the rate matching procedure includes joint rate matching or separate rate matching of a TB for a first TCI state of a set of TCI states and a second TCI state of the set of TCI states, and identifying, using the set of bits and based on the rate matching procedure, a joint RV for the first TCI state and the second TCI state if the rate matching procedure includes joint rate matching or a first RV for the first TCI state and a second RV for the second TCI state if the rate matching procedure includes separate rate matching.

A non-transitory computer-readable medium storing code for wireless communications at a UE is described. The code may include instructions executable by a processor to receive, from a base station, a DCI message including an indication of a set of bits, determine a rate matching procedure performed by the base station, where the rate matching procedure includes joint rate matching or separate rate matching of a TB for a first TCI state of a set of TCI states and a second TCI state of the set of TCI states, and identify, using the set of bits and based on the rate matching procedure, a joint RV for the first TCI state and the second TCI state if the rate matching procedure includes joint rate matching or a first RV for the first TCI state and a second RV for the second TCI state if the rate matching procedure includes separate rate matching.

In some examples of the method, apparatuses, and non-transitory computer-readable medium described herein, the set of bits includes a first set of bits, the DCI message further includes an indication of a second set of bits, and the rate matching procedure performed by the base station may be determined using the second set of bits. In other examples of the method, apparatuses, and non-transitory computer-readable medium described herein, the rate matching procedure performed by the base station may be determined using the set of bits.

Some examples of the method, apparatuses, and non-transitory computer-readable medium described herein may further include operations, features, means, or instructions for selecting between a first lookup table mapping the set of bits to the joint RV and a second lookup table mapping the set of bits to a combination of the first RV and the second RV, where the identifying may be based on the selecting. In some examples of the method, apparatuses, and non-transitory computer-readable medium described herein, the first lookup table, the second lookup table, or a combination thereof may be pre-configured in memory. Some examples of the method, apparatuses, and non-transitory computer-readable medium described herein may further include operations, features, means, or instructions for receiving, from the base station, a configuration of the first lookup table, the second lookup table, or a combination thereof.

In some examples of the method, apparatuses, and non-transitory computer-readable medium described herein, the joint RV or the first RV and the second RV may be identified based on a lookup table mapping the set of bits to one or more RVs. In some examples of the method, apparatuses, and non-transitory computer-readable medium described herein, the lookup table may be pre-configured in memory. Some examples of the method, apparatuses, and non-transitory computer-readable medium described herein may further include operations, features, means, or instructions for receiving, from the base station, a configuration of the lookup table.

In some examples of the method, apparatuses, and non-transitory computer-readable medium described herein, the rate matching procedure may include separate rate matching and the method, apparatuses, and non-transitory computer-readable medium described herein may further include operations, features, means, or instructions for identifying, using the set of bits and based on the rate matching procedure, the first RV for the first TCI state and the second RV for the second TCI state for each slot of a set of slots in a slot aggregation procedure.

A method for wireless communications is described. The method may include determining to transmit to a UE using a set of TCI states in an FDM multi-TRP scheme, determining a first PRG size for precoding transmissions for a first TCI state of the set of TCI states and a second PRG size for precoding transmissions for a second TCI state of the set of TCI states based on the FDM multi-TRP scheme, generating a bit indicating the first PRG size and the second PRG size based on a first set of physical resource blocks (PRBs) corresponding to the first TCI state and a second set of PRB s corresponding to the second TCI state, and transmitting, to the UE, a DCI message including an indication of the bit.

An apparatus for wireless communications is described. The apparatus may include a processor, memory in electronic communication with the processor, and instructions stored in the memory. The instructions may be executable by the processor to cause the apparatus to determine to transmit to a UE using a set of TCI states in a FDM multi-TRP scheme, determine a first PRG size for precoding transmissions for a first TCI state of the set of TCI states and a second PRG size for precoding transmissions for a second TCI state of the set of TCI states based on the FDM multi-TRP scheme, generate a bit indicating the first PRG size and the second PRG size based on a first set of PRBs corresponding to the first TCI state and a second set of PRB s corresponding to the second TCI state, and transmit, to the UE, a DCI message including an indication of the bit.

Another apparatus for wireless communications is described. The apparatus may include means for determining to transmit to a UE using a set of TCI states in a FDM multi-TRP scheme, determining a first PRG size for precoding transmissions for a first TCI state of the set of TCI states and a second PRG size for precoding transmissions for a second TCI state of the set of TCI states based on the FDM multi-TRP scheme, generating a bit indicating the first PRG size and the second PRG size based on a first set of PRBs corresponding to the first TCI state and a second set of PRBs corresponding to the second TCI state, and transmitting, to the UE, a DCI message including an indication of the bit.

A non-transitory computer-readable medium storing code for wireless communications is described. The code may include instructions executable by a processor to determine to transmit to a UE using a set of TCI states in a FDM multi-TRP scheme, determine a first PRG size for precoding transmissions for a first TCI state of the set of TCI states and a second PRG size for precoding transmissions for a second TCI state of the set of TCI states based on the FDM multi-TRP scheme, generate a bit indicating the first PRG size and the second PRG size based on a first set of PRBs corresponding to the first TCI state and a second set of PRBs corresponding to the second TCI state, and transmit, to the UE, a DCI message including an indication of the bit.

In some examples of the method, apparatuses, and non-transitory computer-readable medium described herein, the first PRG size may be a first pre-configured number of PRBs, a number of PRBs in the first set of PRBs, or a combination thereof, and the second PRG size may be a second pre-configured number of PRBs, a number of PRBs in the second set of PRBs, or a combination thereof.

In some examples of the method, apparatuses, and non-transitory computer-readable medium described herein, the first PRG size may be the number of PRBs in the first set of PRBs if the first set of PRBs is contiguous in frequency, a frequency size of the first set of PRBs is greater than a threshold frequency size, or a combination thereof, and the second PRG size may be the number of PRBs in the second set of PRBs if the second set of PRBs is contiguous in frequency, a frequency size of the second set of PRBs is greater than the threshold frequency size, or a combination thereof.

A method for wireless communications at a UE is described. The method may include receiving, from a base station, a DCI message including an indication of a bit, determining to receive transmissions from the base station using a set of TCI states in an FDM multi-TRP scheme, where the set of TCI states includes a first TCI state and a second TCI state, and identifying, using the bit, a first PRG size and a second PRG size based on a first set of PRBs corresponding to the first TCI state and a second set of PRBs corresponding to the second TCI state.

An apparatus for wireless communications at a UE is described. The apparatus may include a processor, memory in electronic communication with the processor, and instructions stored in the memory. The instructions may be executable by the processor to cause the apparatus to receive, from a base station, a DCI message including an indication of a bit, determine to receive transmissions from the base station using a set of TCI states in a FDM multi-TRP scheme, where the set of TCI states includes a first TCI state and a second TCI state, and identify, using the bit, a first PRG size and a second PRG size based on a first set of PRBs corresponding to the first TCI state and a second set of PRBs corresponding to the second TCI state.

Another apparatus for wireless communications at a UE is described. The apparatus may include means for receiving, from a base station, a DCI message including an indication of a bit, determining to receive transmissions from the base station using a set of TCI states in a FDM multi-TRP scheme, where the set of TCI states includes a first TCI state and a second TCI state, and identifying, using the bit, a first PRG size and a second PRG size based on a first set of PRBs corresponding to the first TCI state and a second set of PRBs corresponding to the second TCI state.

A non-transitory computer-readable medium storing code for wireless communications at a UE is described. The code may include instructions executable by a processor to receive, from a base station, a DCI message including an indication of a bit, determine to receive transmissions from the base station using a set of TCI states in a FDM multi-TRP scheme, where the set of TCI states includes a first TCI state and a second TCI state, and identify, using the bit, a first PRG size and a second PRG size based on a first set of PRBs corresponding to the first TCI state and a second set of PRBs corresponding to the second TCI state.

In some examples of the method, apparatuses, and non-transitory computer-readable medium described herein, the first PRG size may be a first pre-configured number of PRBs, a number of PRBs in the first set of PRBs, or a combination thereof, and the second PRG size may be a second pre-configured number of PRBs, a number of PRBs in the second set of PRBs, or a combination thereof.

In some examples of the method, apparatuses, and non-transitory computer-readable medium described herein, identifying the first PRG size and the second PRG size may include operations, features, means, or instructions for identifying that the first PRG size may be the number of PRBs in the first set of PRBs if the first set of PRBs is contiguous in frequency, a frequency size of the first set of PRBs is greater than a threshold frequency size, or a combination thereof, and identifying that the second PRG size may be the number of PRBs in the second set of PRBs if the second set of PRBs is contiguous in frequency, a frequency size of the second set of PRBs is greater than the threshold frequency size, or a combination thereof.

DETAILED DESCRIPTION

Figure 1:
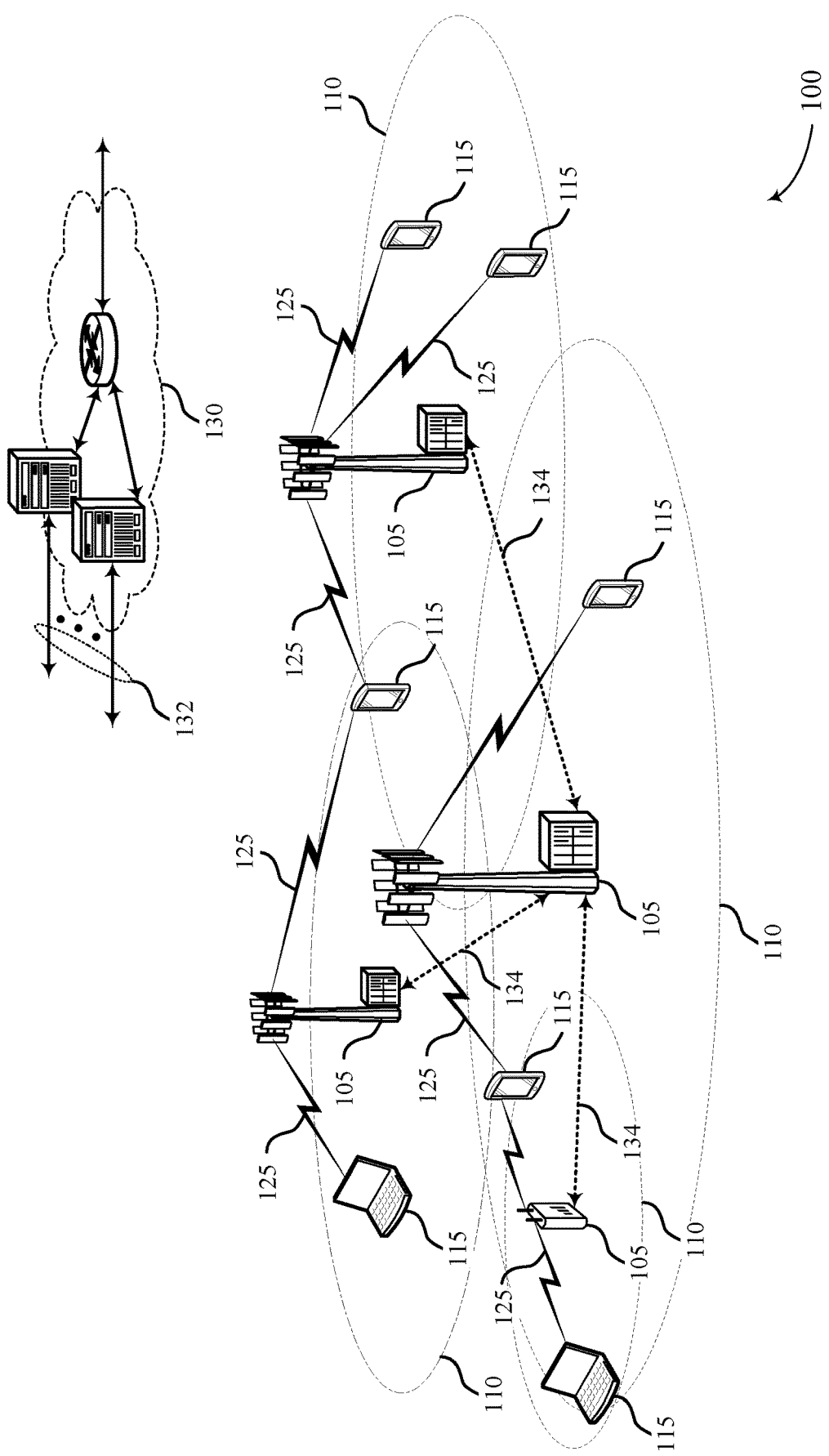
FIGS. 1 and 2 illustrate examples of wireless communications that support dynamic switching between different multi-transmission/reception point (TRP) schemes in accordance with aspects of the present disclosure.

In some wireless communications systems, the network may communicate with a user equipment (UE) using one or more transmission/receptions points (TRPs). For example, the network may communicate with the UE using a single TRP at a base station, using multiple TRPs at a same base station, or using multiple TRPs across multiple base stations. If the network uses multiple TRPs to communicate with the UE, the network may configure the UE with a specific multi-TRP scheme from a set of possible schemes for multi-TRP operation. The UE may differentiate between which scheme is used by the network based on a downlink control information (DCI) message. A base station may transmit the DCI message on the physical downlink control channel (PDCCH) using a first TRP and may include fields in the DCI that indicate to the UE the communication scheme, parameters for one or more TRPs active in the communication scheme, or a combination thereof. If the base station configures the UE for multi-TRP operation, the network may transmit to the UE (e.g., in multiple physical downlink shared channel (PDSCH) transmissions) using the first TRP and at least a second TRP.

In a first implementation, the UE may detect the communication scheme based on an antenna port(s) field and a transmission configuration indicator (TCI) field of the DCI message. The TCI field of the DCI may indicate whether communication with one TRP or multiple TRPs is configured for communication. In some cases, a base station may not configure the bit value (e.g., "tci-PresentInDCI") in the TCI field for the control resource set (CORESET) scheduling the PDSCH transmission, or the base station may set the value of the TCI field to indicate a single TCI state. In either of these cases, the UE may be configured with a single TRP scheme for network communication. In other cases, the base station may set the TCI field value to indicate more than one TCI state. In these cases, the UE may be configured with a multi-TRP scheme for network communication. If configured for a single TRP, the UE may determine a set of antenna ports (e.g., demodulation reference signal (DMRS) ports) based on the value of the antenna port(s) field of the DCI. If configured for multiple TRPs, the UE may determine a set of antenna ports (e.g., DMRS ports) and a specific multi-TRP scheme from a set of possible schemes. In some examples, the antenna port(s) value may correspond to one or more DMRS ports, a communication scheme (e.g., spatial division multiplexing (SDM), frequency division multiplexing (FDM), time division multiplexing (TDM), or any other multiplexing scheme), a rate matching configuration, a configuration for the indicated scheme (e.g., an FDM pattern, a TDM pattern, or some other pattern), a modulation order, or some combination of these parameters.

In a second implementation, the UE may detect the communication scheme based on a multi-TCI scheme field (e.g., containing a "multi-TCI-scheme" value) and the TCI field of the DCI message. A base station may set the value in the multi-TCI scheme field to indicate a multi-TRP scheme (e.g., SDM, FDM, or TDM). In some cases, the value may additionally indicate a rate matching configuration, a configuration for the indicated scheme (e.g., an FDM pattern, a TDM pattern, etc.), a modulation order, whether slot aggregation is implemented (e.g., for a TDM scheme) or some combination of these parameters. In a first example, the value of the TCI field may indicate whether the communication scheme includes multiple TCI states. If the TCI field value does not correspond to multiple TCI states, then the multi-TCI scheme field can be ignored (e.g., not used for configuration) by the UE (e.g., the base station may set the bits in the field to random or default values). In a second example, one or more of the possible values of the multi-TCI scheme field may correspond to a single TCI state, while the other possible values in the multi-TCI scheme field correspond to different multiple TCI state scheme possibilities. The value of the TCI field may be interpreted based on whether the multi-TCI scheme field indicates a single TCI state or multiple TCI states. For example, the TCI field value may correspond to a single TCI state if single TCI state operation is indicated by the multi-TCI scheme field and may correspond to multiple TCI states if multi-TCI state operation is indicated by the multi-TCI scheme field.

Additionally or alternatively, the base station may indicate one or more redundancy versions (RV) based on the rate matching implemented for a multi-TCI scheme. For example, the DCI message may include an RV field. When using a single RV (e.g., for single-TRP operation or when implementing joint rate matching across TCI states in multi-TRP operation), the RV may be determined by the value in the RV field. When using multiple (e.g., two) RVs (e.g., when implementing separate rate matching for multiple TCI states in multi-TRP operation), the base station may indicate multiple RV values in the DCI message. For example, the base station may indicate a first RV value in the RV field of the DCI and a second RV value in the antenna port(s) field of the DCI, a multi-TCI scheme field of the DCI, or a combination of these fields. Alternatively, if a field of the DCI (e.g., the antenna port(s) field or the multi-TCI scheme field of the DCI as described herein) indicates separate rate matching for two TCI states, the UE may interpret the value in the RV field in the DCI as corresponding to a pair of RV values. The first RV value in the pair may correspond to a first TCI state and the second RV value in the pair may correspond to a second TCI state. In other cases, whether the rate matching is joint or separate for the TCI states may be indicated in the RV field. For example, one or more value of the RV field may correspond to a single RV value (e.g., indicating joint rate matching) and one or more other values of the RV field may correspond to multiple RV values (e.g., indicating separate rate matching).

In some implementations, the UE may interpret one or more values in the DCI message differently based on the indicated communication scheme. For example, the UE may determine a precoding resource block group (PRG) size differently based on the scheme. The physical resource block (PRB) bundling size indicator field in the DCI may indicate the PRG size. If the PRB bundling size indicator field indicates a wideband size, the UE may normally determine that the same precoding is used across the entire scheduled bandwidth. However, if the UE determines that the TCI scheme is configured for multi-TCI operation according to an FDM scheme (for example, based on the antenna port(s) field, the multi-TCI field, etc.), then the UE may interpret the PRB bundling size indicator field to apply separately to different TCI states. The UE may determine that a wideband value indicates that the same precoding is used within resource blocks (RBs) associated with the same TCI state, rather than across the entire scheduled bandwidth.

Particular aspects of the subject matter described herein may be implemented to realize one or more advantages. The described techniques may support improvements in the multi-TRP scheme indication by mitigating signaling overhead and implementing dynamic indication of a multi-TRP scheme, among other advantages. As such, supported techniques may include improved network operations and, in some examples, may promote network efficiencies, among other benefits.

Aspects of the disclosure are initially described in the context of wireless communications systems and process flows. Aspects of the disclosure are further illustrated by and described with reference to apparatus diagrams, system diagrams, and flowcharts that relate to dynamic switching between different multi-TRP schemes.

FIG. 1 illustrates an example of a wireless communications system 100 that supports dynamic switching between different multi-TRP schemes in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNB s, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using TDM techniques, FDM techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may include multiple UEs 115 and multiple base stations 105. The base stations 105 may communicate using TRPs. For example, the network may communicate with a UE 115 using a single TRP at a base station 105, using multiple TRPs at a base station 105, or using multiple TRPs corresponding to multiple base stations 105. In cases where the network communicates with the UE 115 using multiple different TRPs, whether at the same base station 105 or different base stations 105, the communication may occur according to one of multiple possible multi-TRP schemes.

In a first case, TRPs may communicate by utilizing an FDM scheme. In the case of FDM communication, one set of RBs or a set of PRGs may correspond to a first TRP and a first TCI state, and a second set of RBs or PRGs may correspond to a second TRP and a second TCI state. The RBs allocated for each TRP may be distinct from each other, such that each TRP communicates on a designated set of RBs that are non-overlapping in frequency with any other sets of RBs allocated for other TRPs in the same OFDM symbol. In the FDM scheme, each TRP may operate using different TCI states within a single slot. The different TCI states may use joint or separate rate matching for a transport block (TB) and may have the same or different modulation orders.

In a second case, TRPs may communicate with a UE 115 by utilizing a TDM scheme. In this case, the TRPs may communicate with the UE 115 by transmitting signals in different orthogonal-frequency division multiplexing (OFDM) symbols. Within one slot (e.g., a transmission time interval (TTI)) in a TDM scheme there may be multiple different TCI states in different sets of OFDM symbols within the slot. The different TCI states corresponding to the different TRPs may use joint or separate rate matching for a TB and may have the same or different modulation orders. In some cases, the TDM scheme may also include a slot aggregation procedure, in which case a transmission may be TDMed across slots such that there may be different TCI states in different slots. In slot aggregation, the different TRPs may use separate rate matching in the different slots, and may use the same or different modulation orders for the different TCI states.

In a third case, TRPs may communicate by utilizing SDM. In this case, different TRPs may transmit different spatial layers on the same RBs, symbols, or both. A base station 105 may implement different demodulation reference signal (DMRS) port groups for the different TRPs, quasi-colocation (QCL) relationships, TCI states, or combinations of these. In some cases, TRPs may communicate by utilizing code division multiplexing (CDM).

The network may communicate using multiple TRPs according to any number of the communication schemes described herein. Further, some communication schemes may include a combination of one or more schemes (e.g., both TDM and FDM). Each multi-TRP scheme may, in some cases, utilize different parameters for configuration of the scheme (such as what DMRS ports are used, how RBs are allocated in an FDM scheme, etc.). To configure a UE 115 to receive information from multiple TRPs, the network may signal the parameters for the selected multi-TRP scheme to the UE 115. However, signaling different parameters for different multi-TRP schemes may be inefficient and include significant data overhead or modifications to configuration transmissions. Furthermore, the network may support UEs 115 with varying capabilities (e.g., one or more UEs 115 may not be configured to perform multi-TRP communication). In these cases, signaling multi-TRP parameters may result in errors at UEs 115 not configured to decode the parameters.

To efficiently support dynamic switching between multi-TRP schemes, wireless communications system 100 may support base stations 105 transmitting DCI to configure a multi-TRP scheme. For example, a base station 105 may transmit a single DCI message to a UE 115 to indicate the multi-TRP scheme and corresponding parameters for multiple TCI states. The base station 105 may use one or more fields in the DCI message differently when indicating a single TRP scheme and a multi-TRP scheme, such that DCI messages for UEs 115 that are capable of multi-TRP operation and for UEs 115 that are not capable of multi-TRP operation may have a same payload size. In this way, a UE 115 may receive the DCI message, determine whether a single TCI state or multiple TCI states are configured, and determine the communication parameters indicated in one or more DCI fields based on the number of configured TRPs. Using the DCI message, a base station 105 may dynamically switch between different multi-TRP schemes, and the UE 115 receiving the DCI message may identify the switches and correctly monitor for and decode messages from multiple TRPs.

Figure 2:
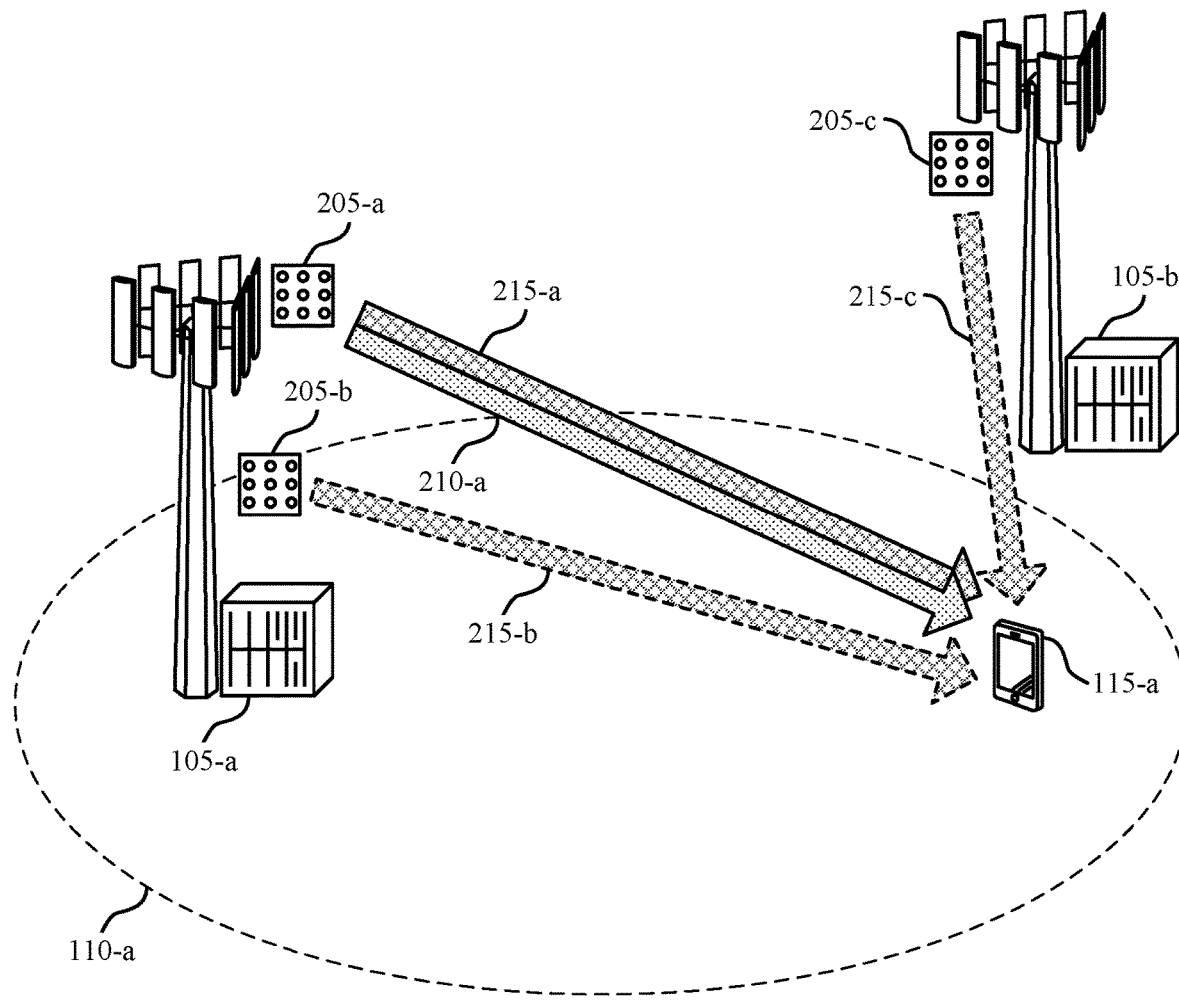

FIG. 2 illustrates an example of a wireless communications system 200 that supports dynamic switching between different multi-TRP schemes in accordance with aspects of the present disclosure. In some examples, wireless communications system 200 may implement aspects of wireless communication system 100. For example, wireless communications system 200 may include multiple UEs 115 and base stations 105. The base stations 105 may communicate with the UEs 115 using TRPs 205. Each base station 105 may have one or more TRPs 205. For example, base station 105-*a* may include TRP 205-*a* and TRP 205-*b*, while base station 105-*b* may include TRP 205-*c*. UE 115-*a* may communicate with the network using a single TRP 205, using multiple TRPs 205 corresponding to a single base station 105 (e.g., TRPs 205-*a* and 205-*b* at base station 105-*a*), or using multiple TRPs 205 corresponding to multiple different base stations 105 (e.g., TRP 205-*a* at base station 105-*a* and TRP 205-*c* at base station 105-*b*, where base stations 105-*a* and 105-*b* may be connected via a backhaul connection).

In a communication scheme that includes multiple TRPs 205, a single DCI message may configure the communications for the multiple TRPs 205. In an example, base station 105-*a* may communicate using a first TRP 205-*a* and a second TRP 205-*b*. Base station 105-*a* may transmit DCI using TRP 205-*a* on a PDCCH 210-*a* to UE 115-*a*. The DCI may include communication configuration information for the TCI state(s). The TCI state(s) may determine whether the communications correspond to single TRP communication or multiple TRP communication. The TCI state(s) may also indicate the type of communication scheme (e.g., TDM, FDM, or SDM) configured for the communication. If the TCI configuration is one TCI state, the one TCI state may correspond to single TRP communication. If the TCI configuration is multiple TCI states, the multiple TCI states may correspond to communication with multiple TRPs. In some cases, the wireless communications system 200 may support up to M candidate TCI states for the purpose of QCL indication. Of these M candidates (e.g., 128 candidate TCI states), a subset of TCI states may be determined based on a MAC control element (CE). The MAC-CE may correspond to a certain number (e.g., $2^N$, such as 8 TCI states) of candidate TCI states for PDSCH QCL indication. One of these $2^N$ TCI states may be dynamically indicated in a message (e.g., DCI) using N bits.

The DCI on the PDCCH 210-a may schedule PDSCH 215-a transmissions from TRP 205-a for single TRP communication configurations. Alternatively, the DCI on the PDCCH 210-a may schedule multiple PDSCH 215 transmissions from multiple TRPs 205. For example, the DCI may schedule PDSCH 215-a transmissions from TRP 205-a and PDSCH 215-b transmissions from TRP 205-b or PDSCH 215-a transmissions from TRP 205-a and PDSCH 215-c transmission from TRP 205-c for multiple TRP communication configurations. A UE 115 may be configured with a list of different candidate TCI states for the purpose of QCL indication. The QCL indication may also indicate DMRS in the DCI corresponding to the PDSCH 215. Each TCI code point index in a DCI may correspond to one or more QCL relationships (e.g., corresponding to one or more reference signal (RS) sets) and, accordingly, one or more TCI states.

In cases where the network communicates with a UE 115 with TRPs 205, whether in a single TRP configuration or a multiple TRP configuration, there may be multiple different schemes with which to communicate with the TRP(s) 205. The TRP communication scheme may be determined by the TCI states. The TCI state(s) for communication on the PDSCH(s) 215 may be indicated in the DCI by one or more bits, where the one or more bits indicate a TCI code point index. For example, the UE 115 may store a TCI code point, which may be an example of a table containing indices each corresponding to one or multiple TCI states. The size of the table may be based on the number of bits in the TCI field. For example, if the TCI field includes three bits, the table may have eight indices (e.g., corresponding to the eight possible bit values for the three bit TCI field). As such, the UE 115 may receive an indication of a TCI state (e.g., an indication of an index) and may determine one or more TCI states based on the corresponding TCI code point index. The TCI code point index in the DCI can correspond to one or more TCI states (e.g., either one or two TCI states). If the TCI code point index in the DCI indicates one TCI state, the UE 115 is configured for single TRP operation. If the TCI code point index in the DCI indicates two TCI states (and, correspondingly, two QCL relationships), the UE 115 is configured for multiple TRP operation. For example, if two TCI states are active within a TCI code point index, each TCI state may correspond to one CDM group.

In a first example multi-TRP scheme, TRPs 205 may communicate by utilizing SDM. In this case, different spatial layers may be transmitted from different TRPs 205 on the same RBs and symbols. Each TCI state may also correspond to different DMRS port groups. The DMRS ports in a DMRS CDM port group may be QCLed. This may allow a UE 115 to estimate each channel separately. In SDM, each antenna port used on the downlink may belong to a different CDM group. Base station 105-a may indicate the antenna port groups using an antenna port(s) field in DCI. For example, if the DMRS is Type 1 DMRS, the following example table indicates possible antenna port groups corresponding to values in the antenna port(s) field:

TABLE 1

Example Antenna Port Indication
One Codeword

| Field Value | Number of Ports (first port group, second port group) | DMRS Antenna Ports |
|---|---|---|
| 0 | (1, 1) | {0}, {2} |
| 1 | (1, 1) | {1}, {3} |
| 2 | (2, 1) | {0, 1}, {2} |
| 3 | (2, 1) | {2, 3}, {0} |
| 4 | (2, 2) | {0, 1}, {2, 3} |
| 5-15 | Reserved | Reserved |

The SDM scheme may include different TCI states within a single slot, where the TCI states overlap in time, frequency, or both. Different groups of spatial layers (which may correspond to different TCI states) may use the same modulation order. Cases where multiple groups use the same modulation order may be signaled through the modulation and coding scheme (MCS). In some cases, base station 105-a may indicate the MCS in the DCI. In cases where the different groups of spatial layers use different modulation orders, each of the different modulation orders may be signaled to UE 115-a. Different DMRS port groups may correspond to different TRPs, QCL relationships, TCI states, or a combination thereof.

In other examples of multi-TRP schemes, TRPs 205 may communicate with UE 115-a by utilizing FDM and/or TDM communication schemes. In an FDM scheme, one set of RBs or a set of PRGs may correspond to a first TRP 205-a and a first TCI state, and a second set of RBs or PRGs may correspond to a second TRP 205-b and a second TCI state. The RBs allocated for each TRP may be distinct from each other, so that each TRP communicates on a designated set of RBs that are distinct from the other set of RBs (but may overlap in the same OFDM symbol). The frequency domain resource assignment field in the DCI may indicate both the first set and the second set or RBs or PRGs. In some cases, base station 105-a may use additional signaling in the DCI to indicate which RBs belong to the first set and which belong to the second set. In some cases, the system may support a limited number of possibilities for allocating the frequency resources to the different TRPs (e.g., to reduce the overhead). The following table includes four example possibilities for how to allocate the RBs in the scheduled bandwidth to the two TRPs (e.g., TRP 205-a and TRP 205-b).

TABLE 2

Example RB Allocations

| Possibility | Split Rule |
|---|---|
| 1 | half-half, localized |
| 2 | half-half, distributed |
| 3 | ¾-¼, localized |
| 4 | ¾, ¼, distributed |
| . . . | . . . |

In possibility 1, both TRPs are allocated the same number of resources, and the resources for a group are contiguous in frequency. In possibility 2, both TRPs are allocated the same number of resources, and the resources for a group are non-contiguous (e.g., interleaved) in frequency. In possibility 3, one TRP may be allocated a greater proportion of the resources than the other TRP, where the resources for each TRP are contiguous in frequency. In possibility 4, one TRP may be allocated a greater proportion of the resource than the other TRP, where the resources for each TRP may not be contiguous in frequency. Each set of resources allocated to each TRP may be a set of RBs. The different possibility options may reduce the number of bits used to signal the scheme configuration in the DC.

In a TDM scheme, a similar table of possibilities may be used to signal the resource allocation for different TRPs. In this case, each TRP is allocated to different sets of OFDM symbols rather than to different sets of RBs. Such a TDM scheme may support TDMed transmissions within a single slot (e.g., transmission time interval (TTI)). In some cases, a TDM scheme may implement slot aggregation, where transmissions using different TCI states may be spread across different slots (e.g., TTIs). In slot aggregation, the transmissions over the different TRPs may use separate rate matching, but may have the same or different modulation orders.

The network may communicate with UE 115-a using multiple TRPs and any of the communication schemes described herein. Further, some communication schemes may include a combination of TDM and FDM, or cases where TDM may or may not be in a slot aggregation configuration. The schemes may also include some cases where rate matching is joint and some cases where rate matching is separate for different TRPs, and the schemes may also include cases where the different TRPs have the same or different modulation orders. For example, a "multi-TRP scheme" may refer to any number of schemes, including—but not limited to—a joint SDM scheme, a separate SDM scheme, a joint FDM scheme, a separate FDM scheme, a joint TDM scheme, and a separate TDM scheme. In some cases, a joint SDM scheme is referred to as scheme 1a, a joint FDM scheme is referred to as scheme 2a, a separate FDM scheme is referred to as scheme 2b, and a TDM scheme is referred to as scheme 3 or scheme 4. Each scheme may also utilize different parameters that are included in signaling, such as which DMRS ports are used (e.g., for an SDM scheme) or how RBs are split up (e.g., for an FDM scheme).

To efficiently configure UE 115-a with the TCI state information—and the corresponding TRP scheme—base station 105-a may generate bits for a DCI message and may transmit the DCI on PDCCH 210-a. The DCI message may be transmitted to UE 115-a using TRP 205-a. UE 115-a may determine which scheme is configured for communication with TRPs 205 based on one or more fields of the received DCI. The DCI may be the same size across all communication schemes, and the formatting (e.g., number of bits) of DCI fields may remain the same across the communication schemes.

In a first implementation, UE 115-a may detect the communication scheme based on the antenna port(s) field and the TCI field of the received DCI message. The TCI field of the DCI may signify whether communication with one TRP using one TCI state is configured (e.g., TRP 205-a) or communication with multiple TRPs using multiple TCI states is configured (e.g., TRP 205-a and TRP 205-b). For example, a value (e.g., tci-PresentInDCI or another value) in the TCI field may not be configured for the CORESET scheduling the PDSCH, or the value may correspond to one TCI state. The MAC-CE may configure the TCI state possibilities, and the TCI state field of the DCI may indicate the possibility based on the configuration by the MAC-CE. In some cases, other signaling (e.g., DCI, RRC, or some other signaling) may configure the TCI state possibilities. Different values in the TCI state field may correspond to either single TRP communication (e.g., communication with TRP 205-a if a single TCI state is indicated) or multiple TRP communication (e.g., communication with TRPs 205-a and 205-b, 205-a and 205-c, etc. if two TCI states are indicated).

UE 115-a may determine whether the DCI indicates a single TRP communication scheme or a multiple TRP communication scheme based on the value in the TCI field and may interpret the value in the antenna port(s) field of the DCI based on the TCI field value. In cases where the TCI field corresponds to a communication scheme with a single TRP 205, such as TRP 205-a, the UE 115-a may identify the value of the antenna port(s) field for a single TCI state. Based on a table in memory, UE 115-a may determine one or more antenna ports for the scheduled PDSCH 215-a transmission based on the antenna port(s) field value. In cases where the TCI field corresponds to a communication scheme with multiple TRPs 205, such as TRP 205-a and TRP 205-b, the UE 115-a may identify the value of the antenna port(s) field and determine a multi-TRP scheme based on the value. In an example, the antenna port(s) field value may correspond to one or more DMRS ports, a communication scheme, a rate matching configuration, scheme-specific parameters, or some combination of these as shown in the table below. In some examples, the possibility column of the table may correspond to the possibility table above, depicting different RB splits for an FDM scheme.

TABLE 3

Example Antenna Port(s) Table

| Value | DMRS ports | Scheme | Rate Matching | Possibility |
|---|---|---|---|---|
| 0 | {0}, {2} | SDM | Joint | N/A |
| 1 | {0}, {2} | SDM | Separate | N/A |
| 2 | {0, 1}, {2} | SDM | Joint | N/A |
| 3 | {0, 1}, {2} | SDM | Separate | N/A |
| 4 | {0, 1}, {2, 3} | SDM | Joint | N/A |
| 5 | {0, 1}, {2, 3} | SDM | Separate | N/A |
| 6 | 0 | FDM | Joint | RB split 1 |
| 7 | 0 | FDM | Separate | RB split 1 |
| 8 | 0 | FDM | Joint | RB split 2 |
| 9 | 0 | FDM | Separate | RB split 2 |
| 10 | 0, 1 | FDM | Joint | RB split 1 |
| 11 | 0, 1 | FDM | Separate | RB split 1 |
| 12 | 0, 1 | FDM | Joint | RB split 3 |
| 13 | 0, 1 | FDM | Separate | RB split 3 |
| ... | ... | ... | ... | ... |

The tables used to interpret the antenna port(s) field value for single TRP operation and multi-TRP operation may support a same number of values. In this way, the antenna port(s) field size in the DCI may be constant across schemes (e.g., four bits).

In a second implementation, the UE 115-a may determine the communication scheme based on a field explicitly indicating the scheme in a DCI message (e.g., a multi-TCI-scheme field). The value in the multi-TCI scheme field may correspond to a specific multi-TCI scheme (e.g., SDM, FDM, or TDM). If the value in the multi-TCI scheme field corresponds to a TDM scheme, the value may additionally indicate if the TDM scheme is configured for one slot or for multiple slots based on a slot aggregation procedure.

In one example, the UE 115-a may identify a value for the TCI field in the DCI message and may determine whether the communication scheme includes multiple TCI states based on the TCI field value. If the value does not correspond to multiple TCI states, then the UE 115-*a* may ignore (e.g., not process) the multi-TCI scheme field. In some cases, the value of the multi-TCI scheme field may be relevant in cases where the TCI field in the DCI corresponds to more than one TCI state.

In a second example, the UE 115-*a* may determine whether the communication scheme includes multiple TCI states based on the multi-TCI scheme field. For example, a particular value of the multi-TCI scheme field may correspond to a single TCI state. In this example, the value of the multi-TCI scheme field corresponding to the TCI state may be considered to represent a single TRP scheme. Meanwhile, the other values of the multi-TCI scheme field may correspond to different multiple TCI scheme possibilities. The UE 115-*a* may interpret the TCI field based on whether the multi-TCI scheme field indicates single or multiple TRP operation. For example, the same TCI code point index in the TCI field may correspond to either one TCI state or a pair of TCI states based on whether the multi-TCI scheme field indicates single or multiple TRP operation. In this way, a three-bit TCI field may support eight different single TCI state options and eight different pairs for multiple TCI state options.

The UE 115-*a* may interpret the value received in the multi-TCI scheme field based on a table. For example, the value may indicate a certain TRP communication scheme, a rate matching configuration, one or more scheme specific parameters, a modulation order, or any combination of these. An example table is presented below:

TABLE 4

Example Multi-TCI Scheme Table

| Value in the DCI field | Scheme | RM | Possibility |
|---|---|---|---|
| 0 | SDM | Joint | N/A |
| 1 | SDM | Separate | N/A |
| 2 | FDM | Joint | RB split 1 |
| 3 | FDM | Separate | RB split 1 |
| 4 | FDM | Joint | RB split 2 |
| 5 | FDM | Separate | RB split 2 |
| 6 | FDM | Joint | RB split 3 |
| 7 | FDM | Separate | RB split 3 |
| 8 | TDM (within one slot) | Joint | Equal |
| 9 | TDM (within one slot) | Separate | Equal |
| 10 | TDM (slot aggregation) | N/A | 2 repetitions |
| 11 | TDM (slot aggregation) | N/A | 3 repetitions |
| 12 | TDM (slot aggregation) | N/A | 4 repetitions |
| ... | ... | ... | ... |

In some cases, different modulation orders are used in different TCI states. The table above may include an additional or alternative column indicating a modulation order for the second TCI state in a multi-TCI scheme. This modulation order value may be an absolute modulation order or may be a relative modulation order with respect to modulation order for the first TCI state in the multi-TCI scheme.

In some cases, the UE 115-*a* may interpret the antenna port(s) field in the DCI message based on the multi-TCI scheme field. In some examples, UE 115-*a* may determine based on the two fields that a single TRP configuration is used, or that a multiple TRP configuration with TDM or FDM is used. In these examples, UE 115-*a* may determine the antenna ports scheme based on a table supporting a single TCI state (or based on no SDM). In other cases, UE 115-*a* may determine that a multiple TRP configuration with SDM is used. In these other examples, UE 115-*a* may determine the antenna ports scheme based on a table supporting multiple antenna ports for multiple TCI states.

In other cases, the UE 115-*a* may use both the antenna port(s) field and the multi-TCI scheme field to determine the communication scheme. For example, UE 115-*a* may determine whether the multi-TCI scheme is an SDM scheme based on the antenna port(s) field. If not, UE 115-*a* may determine whether the multi-TCI scheme is an FDM or TDM scheme based on the multi-TCI scheme field.

In a third implementation, the UE 115-*a* may determine RVs for the PDSCH 215 transmissions based on the DCI. For example, base station 105-*a* may identify a transport block for transmission to UE 115-*a*. Base station 105-*a* may encode the transport block and transmit coded bits using TRP 205-*a* and TRP 205-*b*. If base station 105-*a* performs joint rate matching, the coded bits for both TCI states may be the same, corresponding to one RV. If base station 105-*a* performs separate rate matching, the coded bits for each TCI state may be different, corresponding to two different RVs. Base station 105-*a* may indicate the one or more RVs in the single DCI message on the PDCCH 210-*a*. If indicating one RV (e.g., for a single TCI operation or when performing joint rate matching), base station 105-*a* may indicate the one RV in an RV field in the DCI. If indicating multiple (e.g., two) RVs, base station 105-*a* may indicate a pair of RVs in one or more DCI fields.

In a first example, a first RV may be indicated in the RV field of the DCI and a second RV may be indicated in another field in the DCI. For example, the second RV may be indicated in the antenna port(s) field of the DCI, the multi-TCI scheme field of the DCI, or some combination of these.

In a second example, the antenna port(s) field or the multi-TCI scheme field of the DCI as described herein may indicate a rate matching configuration. If the UE 115-*a* determines that the base station 105-*a* performed separate rate matching, the UE 115-*a* may interpret the value in the RV field to indicate separate RV values for the different TCI states. For example, the value of the RV field may correspond to an RV pair, where the first RV value in the pair may correspond to a first TCI state and the second RV value in the pair may correspond to a second TCI state. The value-to-RV pair correspondence may be specified in a table (e.g., a lookup table). This table may be pre-configured in memory at the UE 115-*a* and base station 105-*a*, or the network may configure UE 115-*a* with the table.

TABLE 5

Example RV Pair Indications

| Value of RV field | RV Pair |
|---|---|
| 0 | (0, 0) |
| 1 | (0, 2) |
| 2 | (2, 0) |
| 3 | (0, 3) |

In a third example, the rate matching configuration may also be indicated in the RV field. For example, the value of the RV field may correspond to either a single RV or multiple RVs, as shown in the example RV table below. In some cases, UE 115-*a* may use this table to interpret the RV field when determining that a multi-TRP scheme is configured. This table may be specified as a lookup table and may be pre-configured or dynamically configured by the network. If the value of the RV field corresponds to a single RV value for multi-TRP operation, UE 115-a may determine that the base station 105-a is performing joint rate matching. For example, joint rate matching may involve one RV corresponding to one codeword. If the value of the RV field corresponds to a pair of RV values for multi-TRP operation, UE 115-a may determine that the base station 105-a is performing separate rate matching. For example, separate rate matching may involve two RVs corresponding to two codewords (e.g., where a first RV of an RV pair corresponds to a first codeword and a second RV of the RV pair corresponds to a second, separate codeword). In some cases, the values of the RVs may be the same or different.

TABLE 6

Example Joint/Separate Rate Matching Indication using the RV Field

| Value of RV field | RV |
|---|---|
| 0 | 0 |
| 1 | 2 |
| 2 | (0, 0) |
| 3 | (0, 2) |

In a fourth implementation, the UE 115-a may determine how to interpret an indication of PRG size in the DCI based on the configured multi-TRP scheme. If the UE 115-a determines that the multi-TCI scheme is an FDM scheme (e.g., based on either the antenna port(s) field or the multi-TCI field), then the UE 115-a may interpret the PRB bundling size indicator field in the DCI per TCI state, as opposed to per bandwidth part. For example, if the PRB bundling size indicator field indicates wideband precoding, the wideband precoding configuration may include wideband communication within RB s associated with a same TCI state.

It is to be understood that wireless communications system 200 may implement any combination of the implementations described herein to dynamically signal the TCI states for a selected multi-TRP scheme in a single DCI message.

Figure 3:
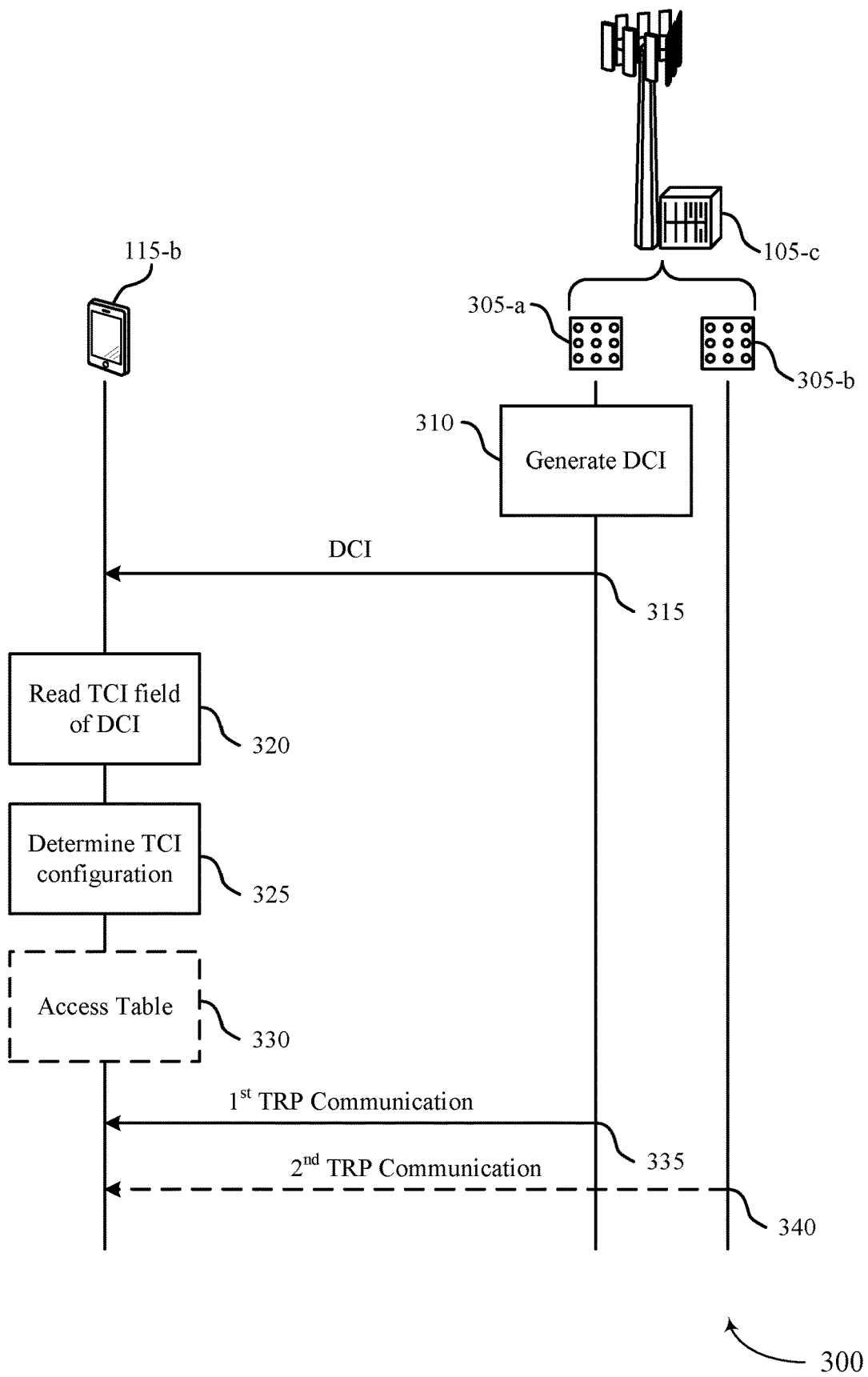
FIGS. 3 through 6 illustrate examples of process flows that support dynamic switching between different multi-TRP schemes in accordance with aspects of the present disclosure.

FIG. 3 illustrates an example of a process flow 300 that supports dynamic switching between different multi-TRP schemes in accordance with aspects of the present disclosure. In some examples, process flow 300 may implement aspects of a wireless communications system 100 or 200. For example, a base station 105 and UE 115, such as base station 105-c and UE 115-b, may perform one or more of the processes described with reference to process flow 300. Base station 105-c may communicate with UE 115-b by transmitting and receiving signals through TRPs 305-a and 305-b. In other cases, TRPs 305-a and 305-b may correspond to different base stations 105. Alternative examples of the following may be implemented, where some steps are performed in a different order than described or are not performed at all. In some cases, steps may include additional features not mentioned below, or further steps may be added.

At 310, base station 105-c may generate DCI. The generation may include generating a first set of bits (e.g., a TCI field) that may indicate a set of TCI states for communication with UE 115-b. In some cases, the first set of bits may be included in a TCI field of the DCI, or a different field of the DCI, or a different message. The generation may also include generating a second set of bits (e.g., an antenna port(s) field) that may indicate a set of antenna ports and, in some cases, a multi-TRP communication scheme for multiple TRP communication operation. In some cases, the second set of bits may be included in an antenna port field of the DCI, or a different field of the DCI, or a different message. In some cases, the second set of bits may additionally indicate a modulation order for at least one TCI state (e.g., a second TCI state for TRP 305-b), an RV for a TB for at least one TCI state (e.g., the second TCI state for TRP 305-b), or a combination thereof.

At 315, base station 105-c may transmit the generated DCI to UE 115-b. UE 115-b may receive the DCI from base station 105-c. The DCI may be transmitted on a PDCCH from TRP 305-a. The DCI may schedule upcoming PDSCH transmissions and may include other control information. The DCI may include an indication of the first set of bits and the second set of bits. For example, the DCI may include coded bits based on the first set of bits and the second set of bits.

At 320, UE 115-b may read the TCI field (e.g., the first set of bits) received in the DCI message. UE 115-b may identify, using the first set of bits, one or more TCI states for communication with base station 105-c using one or more TRPs 305.

At 325, UE 115-b may determine the TCI state configuration based on reading the TCI field of the DCI. For example, a value (e.g., tci-PresentInDCI) in the TCI field may not be configured for the CORESET scheduling the PDSCH, or the value may correspond to one TCI state. In these cases, the communication scheme may be configured for one TRP. In other cases, the TCI field value may correspond to more than one TCI state. In these other cases, the communication may be configured for communication with multiple TRPs.

UE 115-b may read the antenna port(s) field of the DCI and may interpret the value of the field based on the determined TCI state configuration. For example, if UE 115-b determines that the TCI field indicates a single TCI state, UE 115-b may identify, using the second set of bits, a set of antenna ports for the PDSCH transmission. In some cases, at 330, UE 115-b may access a lookup table (e.g., pre-configured in memory or configured by the network) to determine one or more antenna ports corresponding to the antenna port(s) field value.

Alternatively, if UE 115-b determines that the TCI field indicates multiple TCI states, UE 115-b may identify, using the second set of bits, a set of antenna ports and a multi-TRP communication scheme based on identifying the set of TCI states. The second set of bits may include the same number of bits whether the field indicates just the set of antenna ports for single TRP operation or the set of antenna ports and the multi-TRP scheme for multi-TRP operation. At 330, UE 115-b may access a lookup table to determine the set of antenna ports and multi-TRP scheme based on the antenna port(s) field value. In some cases, UE 115-b may select the lookup table from a set of lookup tables, where the set may include one lookup table to use for single TRP operation and one lookup table to use for multiple TRP operation. An example lookup table is shown below.

TABLE 3

Example Antenna Port(s) Table

| Value | DMRS Ports | Scheme | RM | Possibility |
|---|---|---|---|---|
| 0 | {0}, {2} | SDM | Joint | N/A |
| 1 | {0}, {2} | SDM | Separate | N/A |
| 2 | {0, 1}, {2} | SDM | Joint | N/A |

TABLE 3-continued

Example Antenna Port(s) Table

| Value | DMRS Ports | Scheme | RM | Possibility |
|---|---|---|---|---|
| 3 | {0, 1}, {2} | SDM | Separate | N/A |
| 4 | {0, 1}, {2, 3} | SDM | Joint | N/A |
| 5 | {0, 1}, {2, 3} | SDM | Separate | N/A |
| 6 | 0 | FDM | Joint | RB split 1 |
| 7 | 0 | FDM | Separate | RB split 1 |
| 8 | 0 | FDM | Joint | RB split 2 |
| 9 | 0 | FDM | Separate | RB split 2 |
| 10 | 0, 1 | FDM | Joint | RB split 1 |
| 11 | 0, 1 | FDM | Separate | RB split 1 |
| 12 | 0, 1 | FDM | Joint | RB split 3 |
| 13 | 0, 1 | FDM | Separate | RB split 3 |
| ... | ... | ... | ... | ... |

The lookup table may include information mapping both the set of antenna ports and the multiple TRP scheme to the second set of bits. In some cases, the lookup table mapping both the set of antenna ports and the multiple TRP communication scheme to the second set of bits may be preconfigured in memory, and in some cases the lookup table may be dynamically configured by base station 105-c. UE 115-b may identify the second set of antenna ports and multiple TRP schemes based on the selected lookup table. In the lookup table for multi-TRP operation, along with indications of the DMRS ports, the table may include indications of the multiple TRP scheme (e.g., SDM, FDM, TDM, or some combination thereof). The antenna port(s) field lookup table may indicate that a value in the antenna port(s) field of the DCI corresponds to a set of DMRS ports, where the set of DMRS ports further corresponds to a communication scheme, such as SDM or FDM. The antenna port(s) field value may also indicate if rate matching is joint or separate. If the antenna port(s) field value indicates the use of an FDM communication scheme, the table may additionally indicate an RB configuration for the FDMed TCI states, as shown in the "Possibility" column of the table below. If the lookup tables are configurable by the network, then the network may define the sets of possible DMRS ports and the type of schemes using RRC signaling.

In the case of single TRP communication, UE 115-b may interpret the antenna port(s) field using a table that maps to one or more antenna ports, as shown below:

TABLE 7

Example Antenna Port(s) Table for a Single Codeword
One Codeword

| DMRS Type Value | Number of DMRS CDM Groups without Data | DMRS Antenna Ports |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0, 2 |
| 10 | 2 | 0, 3 |
| 11 | 2 | 0, 2 |
| 12-15 | Reserved | Reserved |

In some cases, UE 115-b may select between this table and the table indicating the multi-TRP schemes based on the TCI field value.

In some cases, UE 115-b may identify, using the second set of bits, a modulation order for at least one TCI state of the set of possible TCI states. Different modulation orders may also be used across different TCI states. A first modulation order may be indicated in a modulation order field. The first modulation order may correspond to a first TCI state in a multi-TRP operation. A second modulation order may be indicated in one of the tables above based on the received value for the antenna port(s) field. For example, a column in the antenna port(s) field lookup table may indicates if the modulation order corresponding to the second TCI state is the same as the modulation order indicated in the MCS (i.e., the modulation order for the first TCI state). If the modulation order is not the same as the modulation order indicated in the MCS, then the value of the modulation order for the second TCI state may be indicated in the antenna port(s) field. The value of the modulation order may be an absolute value or may be a relative value with respect to the first modulation order.

If the TCI state configuration is determined to indicate communication with a single TRP, then UE 115-b may receive a transmission from one TRP 305-a at 335. UE 115-b may communicate with the single TRP 305-a based on the determined communication scheme.

If the TCI state configuration is determined to indicate communication with multiple TRPs 305, UE 115-b may receive a transmission from one TRP 305-a at 335 and may also receive a transmission from another TRP 305-b at 340 (where, in some cases, 335 and 340 may correspond to a same time or OFDM symbol). UE 115-b may communicate with the network via the multiple configured TRPs 305 based on the determined communication scheme.

Figure 4:
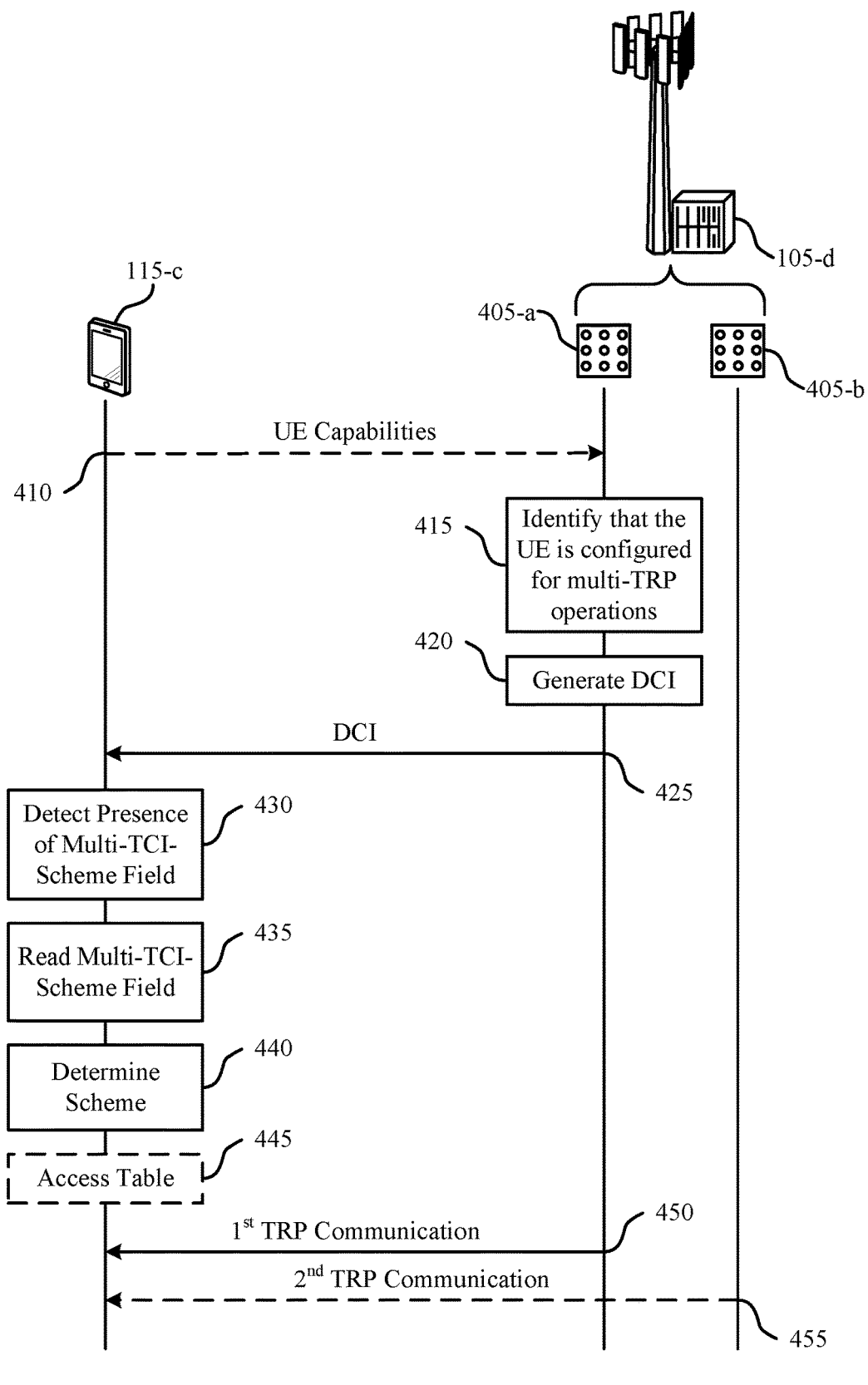

FIG. 4 illustrates an example of a process flow 400 that supports dynamic switching between different multi-TRP schemes in accordance with aspects of the present disclosure. In some examples, process flow 400 may implement aspects of a wireless communications system 100 or 200. For example, a base station 105 and UE 115, such as base station 105-d and UE 115-c, may perform one or more of the processes described with reference to process flow 400. Base station 105-d may communicate with UE 115-c by transmitting and receiving signals through TRPs 405-a and 405-b. In other cases, TRPs 405-a and 405-b may correspond to different base stations 105. Alternative examples of the following may be implemented, where some steps are performed in a different order than described or are not performed at all. In some cases, steps may include additional features not mentioned below, or further steps may be added.

UE 115-c may determine whether the communication is configured for single or multiple TRP communication based on the TCI state field in the DCI. In one example, the value of the multiple TCI state field may determine that the communication scheme includes multiple TCI states, and if the value does not correspond to multiple TCI states then the multiple TCI state field can be ignored, because the value may determine that the communication system is configured for communication with a single TRP. In this example, the value of the new field may be relevant in cases where the TCI field in the DCI corresponds to more than one TCI state. In a second example, one of the possible values of the multiple TCI scheme field may correspond to a single TCI state (corresponding to communication with a single TRP), and the other values may correspond to different multiple TCI states (corresponding to communication with multiple TRPs).

In some cases, at 410, UE 115-c may send an indication of its configuration and/or capabilities to base station 105-d.

The signal may be transmitted through TRP 405-a. Base station 105-d may receive the indication of the capabilities of UE 115-c. UE 115-c may indicate whether UE 115-c is configured for or capable of multi-TRP operation. At 415, base station 105-d may determine that UE 115-c is configured for multi-TRP communication and operation (e.g., based on the capabilities of UE 115-c).

At 420, base station 105-d may generate the DCI. The generation of the DCI may include generating a first set of bits (e.g., a TCI field) indicating one or more TCI states for communication with UE 115-c. The generation of the DCI may also include generating a second set of bits (e.g., a multi-TCI scheme field) based on UE 115-c being configured for multi-TRP operation. In some cases, UEs 115 not configured for multi-TRP operation may not be configured to process the multi-TCI scheme field. In some cases, this field may exist in non-fallback DCI when UE 115-c is configured for multi-TCI transmission, and the field may not exist in one or more other forms of DCI. The second set of bits may indicate a multi-TRP communication scheme for multi-TRP operation or may indicate a single TRP scheme. The generation of the second set of bits may include determining that configuration is for multiple TCI states (e.g., as opposed to a single-TCI state configuration). The generation of the second set of bits may include identifying the second set of bits based on a lookup table mapping the multi-TRP scheme for the TCI states to the second set of bits. In some cases, the second set of bits may be generated based on whether the first set of bits indicates one TCI state or multiple TCI states. In other cases, the first set of bits may be generated based on whether the second set of bits indicates the multi-TRP scheme or the single TRP scheme. Base station 105-d may configure a lookup table for interpreting the multi-TCI scheme field and may transmit the lookup table to UE 115-c through TRP 405-a.

At 425, base station 105-d may transmit the DCI message to UE 115-c using TRP 405-a. The DCI may be transmitted in a PDCCH by TRP 405-a. UE 115-c may receive the DCI message from base station 105-d. UE 115-c may identify, using the first set of bits, one or more TCI states for communication with base station 105-d. The one or more TCI states may include a single TCI state or multiple TCI states.

At 430, UE 115-c may detect the presence of the multi-TCI scheme field in the DCI. At 435, UE 115-c may read the multi-TCI scheme field of the DCI. UE 115-c may identify, using the second set of bits and based on UE 115-c being configured for multi-TRP operation, a multi-TRP scheme for multi-TRP operation or a single TRP scheme for single TRP operation. In some cases, UE 115-c may identify that the multi-TRP scheme is an SDM multi-TRP scheme. The DCI message may include a third set of bits (e.g., an antenna port(s) field) indicating a set of antenna ports for communication with UE 115-c. A first set of antenna ports of the set of antenna ports may correspond to a first TCI state of the set of TCI states and a second set of antenna ports of the set of antenna posts may correspond to a second TCI state of the set of possible TCI states. In some cases, the antenna port(s) field and the multi-TCI scheme field may both be used to determine a communication scheme for multi-TRP operation.

At 440, UE 115-c may determine the communication scheme based on the multi-TCI scheme field of the DCI. In one example, the multi-TRP scheme or the single TRP scheme may be identified based on whether the first set of bits indicates one TCI state or a set of different TCI states. In a second example, the multi-TRP scheme field may indicate either multi-TRP scheme or single TRP scheme operation, and the TCI field (e.g., the first set of bits) may be interpreted based on whether single or multiple TRPs are indicated in the second set of bits. In some cases, UE 115-c may also identify, using the second set of bits, a modulation order for at least one TCI state of the set of possible TCI states. Additionally or alternatively, UE 115-c may identify, using the second set of bits, an RV for a transport block for at least one TCI state of the set of possible TCI states.

At 445, UE 115-c may access a lookup table (e.g., the lookup table shown below) in order to determine the communication scheme based on the determined value in the multi-TCI scheme field of the DCI. The lookup table may be preconfigured in memory or may be transmitted to UE 115-c by base station 105-d after configuration at the base station 105-d.

TABLE 4

Example Multi-TCI Scheme Table

| Value in the DCI Field | Scheme | RM | Possibility |
|---|---|---|---|
| 0 | SDM | Joint | N/A |
| 1 | SDM | Separate | N/A |
| 2 | FDM | Joint | RB split 1 |
| 3 | FDM | Separate | RB split 1 |
| 4 | FDM | Joint | RB split 2 |
| 5 | FDM | Separate | RB split 2 |
| 6 | FDM | Joint | RB split 3 |
| 7 | FDM | Separate | RB split 3 |
| 8 | TDM (within one slot) | Joint | Equal |
| 9 | TDM (within one slot) | Separate | Equal |
| 10 | TDM (slot aggregation) | N/A | 2 repetitions |
| 11 | TDM (slot aggregation) | N/A | 3 repetitions |
| 12 | TDM (slot aggregation) | N/A | 4 repetitions |
| ... | ... | ... | ... |

If UE 115-c determines that the system is configured for single TRP communication, then at 450 UE 115-c may receive a PDSCH transmission from a single TRP 405-a. If UE 115-c determines that the system is configured for multiple TRP communication, then at 450, UE 115-c may receive a PDSCH transmission from TRP 405-a and may also receive a PDSCH transmission from TRP 405-b at 455.

Figure 5:
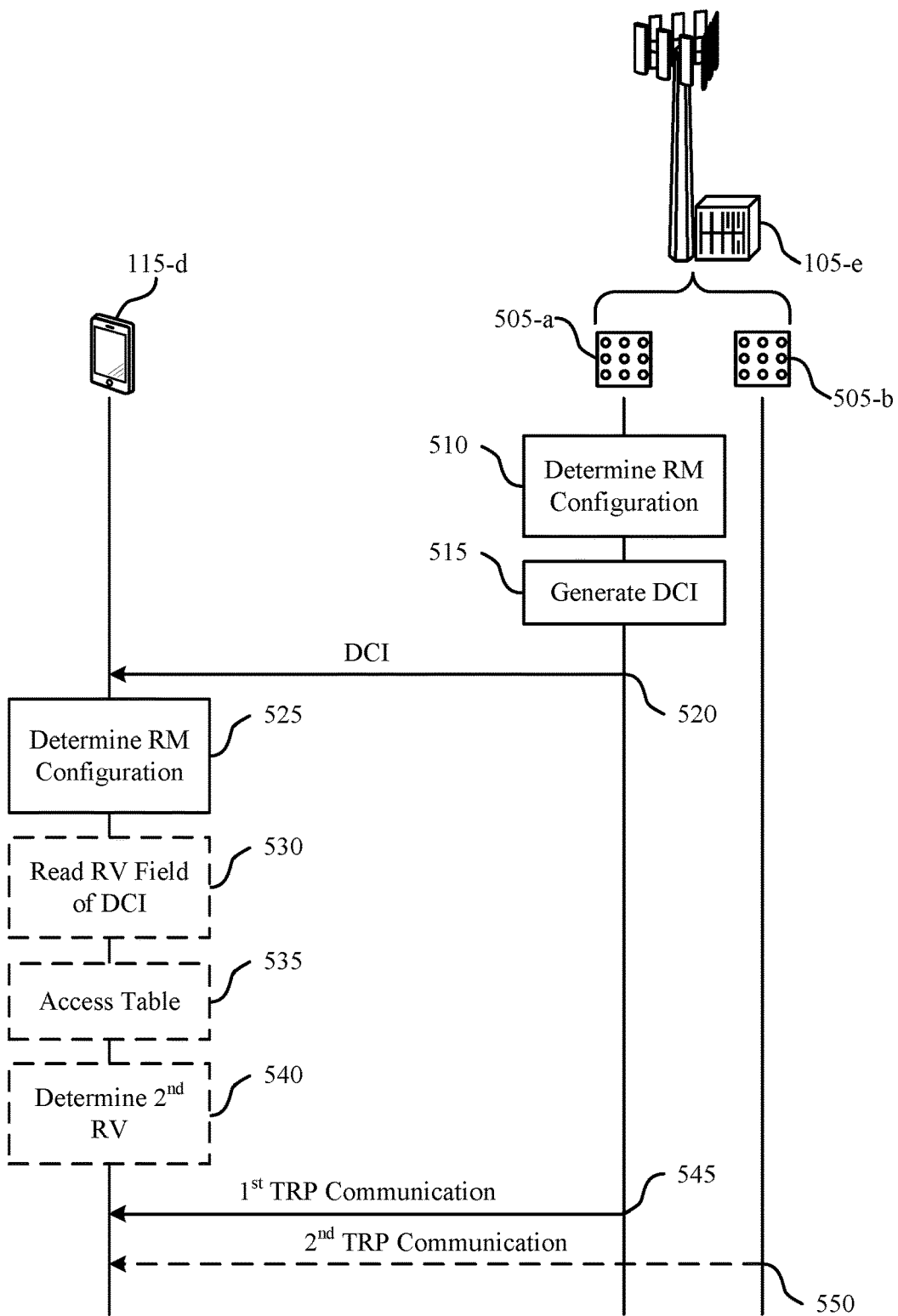

FIG. 5 illustrates an example of a process flow 500 that supports dynamic switching between different multi-TRP schemes in accordance with aspects of the present disclosure. In some examples, process flow 500 may implement aspects of a wireless communications system 100 or 200. For example, a base station 105 and UE 115, such as base station 105-e and UE 115-d, may perform one or more of the processes described with reference to process flow 500. Base station 105-e may communicate with UE 115-d by transmitting and receiving signals through TRPs 505-a and 505-b. In other cases, TRPs 505-a and 505-b may correspond to different base stations 105. Alternative examples of the following may be implemented, where some steps are performed in a different order than described or are not performed at all. In some cases, steps may include additional features not mentioned below, or further steps may be added. In some cases, one or more processes described with reference to FIG. 5 may be implemented in combination with examples described with reference to FIG. 3, FIG. 4, or a combination thereof.

At 510, base station 105-e may determine a rate matching configuration. Base station 105-e may determine to transmit to a UE 115-d using a set of TCI states. The communication may include performing a rate matching procedure that may involve joint rate matching or separate rate matching for a TB. In joint rate matching, base station 105-*e* may generate the same coded bits for transmission for multiple TCI states based on the TB. In separate rate matching, base station 105-*e* may generate the coded bits for transmission for each TCI state separately for the TB. Accordingly, for two TCI states, joint rate matching may result in a single RV while separate rate matching may result in two RVs (one for each TCI state).

At 515, base station 105—may generate DCI. Base station 105-*e* may generate a set of bits based on the rate matching procedure, where the set of bits indicates a joint RV for the first and second TCI states or separate RVs, a first RV corresponding to a first TCI state and a second RV corresponding to a second TCI state. In some cases, base station 105-*e* may configure one or more lookup tables for UE 115-*d* to use to interpret an RV field in the DCI message. In other cases, the one or more lookup tables may be pre-configured in memory at base station 105-*e* and UE 115-*d*. The generation of the set of bits by base station 105-*e* may be based on a lookup table mapping one or more RVs to the set of bits.

At 520, base station 105-*e* may transmit the DCI message to UE 115-*d* (e.g., using TRP 505-*a*). The DCI may include an RV field. UE 115-*d* may receive the DCI message from base station 105-*d*. In some cases, the DCI may additionally include a second set of bits indicating whether the rate matching procedure involves joint rate matching or separate rate matching.

At 525, UE 115-*d* may determine the rate matching configuration of the communication system based on the DCI. UE 115-*d* may determine whether the rate matching is joint or separate. In some cases, base station 105-*e* may perform a slot aggregation procedure over a set of slots. If the base station 105-*e* performs separate rate matching, the set of bits (e.g., the RV field) may further indicate RVs for different slots and/or different TCI states.

At 530, UE 115-*d* may read the RV field of the DCI. At 535, UE 115-*d* may access one or more lookup tables. UE 115-*d* may select between a first lookup table and a second lookup table. The first lookup table may map the RV field value to a single RV (e.g., for joint rate matching) and the second lookup table may map the RV field value to a combination of the first RV and the second RV (e.g., for separate rate matching). The first lookup table and the second lookup table may be preconfigured in memory or configured by the network.

Based on the RV field, UE 115-*d* may determine a first RV (e.g., corresponding to a first TCI state). At 540, if base station 105-*e* implemented separate rate matching, UE 115-*d* may determine the second RV. The second RV may be determined based on the RV field or another field in the DCI.

In cases where the rate matching is separate for the different TCI states, in some cases the first RV may be indicated in the RV field of the DCI and a second RV may be signaled in the antenna port(s) field of the DCI, in the multi-TCI scheme field of the DCI, or in some combination of these fields. In these cases, UE 115-*d* may read the RV field of the DCI at 520 to determine the first RV, and the UE 115-*d* may read either the antenna port(s) field or the multi-TCI scheme field at 525 to determine the second RV. UE 115-*d* may use the determined RVs to successfully receive the scheduled PDSCH transmissions from the multiple TRPs 505-*a* and 505-*b* at 550.

Alternatively, a field in the DCI (e.g., the antenna port(s) field or the multi-TCI scheme field of the DCI as described herein) may indicate a configuration for separate rate matching and, correspondingly, different RVs for the different TCI states. In this case, UE 115-*d* may read the RV field in the DCI at 520. UE 115-*d* may determine a pair of RVs corresponding to the RV field value (e.g., as shown in the example table below), where the first RV value of the pair may correspond to a first TCI state and the second RV value of the pair may correspond to a second TCI state. This table may be specified as a lookup table or may be configured by the network. UE 115-*d* may select this table when identifying separate rate matching for multiple TRPs and may instead select a table mapping each RV field value to a single RV when identifying single or joint rate matching.

TABLE 5

Example RV Pair Indication

| Value of RV field | RV Pair |
|---|---|
| 0 | (0, 0) |
| 1 | (0, 2) |
| 2 | (2, 0) |
| 3 | (0, 3) |

In some cases, UE 115-*b* may interpret the RV field value after UE 115-*b* determines that the configured multi-TCI scheme is a TDM slot aggregation scheme. UE 115-*b* may determine the number of repetitions (e.g., a number of slots or TTIs for the slot aggregation) and may interpret the RV field based on this determination. In cases where slot aggregation is used and there are three repetitions, UE 115-*b* may interpret the RV field based on the following table, for example, where i corresponds to the first TCI state and j corresponds to the second TCI state.

TABLE 8

Example RV Table for Three Repetitions

| Value of RV Field | First Slot (RV, TCI State) | Second Slot (RV, TCI State) | Third Slot (RV, TCI State) |
|---|---|---|---|
| 0 | 0, i | 0, j | 2, i |
| 1 | 0, i | 0, j | 2, j |
| 2 | 0, i | 3, i | 3, j |
| 3 | 0, i | 0, j | 0, i |

In cases where slot aggregation is used and there are four repetitions, UE 115-*b* may interpret the RV field based on the following table, in another example.

TABLE 9

Example RV Table for Four Repetitions

| Value of RV Field | First Slot (RV, TCI State) | Second Slot (RV, TCI State) | Third Slot (RV, TCI State) | Fourth Slot (RV, TCI State) |
|---|---|---|---|---|
| 0 | 0, i | 0, i | 2, i | 2, j |
| 1 | 0, i | 0, j | 2, j | 3, i |
| 2 | 0, i | 1, i | 3, j | 0, j |
| 3 | 0, j | 1, j | 0, i | 0, i |

In other cases, whether rate matching is joint or separate may also be indicated in the RV field (e.g., and not as part of either the antenna port(s) field or the multi-TCI scheme field). In these cases, UE 115-*d* may read the RV field of the DCI at 520 and may access a lookup table (e.g., the lookup table shown below) at 535 to determine the rate matching. For example, different RV field values may correspond to either one RV or multiple RVs. For the table shown below, RV field values of 0 or 1 may correspond to single or joint rate matching while RV field values of 2 or 3 may correspond to separate rate matching for two TCI states. This table may be specified as a lookup table or may be configured by the network.

TABLE 6

Example Joint/Separate Rate Matching Indication using the RV Field

| Value of RV field | RV |
| --- | --- |
| 0 | 0 |
| 1 | 2 |
| 2 | (0, 0) |
| 3 | (0, 2) |

Once UE 115-d determines the RVs, UE 115-d may receive the PDSCH transmissions from the network according to these RVs. For example, UE 115-d may receive a first PDSCH transmission corresponding to a first RV from TRP 505-a at 545 and may receive a second PDSCH transmission corresponding to either the same RV or a second RV from TRP 505-b at 550.

Figure 6:
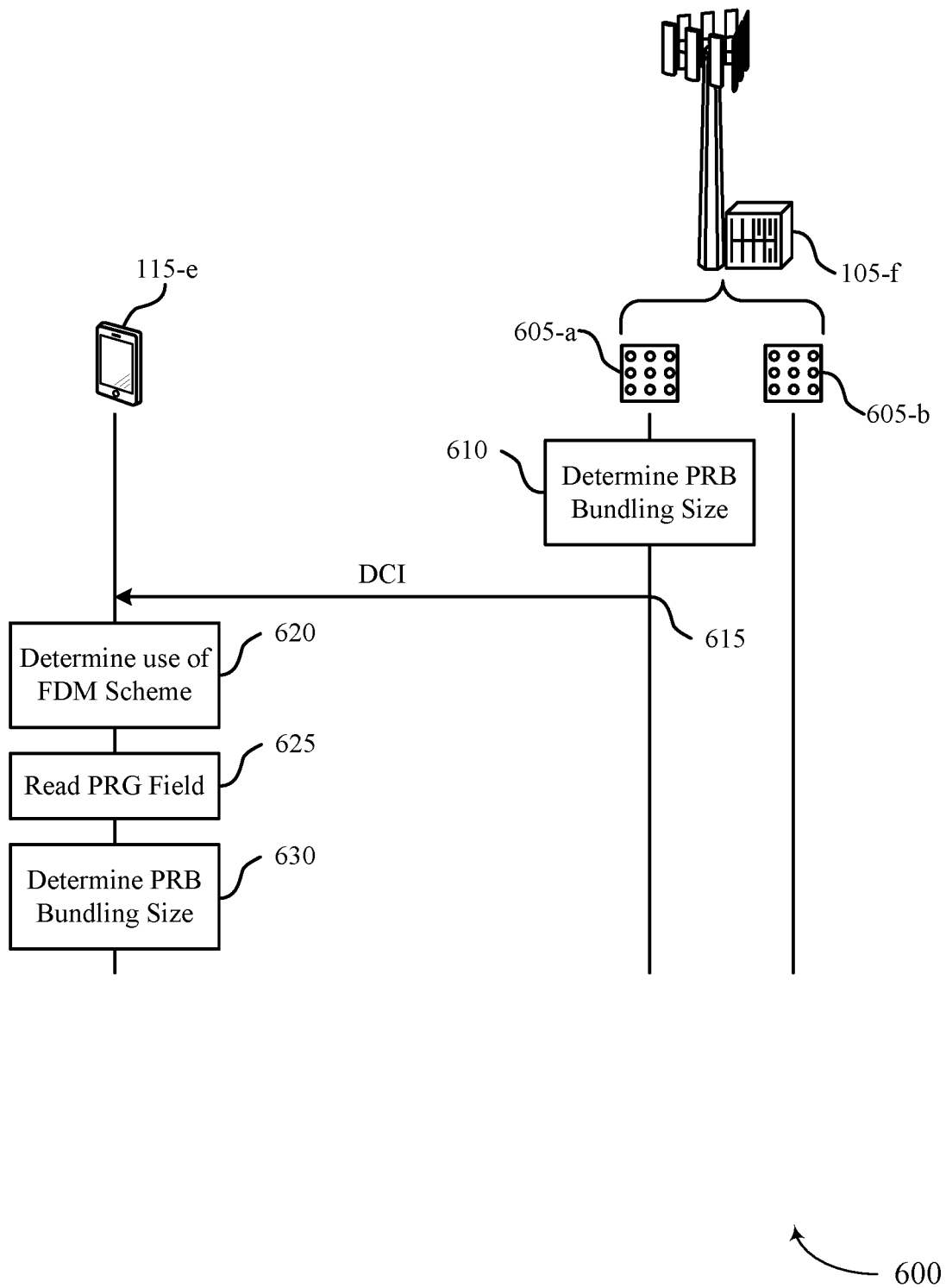

FIG. 6 illustrates an example of a process flow 600 that supports dynamic switching between different multi-TRP schemes in accordance with aspects of the present disclosure. In some examples, process flow 600 may implement aspects of a wireless communications system 100 or 200. For example, a base station 105 and UE 115, such as base station 105-f and UE 115-e, may perform one or more of the processes described with reference to process flow 600. Base station 105-f may communicate with UE 115-e by transmitting and receiving signals through TRPs 605-a and 605-b. In other cases, TRPs 605-a and 605-b may correspond to different base stations 105. Alternative examples of the following may be implemented, where some steps are performed in a different order than described or are not performed at all. In some cases, steps may include additional features not mentioned below, or further steps may be added. In some cases, one or more processes described with reference to FIG. 6 may be implemented in combination with examples described with reference to FIG. 3, FIG. 4, FIG. 5, or a combination thereof.

At 610, base station 105-f may determine a PRB bundling scheme. PRBs may be bundled into PRGs, where a PRG determines the unit of contiguous RBs over which the same precoding is used by base station 105-f. In some cases, UE 115-e or base station 105-f may use a PRG as a unit for joint channel estimation. In some implementations, the PRG size may be one of a set of values (e.g., either 2 RBs, 4 RBs, or wideband). In some cases, the PRG size is semi-statically indicated through RRC signaling. In other cases, base station 105-f may dynamically signal the PRG size (e.g., if a higher layer parameter "prb-BundlingType" is set to "dynamic") using a PRB bundling size indicator field in the DCI. The PRB bundling size indicator field may include one bit. Base station 105-f may set the value of this bit to indicate whether to use bundleSizeSet1 or bundleSizeSet2. BundleSizeSet1 and bundleSizeSet2 may be higher layer parameters that configure two sets of PRG values, where the first set can take one or two PRG sizes (e.g., from among 2 RBs, 4 RBs, or wideband) and the second set can take one PRG size (e.g., from among 2 RBs, 4 RBs, or wideband).

The "wideband" PRG size may apply to all RBs in a scheduled bandwidth part for transmission. However, this definition of wideband may not be relevant in cases where an FDM multi-TRP scheme is used, as the bandwidth part may be split between multiple TCI states. If UE 115-e determines that a multiple TCI state FDM scheme is configured by base station 105-f, UE 115-e may interpret the PRB bundling size indicator field of the DCI differently than for other communication schemes. Based on the FDM scheme, UE 115-e may determine that if the PRB bundling size indicator field corresponds to a wideband configuration, wideband across the scheduled bandwidth part does not apply. Instead, if the PRB bundling size indicator field corresponds to the wideband configuration, the wideband configuration applies within the PRBs associated with each specific TCI state. That is, the same precoding can be assumed for the PRBs corresponding to a first TCI state but not for the PRBs corresponding to a second TCI state. This may apply when the scheduled PRBs corresponding to the TCI state are contiguous in frequency and the size of the scheduled PRBs corresponding to the TCI state meets a threshold size. For example, the threshold may be one-fourth the size of the scheduled bandwidth part.

As illustrated, base station 105-f may configure DCI for transmission through TRP 605-a. For example, base station 105-f may set the PRB bundling size indicator field in the DCI message based on the precoding performed at base station 105-f. At 615, base station 105-f may transmit the DCI message to UE 115-e using TRP 605-a. In some cases, base station 105-f may determine to transmit to UE 115-e using a set of TCI states in an FDM multi-TRP scheme. Base station 105-f may determine a first PRG size for precoding transmissions for a first TCI state of the set of TCI states and a second PRG size for precoding transmissions for a second TCI state of the set of TCI states based on the FDM multi-TRP scheme. Base station 105-f may generate a bit (e.g., the PRB bundling size indicator field) indicating the first PRG size and the second PRG size. The DCI transmission at 615 may include an indication of the bit. In some cases, the first PRG size may be a first pre-configured number of PRBs (e.g., 2 or 4) or a number of PRBs in the first set of PRBs (e.g., wideband within the RBs for the first TCI state). The second PRG size may include a second pre-configured number of PRBs (e.g., 2 or 4) or a number of PRBs in the second set of PRBs (e.g., wideband within the RBs for the second TCI state).

At 620, UE 115-e may determine the use of an FDM communication scheme. For example, UE 115-e may determine the FDM multi-TRP scheme by either checking the TCI field and antenna port(s) field of the DCI or by checking the multi-TCI scheme field.

At 625, UE 115-e may read the PRG field of the DCI. Based on reading the PRG field, UE 115-e may determine the PRB bundling size at 630. The first PRG size may be the number of PRBs in the first set of PRBs (e.g., wideband within the RBs for the first TCI state) if the first set of PRBs is contiguous in frequency and if a frequency size of the first set of PRBs is greater than a threshold frequency size (e.g., one fourth the size of the scheduled bandwidth part, one half the size of the scheduled bandwidth part, etc.). The second PRG size may be the number of PRBs in the second set of PRBs (e.g., wideband within the RBs for the second TCI state) if the second set of PRBs is contiguous in frequency and if a frequency size of the second set of PRBs is greater than the threshold frequency size.

Figure 7:
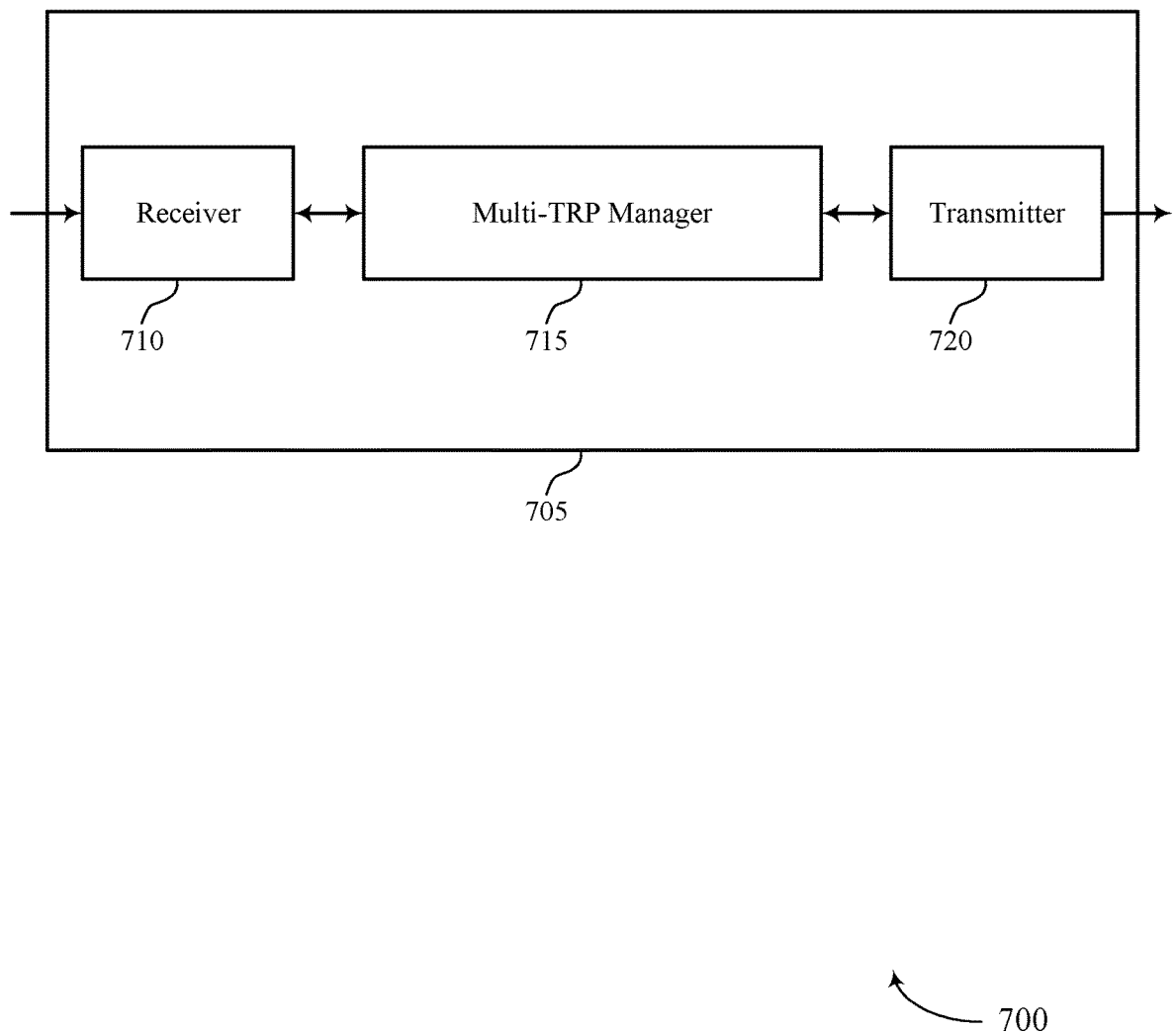
FIGS. 7 and 8 show block diagrams of devices that support dynamic switching between different multi-TRP schemes in accordance with aspects of the present disclosure.

FIG. 7 shows a block diagram 700 of a device 705 that supports dynamic switching between different multi-TRP schemes in accordance with aspects of the present disclosure. The device 705 may be an example of aspects of a UE 115 as described herein. The device 705 may include a receiver 710, a multi-TRP manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to dynamic switching between different multi-TRP schemes). Information may be passed on to other components of the device 705. The receiver 710 may be an example of aspects of the transceiver 1020 described with reference to FIG. 10. The receiver 710 may utilize a single antenna or a set of antennas.

In some implementation, the multi-TRP manager 715 may receive, from a base station, a DCI message including an indication of a first set of bits and a second set of bits, identify, using the first set of bits, a set of TCI states for communication with the base station, and identify, using the second set of bits, a set of antenna ports and a multi-TRP scheme from a set of possible schemes for multi-TRP operation based on the identifying the set of TCI states.

In other implementations, the multi-TRP manager 715 may receive, from a base station, a DCI message including an indication of a first set of bits and a second set of bits, identify, using the first set of bits, one or more TCI states for communication with the base station, and identify, using the second set of bits and based on the UE (e.g., the device 705) being configured for multi-TRP operation, a multi-TRP scheme from a set of possible schemes for multi-TRP operation or a single-TRP scheme for single-TRP operation.

Additionally or alternatively, the multi-TRP manager 715 may receive, from a base station, a DCI message including an indication of a set of bits, determine a rate matching procedure performed by the base station, where the rate matching procedure includes joint rate matching or separate rate matching of a TB for a first TCI state of a set of TCI states and a second TCI state of the set of TCI state, and identify, using the set of bits and based on the rate matching procedure, a joint RV for the first TCI state and the second TCI state if the rate matching procedure includes joint rate matching or a first RV for the first TCI state and a second RV for the second TCI state if the rate matching procedure includes separate rate matching.

Additionally or alternatively, the multi-TRP manager 715 may receive, from a base station, a DCI message including an indication of a bit, determine to receive transmissions from the base station using a set of TCI states in an FDM multi-TRP scheme, where the set of TCI states includes a first TCI state and a second TCI state, and identify, using the bit, a first PRG size and a second PRG size based on a first set of PRBs corresponding to the first TCI state and a second set of PRBs corresponding to the second TCI state. The multi-TRP manager 715 may be an example of aspects of the multi-TRP manager 1010 described herein.

The multi-TRP manager 715, or its sub-components, may be implemented in hardware, code (e.g., software or firmware) executed by a processor, or any combination thereof. If implemented in code executed by a processor, the functions of the multi-TRP manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The multi-TRP manager 715, or its sub-components, may be physically located at various positions, including being distributed such that portions of functions are implemented at different physical locations by one or more physical components. In some examples, the multi-TRP manager 715, or its sub-components, may be a separate and distinct component in accordance with various aspects of the present disclosure. In some examples, the multi-TRP manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

The multi-TRP manager 715 as described herein may be implemented to realize one or more potential advantages. One implementation may allow the device 705 to efficiently coordinate communications between a set of TRPs and the device 705, and more specifically to indicate multi-TRP schemes for communications between TRPs and the device 705. For example, the device 705 may identify a scheme for multi-TRP operation based on identifying TCI states in a DCI message.

Based on implementing the multi-TRP scheme indication as described herein, a processor of a UE 115 (e.g., controlling the receiver 710, the transmitter 720, or the transceiver 1020 as described with reference to FIG. 10) may decrease signaling overhead and improve flexibility in the communication of a multi-TRP scheme indication by implementing dynamic multi-TRP indication and switching.

Figure 8:
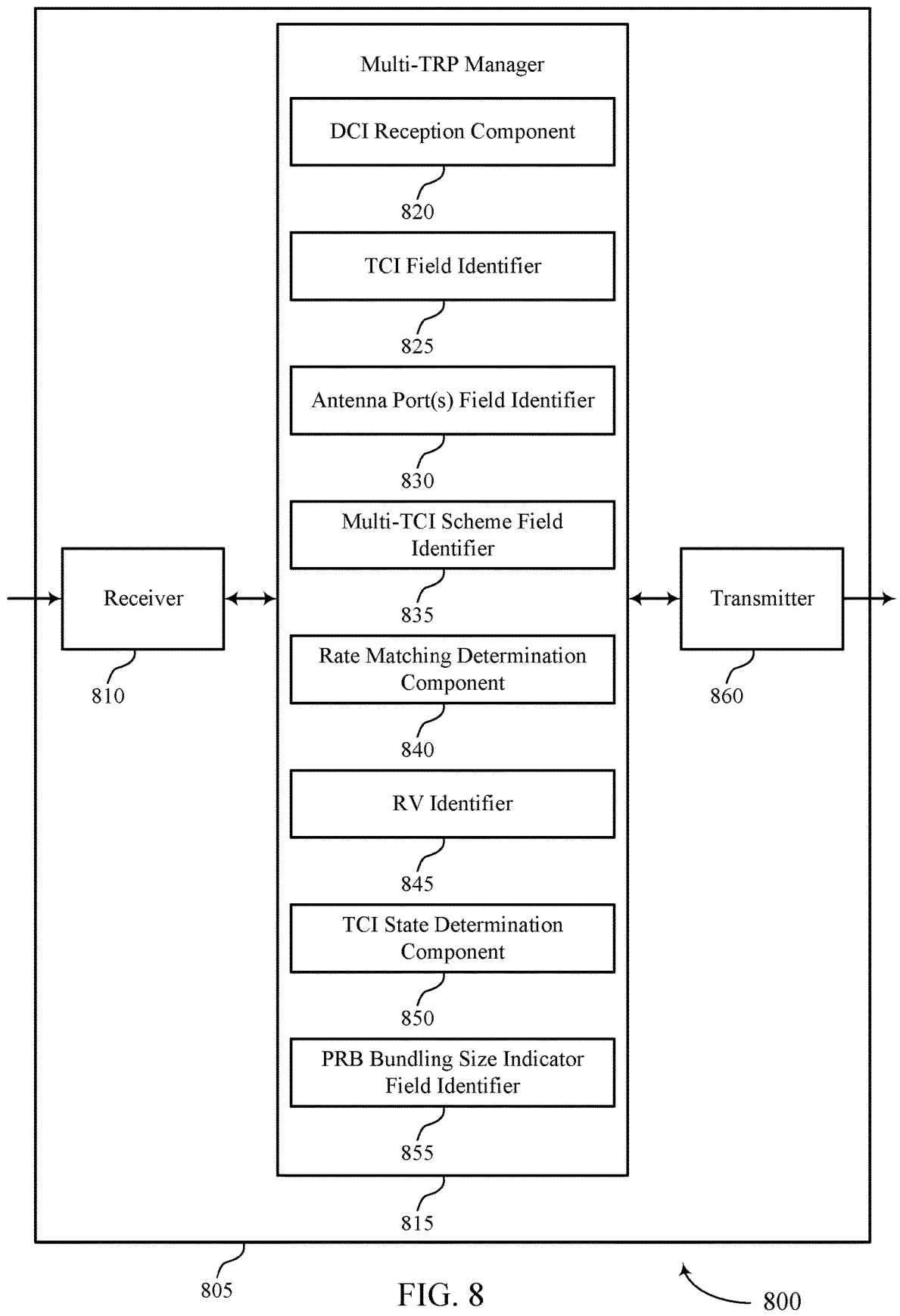

FIG. 8 shows a block diagram 800 of a device 805 that supports dynamic switching between different multi-TRP schemes in accordance with aspects of the present disclosure. The device 805 may be an example of aspects of a device 705 or a UE 115 as described herein. The device 805 may include a receiver 810, a multi-TRP manager 815, and a transmitter 860. The device 805 may also include a processor. Each of these components may be in communication with one another (e.g., via one or more buses).

The receiver 810 may receive information such as packets, user data, or control information associated with various information channels (e.g., control channels, data channels, and information related to dynamic switching between different multi-TRP schemes). Information may be passed on to other components of the device 805. The receiver 810 may be an example of aspects of the transceiver 1020 described with reference to FIG. 10. The receiver 810 may utilize a single antenna or a set of antennas.

The multi-TRP manager 815 may be an example of aspects of the multi-TRP manager 715 as described herein. The multi-TRP manager 815 may include a DCI reception component 820, a TCI field identifier 825, an antenna port(s) field identifier 830, a multi-TCI scheme field identifier 835, a rate matching determination component 840, an RV identifier 845, a TCI state determination component 850, a PRB bundling size indicator field identifier 855, or some combination of these components. The multi-TRP manager 815 may be an example of aspects of the multi-TRP manager

1010 described herein. The device 805 (e.g., a UE 115) may operate according to one or more of the following examples.

In a first example, the DCI reception component 820 may receive, from a base station, a DCI message including an indication of a first set of bits and a second set of bits. The TCI field identifier 825 may identify, using the first set of bits, a set of TCI states for communication with the base station. The antenna port(s) field identifier 830 may identify, using the second set of bits, a set of antenna ports and a multi-TRP scheme from a set of possible schemes for multi-TRP operation based on the identifying the set of TCI states.

In a second example, the DCI reception component 820 may receive, from a base station, a DCI message including an indication of a first set of bits and a second set of bits. The TCI field identifier 825 may identify, using the first set of bits, one or more TCI states for communication with the base station. The multi-TCI scheme field identifier 835 may identify, using the second set of bits and based on the UE (e.g., the device 805) being configured for multi-TRP operation, a multi-TRP scheme from a set of possible schemes for multi-TRP operation or a single-TRP scheme for single-TRP operation.

In a third example, the DCI reception component 820 may receive, from a base station, a DCI message including an indication of a set of bits. The rate matching determination component 840 may determine a rate matching procedure performed by the base station, where the rate matching procedure includes joint rate matching or separate rate matching of a TB for a first TCI state of a set of TCI states and a second TCI state of the set of TCI states. The RV identifier 845 may identify, using the set of bits and based on the rate matching procedure, a joint RV for the first TCI state and the second TCI state if the rate matching procedure includes joint rate matching or a first RV for the first TCI state and a second RV for the second TCI state if the rate matching procedure includes separate rate matching.

In a fourth example, the DCI reception component 820 may receive, from a base station, a DCI message including an indication of a bit. The TCI state determination component 850 may determine to receive transmissions from the base station using a set of TCI states in an FDM multi-TRP scheme, where the set of TCI states includes a first TCI state and a second TCI state. The PRB bundling size indicator field identifier 855 may identify, using the bit, a first PRG size and a second PRG size based on a first set of PRBs corresponding to the first TCI state and a second set of PRBs corresponding to the second TCI state.

The transmitter 860 may transmit signals generated by other components of the device 805. In some examples, the transmitter 860 may be collocated with a receiver 810 in a transceiver module. For example, the transmitter 860 may be an example of aspects of the transceiver 1020 described with reference to FIG. 10. The transmitter 860 may utilize a single antenna or a set of antennas.

Figure 9:
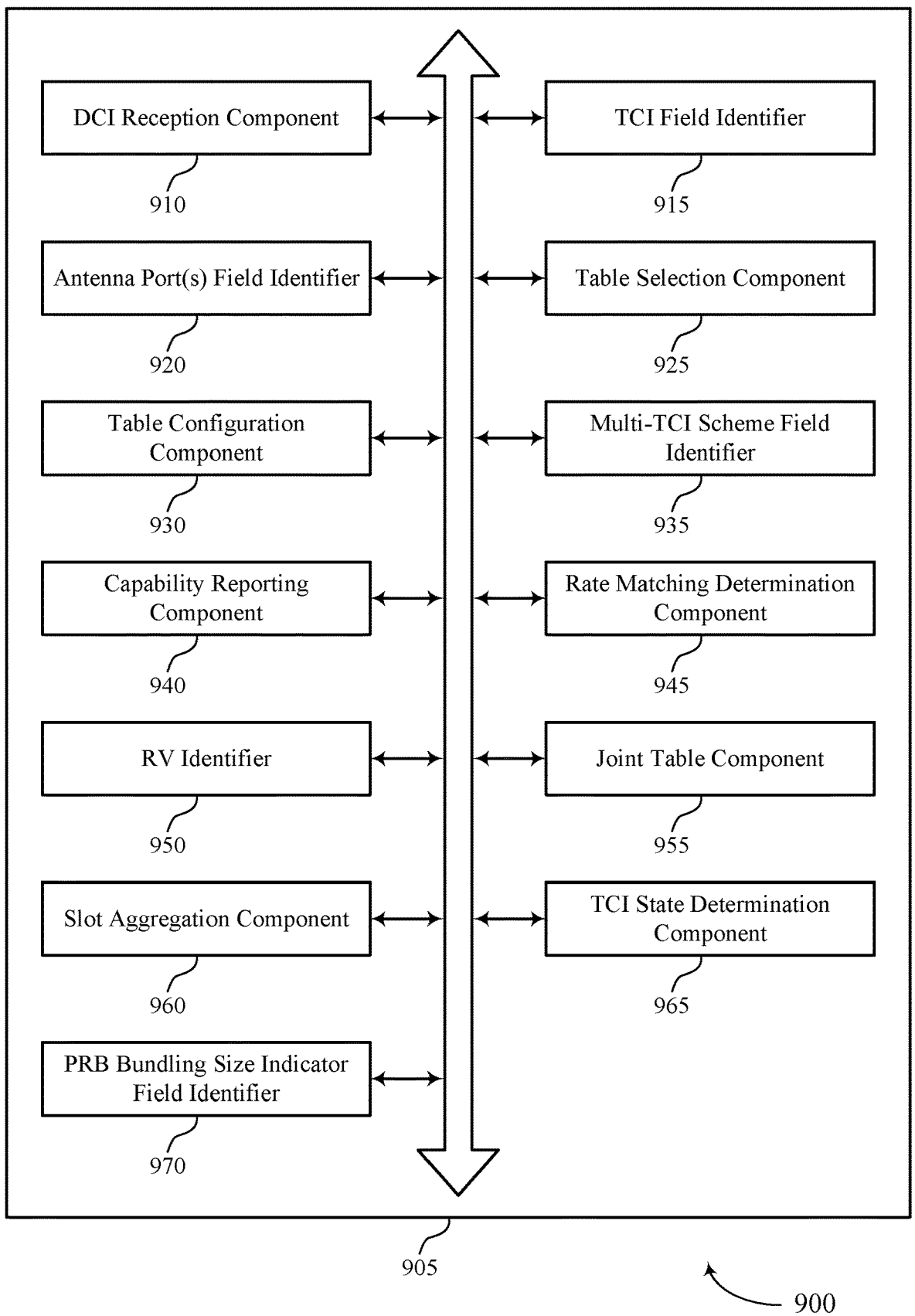
FIG. 9 shows a block diagram of a multi-TRP manager that supports dynamic switching between different multi-TRP schemes in accordance with aspects of the present disclosure.

FIG. 9 shows a block diagram 900 of a multi-TRP manager 905 that supports dynamic switching between different multi-TRP schemes in accordance with aspects of the present disclosure. The multi-TRP manager 905 may be an example of aspects of a multi-TRP manager 715, a multi-TRP manager 815, or a multi-TRP manager 1010 described herein. The multi-TRP manager 905 may include a DCI reception component 910, a TCI field identifier 915, an antenna port(s) field identifier 920, a table selection component 925, a table configuration component 930, a multi-TCI scheme field identifier 935, a capability reporting component 940, a rate matching determination component 945, an RV identifier 950, a joint table component 955, a slot aggregation component 960, a TCI state determination component 965, a PRB bundling size indicator field identifier 970, or any combination of these components. Each of these modules may communicate, directly or indirectly, with one another (e.g., via one or more buses).

In some implementations, the DCI reception component 910 may receive, from a base station, a DCI message including an indication of a first set of bits and a second set of bits. The TCI field identifier 915 may identify, using the first set of bits, a set of TCI states for communication with the base station.

The antenna port(s) field identifier 920 may identify, using the second set of bits, a set of antenna ports and a multi-TRP scheme from a set of possible schemes for multi-TRP operation based on the identifying the set of TCI states. In some examples, the antenna port(s) field identifier 920 may identify, using the second set of bits, a modulation order for at least one TCI state of the set of TCI states. In some examples, the antenna port(s) field identifier 920 may identify, using the second set of bits, an RV for a TB for at least one TCI state of the set of TCI states. In some cases, the multi-TRP scheme includes a joint SDM scheme, a separate SDM scheme, a joint FDM scheme, a separate FDM scheme, a joint TDM scheme, a separate TDM scheme, or a combination thereof. In some cases, the second set of bits includes a same number of bits as a set of bits indicating a set of antenna ports for single TRP operation.

In some cases, the TCI field identifier 915 may receive a set of messages from a set of TRPs based on identifying the multi-TRP scheme. In some cases, the multi-TRP operation includes communication with the set of TRPs at the base station or distributed across a set of base stations including at least the base station.

The table selection component 925 may select, from a set of lookup tables, a lookup table mapping the second set of bits to both the set of antenna ports and the multi-TRP scheme, where the identifying the set of antenna ports and the multi-TRP scheme is based on the selecting. In some cases, the table configuration component 930 may receive, from the base station, a configuration of the lookup table, the set of lookup tables, or a combination thereof. In other cases, a lookup table mapping the second set of bits to both the set of antenna ports and the multi-TRP scheme is pre-configured in memory.

In some implementations, the DCI reception component 910 may receive, from a base station, a DCI message including an indication of a first set of bits and a second set of bits. The TCI field identifier 915 may identify, using the first set of bits, one or more TCI states for communication with the base station.

The multi-TCI scheme field identifier 935 may identify, using the second set of bits and based on the UE being configured for multi-TRP operation, a multi-TRP scheme from a set of possible schemes for multi-TRP operation or a single-TRP scheme for single-TRP operation. In some examples, the one or more TCI states include multiple TCI states. In some of these examples, the multi-TCI scheme field identifier 935 may identify, using the second set of bits, a modulation order for at least one TCI state of the set of TCI states. Additionally or alternatively, the multi-TCI scheme field identifier 935 may identify, using the second set of bits, an RV for a TB for at least one TCI state of the set of TCI states.

In some cases, the multi-TRP scheme or the single-TRP scheme is identified based on whether first set of bits indicates one TCI state or a set of TCI states. In other cases, the one or more TCI states are identified based on whether the second set of bits indicates the multi-TRP scheme or the single-TRP scheme.

In some examples, the one or more TCI states may include multiple TCI states. In some of these examples, the table selection component 925 may identify the multi-TRP scheme based on a lookup table mapping the second set of bits to the multi-TRP scheme for the set of TCI states. In some cases, the table configuration component 930 may receive, from the base station, a configuration of the lookup table. In other cases, a lookup table mapping the second set of bits to the multi-TRP scheme for the set of TCI states is pre-configured in memory.

The capability reporting component 940 may transmit, to the base station, an indication of a capability of the UE, where the capability of the UE indicates that the UE is configured for multi-TRP operation.

In some examples, the DCI message includes an indication of a third set of bits, the one or more TCI states include multiple TCI states, and the multi-TRP scheme is an example of an SDM multi-TRP scheme. In these examples, the antenna port(s) field identifier 920 may identify, using the third set of bits, a set of antenna ports for communication with the base station, where a first set of antenna ports of the set of antenna ports corresponds to a first TCI state of the set of TCI states and a second set of antenna ports of the set of antenna ports corresponds to a second TCI state of the set of TCI states. In some examples, the DCI message includes an indication of a third set of bits and the one or more TCI states include multiple TCI states. In these examples, the antenna port(s) field identifier 920 may identify, using the third set of bits, a set of antenna ports for communication with the base station and whether the multi-TRP scheme is an example of an SDM multi-TRP scheme, where the multi-TRP scheme or the single-TRP scheme is identified based on whether the multi-TRP scheme is the SDM multi-TRP scheme.

In some implementations, the DCI reception component 910 may receive, from a base station, a DCI message including an indication of a set of bits. The rate matching determination component 945 may determine a rate matching procedure performed by the base station, where the rate matching procedure includes joint rate matching or separate rate matching of a TB for a first TCI state of a set of TCI states and a second TCI state of the set of TCI states. In some cases, the set of bits includes a first set of bits, the DCI message further includes an indication of a second set of bits, and the rate matching procedure performed by the base station is determined using the second set of bits. In other cases, the rate matching procedure performed by the base station is determined using the set of bits.

The RV identifier 950 may identify, using the set of bits and based on the rate matching procedure, a joint RV for the first TCI state and the second TCI state if the rate matching procedure includes joint rate matching or a first RV for the first TCI state and a second RV for the second TCI state if the rate matching procedure includes separate rate matching.

In some examples, the table selection component 925 may select between a first lookup table mapping the set of bits to the joint RV and a second lookup table mapping the set of bits to a combination of the first RV and the second RV, where the identifying is based on the selecting. In some cases, the first lookup table, the second lookup table, or a combination thereof are pre-configured in memory. In other cases, the table configuration component 930 may receive, from the base station, a configuration of the first lookup table, the second lookup table, or a combination thereof.

In some cases, the joint RV or the first RV and the second RV are identified by the joint table component 955 based on a lookup table mapping the set of bits to one or more RVs. In some cases, the lookup table is pre-configured in memory. In other cases, the table configuration component 930 may receive, from the base station, a configuration of the lookup table.

In some examples, the rate matching procedure includes separate rate matching. In some of these examples, the slot aggregation component 960 may identify, using the set of bits and based on the rate matching procedure, the first RV for the first TCI state and the second RV for the second TCI state for each slot of a set of slots in a slot aggregation procedure.

In some implementations, the DCI reception component 910 may receive, from a base station, a DCI message including an indication of a bit. The TCI state determination component 965 may determine to receive transmissions from the base station using a set of TCI states in an FDM multi-TRP scheme, where the set of TCI states includes a first TCI state and a second TCI state. The PRB bundling size indicator field identifier 970 may identify, using the bit, a first PRG size and a second PRG size based on a first set of PRBs corresponding to the first TCI state and a second set of PRBs corresponding to the second TCI state.

In some cases, the first PRG size includes a first pre-configured number of PRBs, a number of PRBs in the first set of PRB s, or a combination thereof, and the second PRG size includes a second pre-configured number of PRBs, a number of PRBs in the second set of PRBs, or a combination thereof. Identifying the first PRG size may involve the PRB bundling size indicator field identifier 970 identifying that the first PRG size is the number of PRBs in the first set of PRBs if the first set of PRBs is contiguous in frequency, a frequency size of the first set of PRB s is greater than a threshold frequency size, or a combination thereof. Identifying the second PRG size may involve the PRB bundling size indicator field identifier 970 identifying that the second PRG size is the number of PRBs in the second set of PRBs if the second set of PRBs is contiguous in frequency, a frequency size of the second set of PRBs is greater than the threshold frequency size, or a combination thereof.

Figure 10:
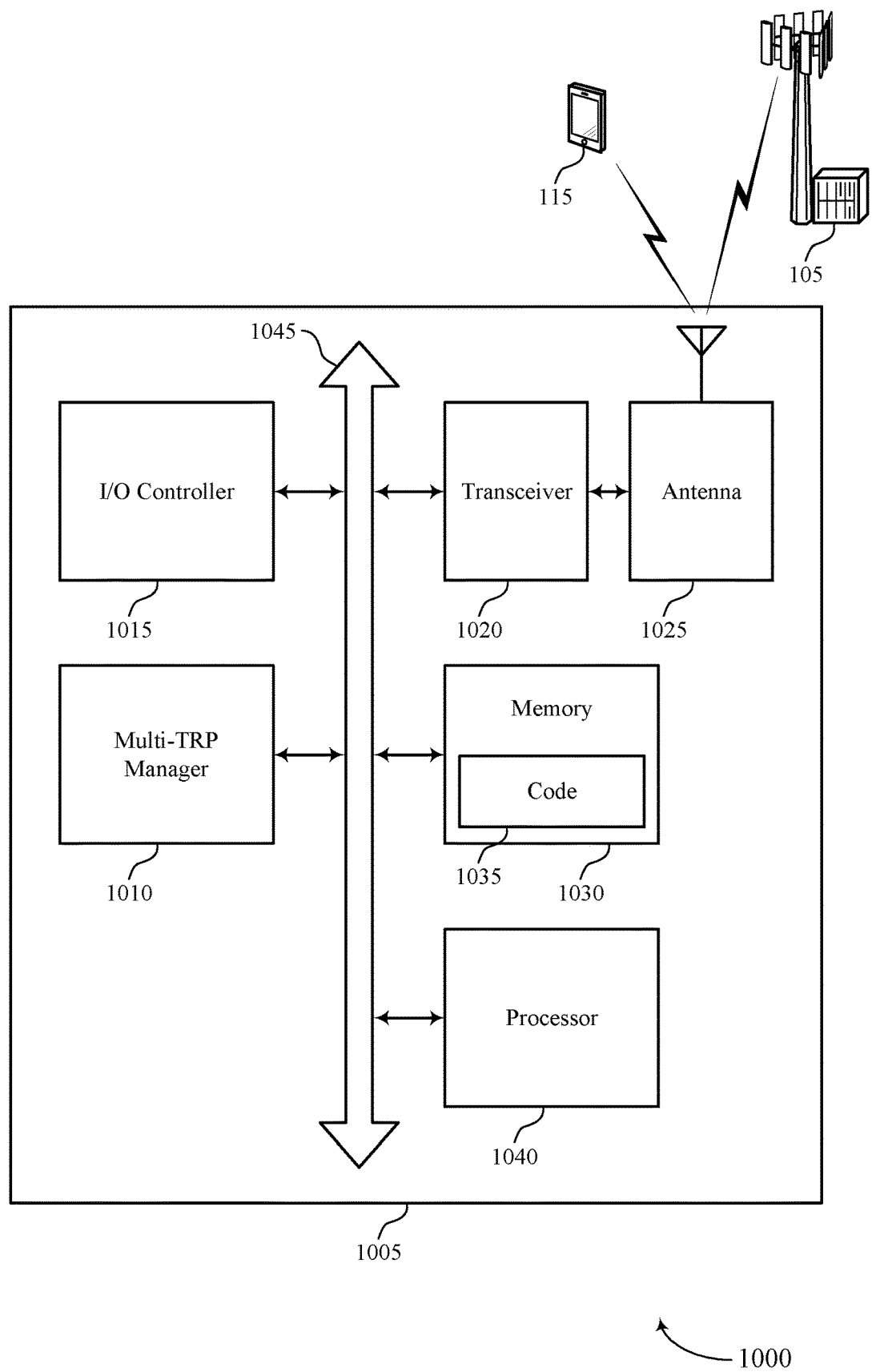
FIG. 10 shows a diagram of a system including a device that supports dynamic switching between different multi-TRP schemes in accordance with aspects of the present disclosure.

FIG. 10 shows a diagram of a system 1000 including a device 1005 that supports dynamic switching between different multi-TRP schemes in accordance with aspects of the present disclosure. The device 1005 may be an example of or include the components of device 705, device 805, or a UE 115 as described herein. The device 1005 may include components for bi-directional voice and data communications including components for transmitting and receiving communications, including a multi-TRP manager 1010, an I/O controller 1015, a transceiver 1020, an antenna 1025, memory 1030, and a processor 1040. These components may be in electronic communication via one or more buses (e.g., bus 1045).

In some cases, the multi-TRP manager 1010 may receive, from a base station, a DCI message including an indication of a first set of bits and a second set of bits, identify, using the first set of bits, a set of TCI states for communication with the base station, and identify, using the second set of bits, a set of antenna ports and a multi-TRP scheme from a set of possible schemes for multi-TRP operation based on the identifying the set of TCI states. In other cases, the multi-TRP manager 1010 may receive, from a base station, a DCI message including an indication of a first set of bits and a second set of bits, identify, using the first set of bits, one or more TCI states for communication with the base station, and identify, using the second set of bits and based on the UE being configured for multi-TRP operation, a multi-TRP scheme from a set of possible schemes for multi-TRP operation or a single-TRP scheme for single-TRP operation.

Additionally or alternatively, the multi-TRP manager 1010 may receive, from a base station, a DCI message including an indication of a set of bits, determine a rate matching procedure performed by the base station, where the rate matching procedure includes joint rate matching or separate rate matching of a TB for a first TCI state of a set of TCI states and a second TCI state of the set of TCI state, and identify, using the set of bits and based on the rate matching procedure, a joint RV for the first TCI state and the second TCI state if the rate matching procedure includes joint rate matching or a first RV for the first TCI state and a second RV for the second TCI state if the rate matching procedure includes separate rate matching. In some cases, the multi-TRP manager 1010 may receive, from a base station, a DCI message including an indication of a bit, determine to receive transmissions from the base station using a set of TCI states in an FDM multi-TRP scheme, where the set of TCI states includes a first TCI state and a second TCI state, and identify, using the bit, a first PRG size and a second PRG size based on a first set of PRBs corresponding to the first TCI state and a second set of PRBs corresponding to the second TCI state.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting dynamic switching between different multi-TRP schemes).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
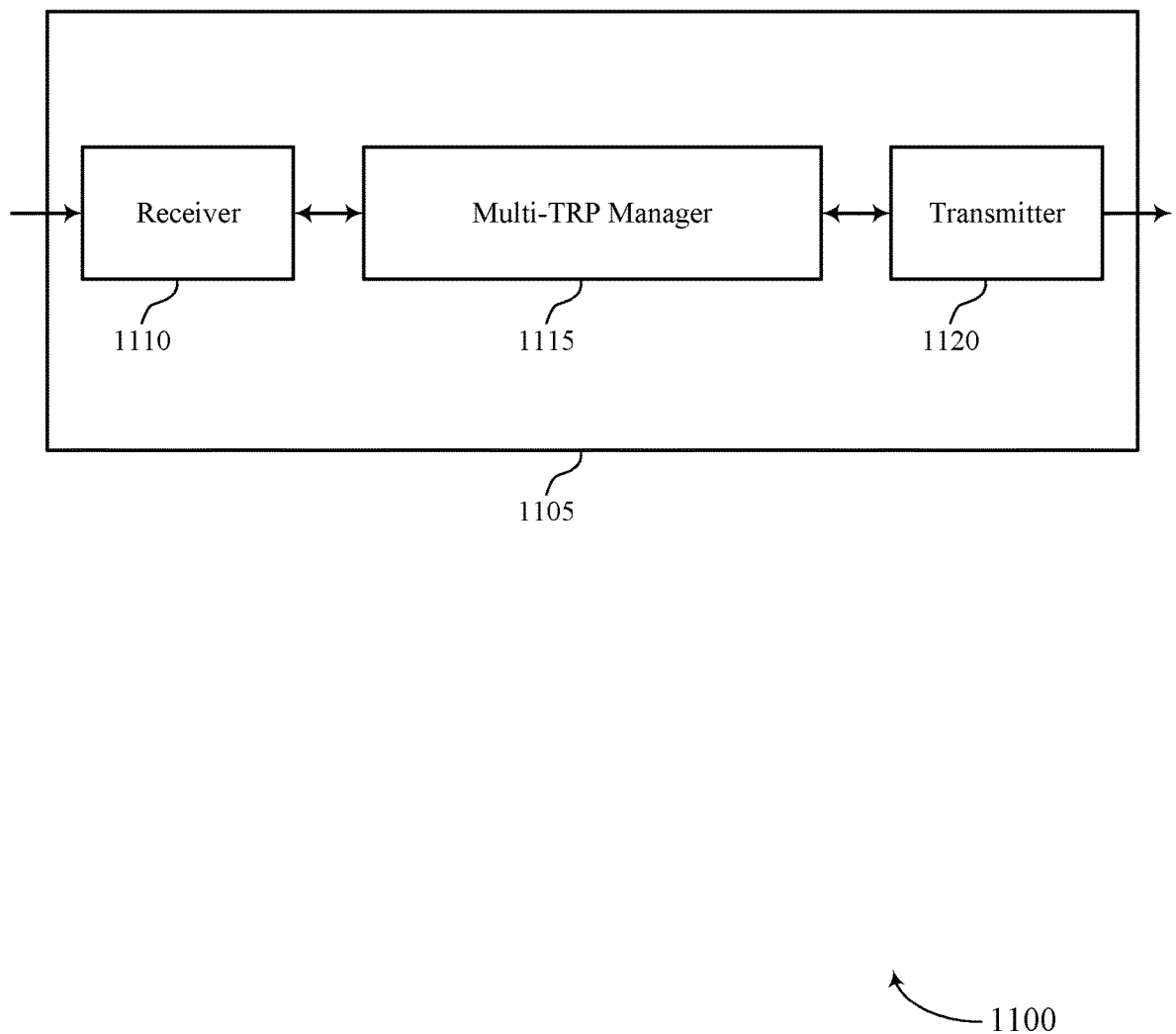
FIGS. 11 and 12 show block diagrams of devices that support dynamic switching between different multi-TRP schemes in accordance with aspects of the present disclosure.

FIG. 11 shows a block diagram 1100 of a device 1105 that supports dynamic switching between different multi-TRP schemes in accordance with aspects of the present disclosure. The device 1105 may be an example of aspects of a base station 105 as described herein. The device 1105 may include a receiver 1110, a multi-TRP manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to dynamic switching between different multi-TRP schemes). Information may be passed on to other components of the device 1105. The receiver 1110 may be an example of aspects of the transceiver 1420 described with reference to FIG. 14. The receiver 1110 may utilize a single antenna or a set of antennas.

In some implementations, the multi-TRP manager 1115 may generate a first set of bits indicating a set of TCI states for communication with a UE, generate a second set of bits indicating a set of antenna ports and a multi-TRP scheme from a set of possible schemes for multi-TRP operation based on the first set of bits indicating the set of TCI states, and transmit, to the UE, a DCI message including an indication of the first set of bits and the second set of bits.

In other implementations, the multi-TRP manager 1115 may identify that a UE is configured for multi-TRP operation, generate a first set of bits indicating one or more TCI states for communication with the UE, generate a second set of bits based on the UE being configured for multi-TRP operation, where the second set of bits indicates a multi-TRP scheme from a set of possible schemes for multi-TRP operation or a single-TRP scheme for single-TRP operation, and transmit, to the UE, a DCI message including an indication of the first set of bits and the second set of bits.

Additionally or alternatively, the multi-TRP manager 1115 may determine to transmit to a UE using a set of TCI states and perform a rate matching procedure that includes joint rate matching or separate rate matching of a TB for a first TCI state of the set of TCI states and a second TCI state of the set of TCI states. The multi-TRP manager 1115 may generate a set of bits based on the rate matching procedure, where the set of bits indicates a joint RV for the first TCI state and the second TCI state if the rate matching procedure includes joint rate matching and the set of bits indicates a first RV for the first TCI state and a second RV for the second TCI state if the rate matching procedure includes separate rate matching, and transmit, to the UE, a DCI message including an indication of the set of bits.

Additionally or alternatively, the multi-TRP manager 1115 may also determine to transmit to a UE using a set of TCI states in an FDM multi-TRP scheme, determine a first PRG size for precoding transmissions for a first TCI state of the set of TCI states and a second PRG size for precoding transmissions for a second TCI state of the set of TCI states based on the FDM multi-TRP scheme, generate a bit indicating the first PRG size and the second PRG size based on a first set of PRB s corresponding to the first TCI state and a second set of PRBs corresponding to the second TCI state, and transmit, to the UE, a DCI message including an indication of the bit. The multi-TRP manager 1115 may be an example of aspects of the multi-TRP manager 1410 described herein.

The multi-TRP manager 1115, or its sub-components, may be implemented in hardware, code (e.g., software or firmware) executed by a processor, or any combination thereof. If implemented in code executed by a processor, the functions of the multi-TRP manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The multi-TRP manager 1115, or its sub-components, may be physically located at various positions, including being distributed such that portions of functions are implemented at different physical locations by one or more physical components. In some examples, the multi-TRP manager 1115, or its sub-components, may be a separate and distinct component in accordance with various aspects of the present disclosure. In some examples, the multi-TRP manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
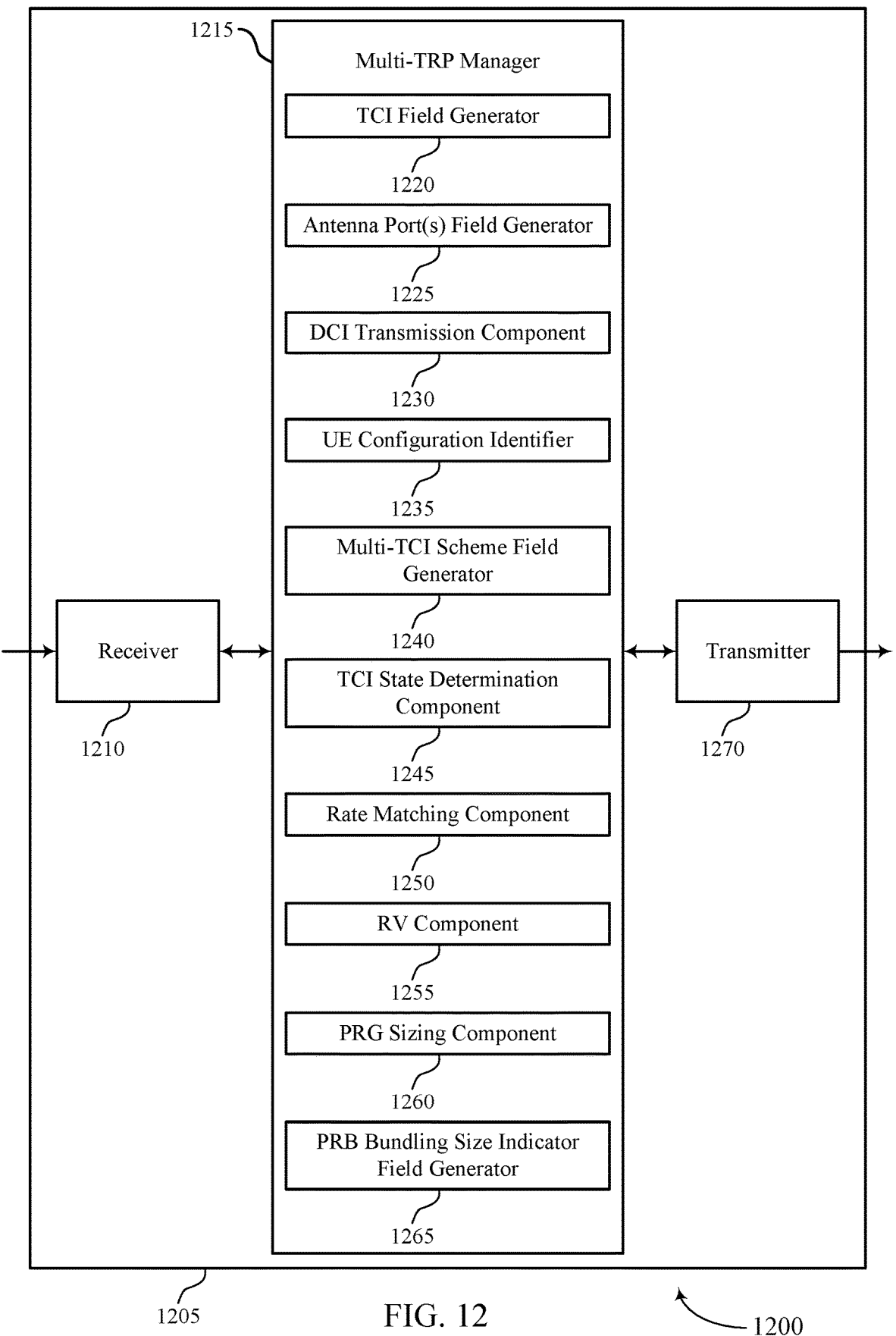

FIG. 12 shows a block diagram 1200 of a device 1205 that supports dynamic switching between different multi-TRP schemes in accordance with aspects of the present disclosure. The device 1205 may be an example of aspects of a device 1105 or a base station 105 as described herein. The device 1205 may include a receiver 1210, a multi-TRP manager 1215, and a transmitter 1270. The device 1205 may also include a processor. Each of these components may be in communication with one another (e.g., via one or more buses).

The receiver 1210 may receive information such as packets, user data, or control information associated with various information channels (e.g., control channels, data channels, and information related to dynamic switching between different multi-TRP schemes). Information may be passed on to other components of the device 1205. The receiver 1210 may be an example of aspects of the transceiver 1420 described with reference to FIG. 14. The receiver 1210 may utilize a single antenna or a set of antennas.

The multi-TRP manager 1215 may be an example of aspects of the multi-TRP manager 1115 as described herein. The multi-TRP manager 1215 may include a TCI field generator 1220, an antenna port(s) field generator 1225, a DCI transmission component 1230, a UE configuration identifier 1235, a multi-TCI scheme field generator 1240, a TCI state determination component 1245, a rate matching component 1250, an RV component 1255, a PRG sizing component 1260, a PRB bundling size indicator field generator 1265, or some combination thereof. The multi-TRP manager 1215 may be an example of aspects of the multi-TRP manager 1410 described herein. The device 1205 (e.g., a base station 105) may operate according to one or more of the following examples.

In a first example, the TCI field generator 1220 may generate a first set of bits indicating a set of TCI states for communication with a UE. The antenna port(s) field generator 1225 may generate a second set of bits indicating a set of antenna ports and a multi-TRP scheme from a set of possible schemes for multi-TRP operation based on the first set of bits indicating the set of TCI states. The DCI transmission component 1230 may transmit, to the UE, a DCI message including an indication of the first set of bits and the second set of bits.

In a second example, the UE configuration identifier 1235 may identify that a UE is configured for multi-TRP operation. The TCI field generator 1220 may generate a first set of bits indicating one or more TCI states for communication with the UE. The multi-TCI scheme field generator 1240 may generate a second set of bits based on the UE being configured for multi-TRP operation, where the second set of bits indicates a multi-TRP scheme from a set of possible schemes for multi-TRP operation or a single-TRP scheme for single-TRP operation. The DCI transmission component 1230 may transmit, to the UE, a DCI message including an indication of the first set of bits and the second set of bits.

In a third example, the TCI state determination component 1245 may determine to transmit to a UE using a set of TCI states. The rate matching component 1250 may perform a rate matching procedure that includes joint rate matching or separate rate matching of a TB for a first TCI state of the set of TCI states and a second TCI state of the set of TCI states. The RV component 1255 may generate a set of bits based on the rate matching procedure, where the set of bits indicates a joint RV for the first TCI state and the second TCI state if the rate matching procedure includes joint rate matching and the set of bits indicates a first RV for the first TCI state and a second RV for the second TCI state if the rate matching procedure includes separate rate matching. The DCI transmission component 1230 may transmit, to the UE, a DCI message including an indication of the set of bits.

In a fourth example, the TCI state determination component 1245 may determine to transmit to a UE using a set of TCI states in an FDM multi-TRP scheme. The PRG sizing component 1260 may determine a first PRG size for precoding transmissions for a first TCI state of the set of TCI states and a second PRG size for precoding transmissions for a second TCI state of the set of TCI states based on the FDM multi-TRP scheme. The PRB bundling size indicator field generator 1265 may generate a bit indicating the first PRG size and the second PRG size based on a first set of PRB s corresponding to the first TCI state and a second set of PRBs corresponding to the second TCI state.

The DCI transmission component 1230 may transmit, to the UE, a DCI message including an indication of the bit.

The transmitter 1270 may transmit signals generated by other components of the device 1205. In some examples, the transmitter 1270 may be collocated with a receiver 1210 in a transceiver module. For example, the transmitter 1270 may be an example of aspects of the transceiver 1420 described with reference to FIG. 14. The transmitter 1270 may utilize a single antenna or a set of antennas.

Figure 13:
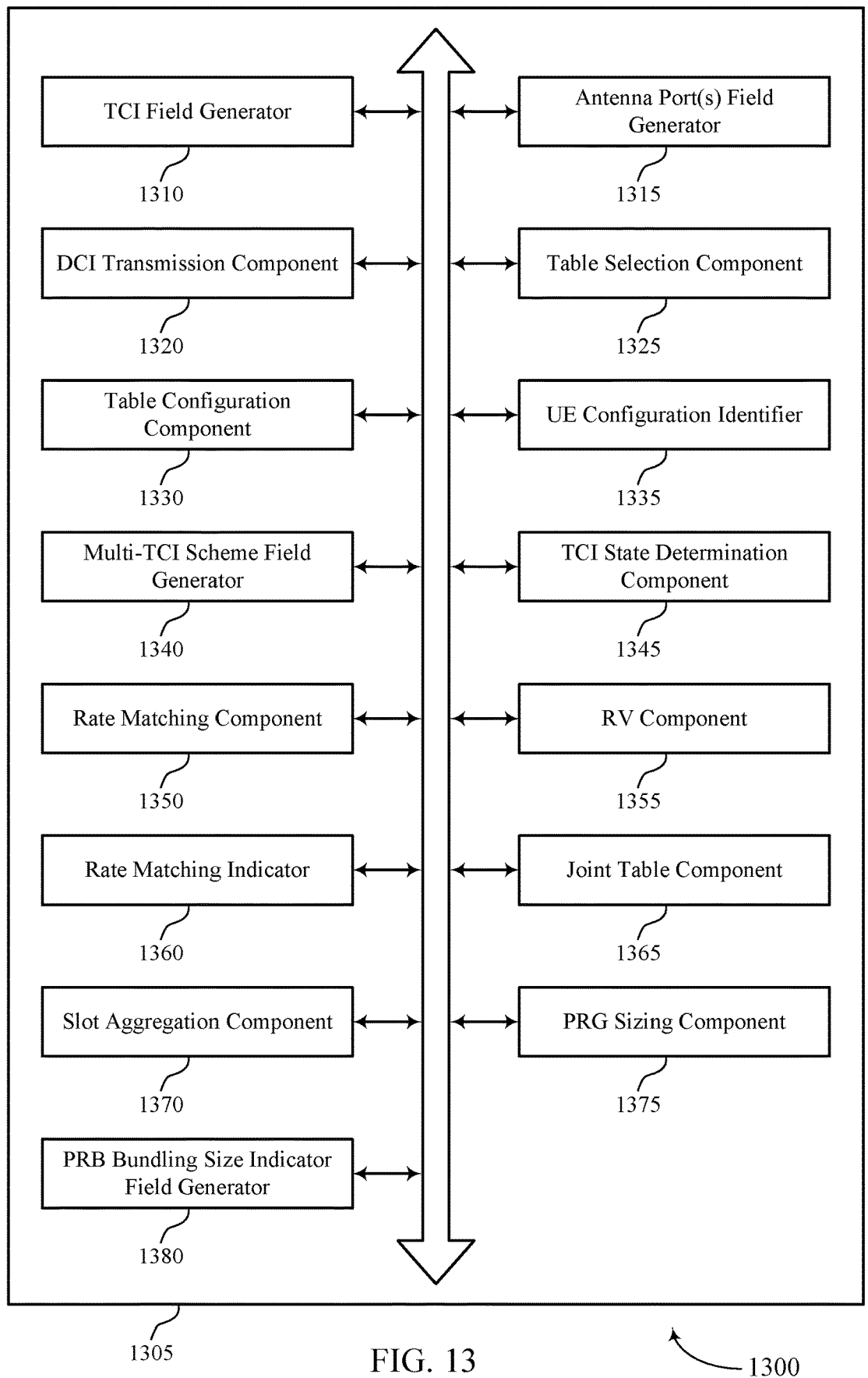
FIG. 13 shows a block diagram of a multi-TRP manager that supports dynamic switching between different multi-TRP schemes in accordance with aspects of the present disclosure.

FIG. 13 shows a block diagram 1300 of a multi-TRP manager 1305 that supports dynamic switching between different multi-TRP schemes in accordance with aspects of the present disclosure. The multi-TRP manager 1305 may be an example of aspects of a multi-TRP manager 1115, a multi-TRP manager 1215, or a multi-TRP manager 1410 described herein. The multi-TRP manager 1305 may include a TCI field generator 1310, an antenna port(s) field generator 1315, a DCI transmission component 1320, a table selection component 1325, a table configuration component 1330, a UE configuration identifier 1335, a multi-TCI scheme field generator 1340, a TCI state determination component 1345, a rate matching component 1350, an RV component 1355, a rate matching indicator 1360, a joint table component 1365, a slot aggregation component 1370, a PRG sizing component 1375, a PRB bundling size indicator field generator 1380, or any combination thereof. Each of these modules may communicate, directly or indirectly, with one another (e.g., via one or more buses).

In some implementations, the TCI field generator 1310 may generate a first set of bits indicating a set of TCI states for communication with a UE. The antenna port(s) field generator 1315 may generate a second set of bits indicating a set of antenna ports and a multi-TRP scheme from a set of possible schemes for multi-TRP operation based on the first set of bits indicating the set of TCI states. In some cases, the second set of bits further indicates a modulation order for at least one TCI state of the set of TCI states. In some cases, the second set of bits further indicates an RV for a TB for at least one TCI state of the set of TCI states. In some cases, the multi-TRP scheme includes a joint SDM scheme, a separate SDM scheme, a joint FDM scheme, a separate FDM scheme, a joint TDM scheme, a separate TDM scheme, or a combination thereof. In some cases, the second set of bits includes a same number of bits as a set of bits indicating a set of antenna ports for single TRP operation. The DCI transmission component 1320 may transmit, to the UE, a DCI message including an indication of the first set of bits and the second set of bits.

The table selection component 1325 may select, from a set of lookup tables, a lookup table mapping both the set of antenna ports and the multi-TRP scheme to the second set of bits, where the generating the second set of bits is based on the selecting. In some cases, the table configuration component 1330 may configure the lookup table, the set of lookup tables, or a combination thereof and may transmit, to the UE, an indication of the lookup table, the set of lookup tables, or a combination thereof. In other cases, a lookup table mapping both the set of antenna ports and the multi-TRP scheme to the second set of bits is pre-configured in memory. In some cases, the multi-TRP operation includes communication with the UE by a set of TRPs at a base station or distributed across a set of base stations.

In some implementations, the UE configuration identifier 1335 may identify that a UE is configured for multi-TRP operation. In some examples, the UE configuration identifier 1335 may receive, from the UE, an indication of a capability of the UE, where the identifying that the UE is configured for multi-TRP operation is based on the capability of the UE.

The TCI field generator 1310 may generate a first set of bits indicating one or more TCI states for communication with the UE. The multi-TCI scheme field generator 1340 may generate a second set of bits based on the UE being configured for multi-TRP operation, where the second set of bits indicates a multi-TRP scheme from a set of possible schemes for multi-TRP operation or a single-TRP scheme for single-TRP operation. The DCI transmission component 1320 may transmit, to the UE, a DCI message including an indication of the first set of bits and the second set of bits.

In some cases, the second set of bits is generated based on whether the first set of bits indicates one TCI state or a set of TCI states. In other cases, the first set of bits is generated based on whether the second set of bits indicates the multi-TRP scheme or the single-TRP scheme. In some cases, the one or more TCI states include multiple TCI states. In some of these cases, the second set of bits further indicates a modulation order for at least one TCI state of the set of TCI states. Additionally or alternatively, the second set of bits further indicates an RV for a TB for at least one TCI state of the set of TCI states.

In some examples, generating the second set of bits involves the table selection component 1325 determining that the one or more TCI states include multiple TCI states and identifying the second set of bits based on a lookup table mapping the multi-TRP scheme for the set of TCI states to the second set of bits. In some cases, the table configuration component 1330 may configure the lookup table and may transmit, to the UE, an indication of the lookup table. In other cases, a lookup table mapping the multi-TRP scheme for a set of TCI states to the second set of bits is pre-configured in memory.

In some examples, the one or more TCI states include multiple TCI states and the multi-TRP scheme is an example of an SDM multi-TRP scheme. In some of these examples, the antenna port(s) field generator 1315 may generate a third set of bits indicating a set of antenna ports for communication with the UE, where a first set of antenna ports of the set of antenna ports corresponds to a first TCI state of the set of TCI states and a second set of antenna ports of the set of antenna ports corresponds to a second TCI state of the set of TCI states, and where the DCI message further includes an indication of the third set of bits. In some examples, the one or more TCI states include multiple TCI states. In some of these examples, the antenna port(s) field generator 1315 may generate a third set of bits indicating a set of antenna ports for communication with the UE and whether the multi-TRP scheme is an SDM multi-TRP scheme, where the second set of bits is generated based on whether the multi-TRP scheme is the SDM multi-TRP scheme, and where the DCI message further includes an indication of the third set of bits.

In some implementations, the TCI state determination component 1345 may determine to transmit to a UE using a set of TCI states. The rate matching component 1350 may perform a rate matching procedure that includes joint rate matching or separate rate matching of a TB for a first TCI state of the set of TCI states and a second TCI state of the set of TCI states. The RV component 1355 may generate a set of bits based on the rate matching procedure, where the set of bits indicates a joint RV for the first TCI state and the second TCI state if the rate matching procedure includes joint rate matching and the set of bits indicates a first RV for the first TCI state and a second RV for the second TCI state if the rate matching procedure includes separate rate matching. The DCI transmission component 1320 may transmit, to the UE, a DCI message including an indication of the set of bits.

In some cases, the set of bits may be a first set of bits and the rate matching indicator 1360 may generate a second set of bits indicating whether the rate matching procedure includes joint rate matching or separate rate matching, where the DCI message further includes an indication of the second set of bits. In other cases, the set of bits further indicates whether the rate matching procedure includes joint rate matching or separate rate matching.

In some examples, the table selection component 1325 may select between a first lookup table mapping the joint RV to the set of bits and a second lookup table mapping a combination of the first RV and the second RV to the set of bits, where the generating is based on the selecting. In some cases, the first lookup table, the second lookup table, or a combination thereof are pre-configured in memory. In other cases, the table configuration component 1330 may configure the first lookup table, the second lookup table, or a combination thereof and may transmit, to the UE, an indication of the first lookup table, the second lookup table, or a combination thereof.

In some cases, generating the set of bits may involve the joint table component 1365 identifying the set of bits based on a lookup table mapping one or more RVs to the set of bits. In some cases, the lookup table is pre-configured in memory. In other cases, the table configuration component 1330 may configure the lookup table and may transmit, to the UE, an indication of the lookup table.

In some examples, the rate matching procedure includes separate rate matching, and the slot aggregation component 1370 may perform a slot aggregation procedure for the TB over a set of slots, where the set of bits further indicates the first RV for the first TCI state and the second RV for the second TCI state for each slot of the set of slots.

In some implementations, the TCI state determination component 1345 may determine to transmit to a UE using a set of TCI states in an FDM multi-TRP scheme. The PRG sizing component 1375 may determine a first PRG size for precoding transmissions for a first TCI state of the set of TCI states and a second PRG size for precoding transmissions for a second TCI state of the set of TCI states based on the FDM multi-TRP scheme. The PRB bundling size indicator field generator 1380 may generate a bit indicating the first PRG size and the second PRG size based on a first set of PRBs corresponding to the first TCI state and a second set of PRBs corresponding to the second TCI state. The DCI transmission component 1320 may transmit, to the UE, a DCI message including an indication of the bit.

In some cases, the first PRG size includes a first pre-configured number of PRBs, a number of PRBs in the first set of PRBs, or a combination thereof, and the second PRG size includes a second pre-configured number of PRBs, a number of PRBs in the second set of PRBs, or a combination thereof. In some cases, the first PRG size may be the number of PRBs in the first set of PRBs if the first set of PRBs is contiguous in frequency, a frequency size of the first set of PRBs is greater than a threshold frequency size, or a combination thereof. In these cases, the second PRG size may be the number of PRBs in the second set of PRBs if the second set of PRBs is contiguous in frequency, a frequency size of the second set of PRBs is greater than the threshold frequency size, or a combination thereof.

Figure 14:
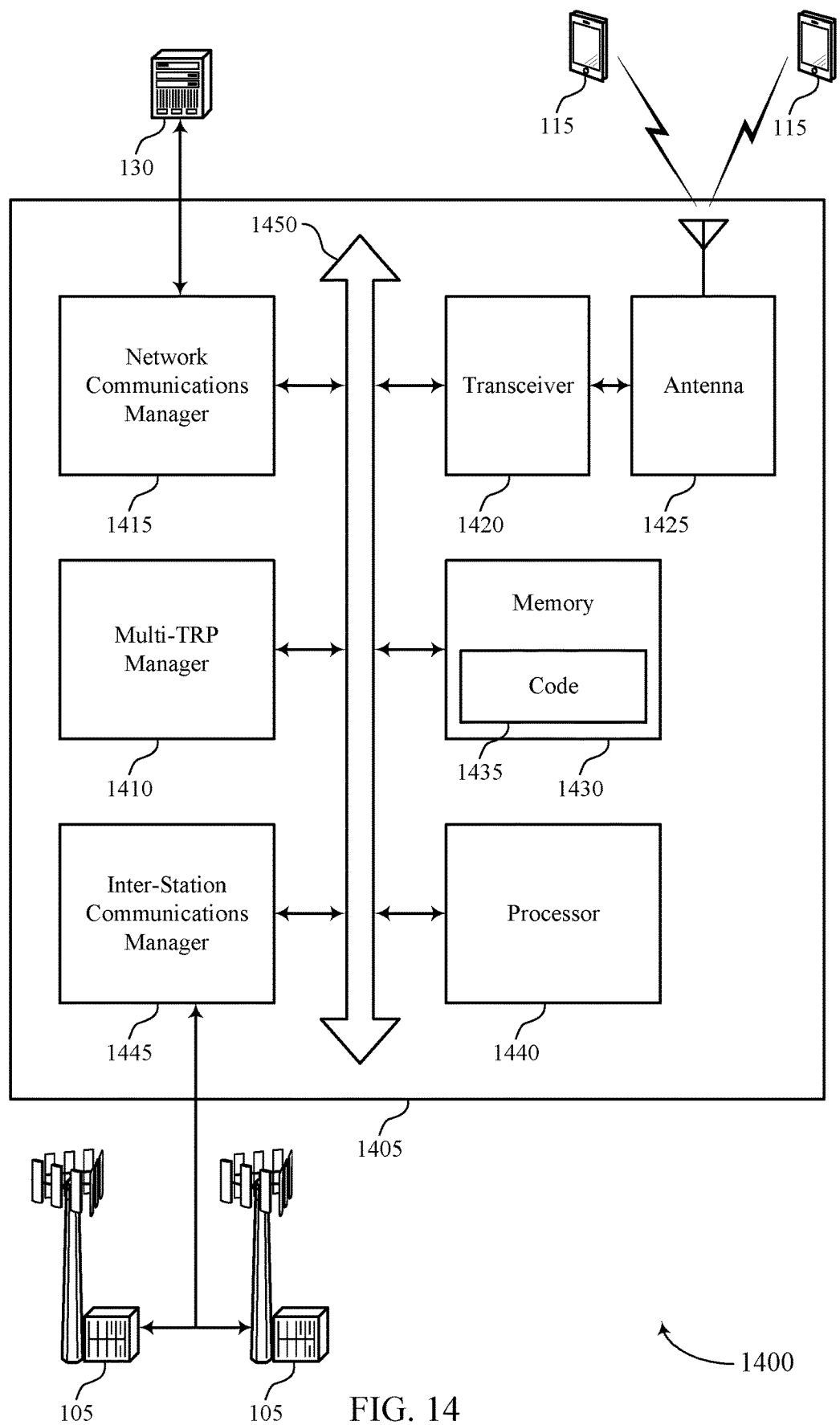
FIG. 14 shows a diagram of a system including a device that supports dynamic switching between different multi-TRP schemes in accordance with aspects of the present disclosure.

FIG. 14 shows a diagram of a system 1400 including a device 1405 that supports dynamic switching between different multi-TRP schemes in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a multi-TRP manager 1410, a network communications manager 1415, a transceiver 1420, an antenna 1425, memory 1430, a processor 1440, and an inter-station communications manager 1445. These components may be in electronic communication via one or more buses (e.g., bus 1450).

In some cases, the multi-TRP manager 1410 may generate a first set of bits indicating a set of TCI states for communication with a UE, generate a second set of bits indicating a set of antenna ports and a multi-TRP scheme from a set of possible schemes for multi-TRP operation based on the first set of bits indicating the set of TCI states, and transmit, to the UE, a DCI message including an indication of the first set of bits and the second set of bits. In other cases, the multi-TRP manager 1410 may identify that a UE is configured for multi-TRP operation, generate a first set of bits indicating one or more TCI states for communication with the UE, generate a second set of bits based on the UE being configured for multi-TRP operation, where the second set of bits indicates a multi-TRP scheme from a set of possible schemes for multi-TRP operation or a single-TRP scheme for single-TRP operation, and transmit, to the UE, a DCI message including an indication of the first set of bits and the second set of bits.

Additionally or alternatively, the multi-TRP manager 1410 may determine to transmit to a UE using a set of TCI states, perform a rate matching procedure that includes joint rate matching or separate rate matching of a TB for a first TCI state of the set of TCI states and a second TCI state of the set of TCI states, generate a set of bits based on the rate matching procedure, where the set of bits indicates a joint RV for the first TCI state and the second TCI state if the rate matching procedure includes joint rate matching and the set of bits indicates a first RV for the first TCI state and a second RV for the second TCI state if the rate matching procedure includes separate rate matching, and transmit, to the UE, a DCI message including an indication of the set of bits. In some cases, the multi-TRP manager 1410 may determine to transmit to a UE using a set of TCI states in an FDM multi-TRP scheme, determine a first PRG size for precoding transmissions for a first TCI state of the set of TCI states and a second PRG size for precoding transmissions for a second TCI state of the set of TCI states based on the FDM multi-TRP scheme, generate a bit indicating the first PRG size and the second PRG size based on a first set of PRB s corresponding to the first TCI state and a second set of PRBs corresponding to the second TCI state, and transmit, to the UE, a DCI message including an indication of the bit.

The network communications manager 1415 may manage communications with the core network 130 (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting dynamic switching between different multi-TRP schemes).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
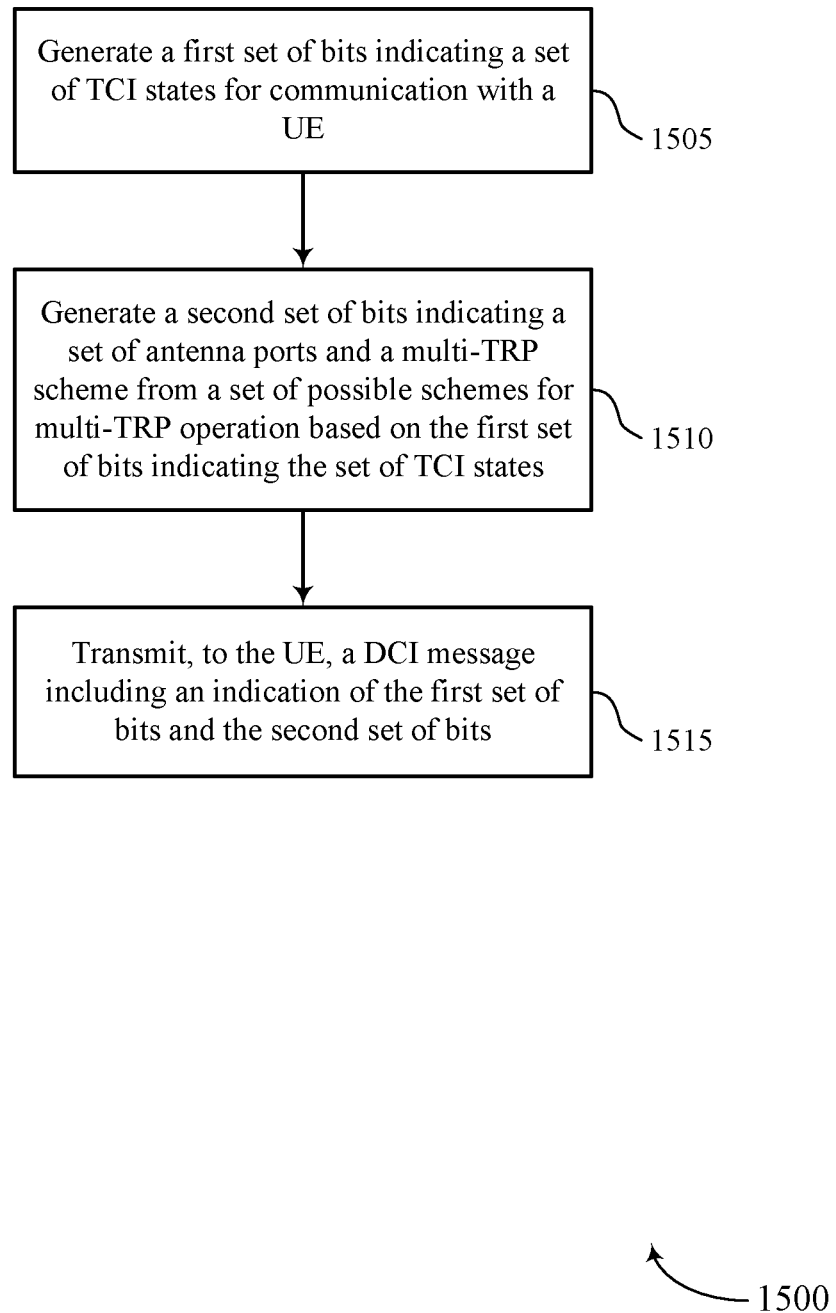
FIGS. 15 through 22 show flowcharts illustrating methods that support dynamic switching between different multi-TRP schemes in accordance with aspects of the present disclosure.

FIG. 15 shows a flowchart illustrating a method 1500 that supports dynamic switching between different multi-TRP schemes in accordance with aspects of the present disclosure. The operations of method 1500 may be implemented by a base station 105 or its components as described herein. For example, the operations of method 1500 may be performed by a multi-TRP manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1505, the base station may generate a first set of bits indicating a set of TCI states for communication with a UE. The operations of 1505 may be performed according to the methods described herein. In some examples, aspects of the operations of 1505 may be performed by a TCI field generator as described with reference to FIGS. 11 through 14.

At 1510, the base station may generate a second set of bits indicating a set of antenna ports and a multi-TRP scheme from a set of possible schemes for multi-TRP operation based on the first set of bits indicating the set of TCI states. The operations of 1510 may be performed according to the methods described herein. In some examples, aspects of the operations of 1510 may be performed by an antenna port(s) field generator as described with reference to FIGS. 11 through 14.

At 1515, the base station may transmit, to the UE, a DCI message including an indication of the first set of bits and the second set of bits. The operations of 1515 may be performed according to the methods described herein. In some examples, aspects of the operations of 1515 may be performed by a DCI transmission component as described with reference to FIGS. 11 through 14.

Figure 16:
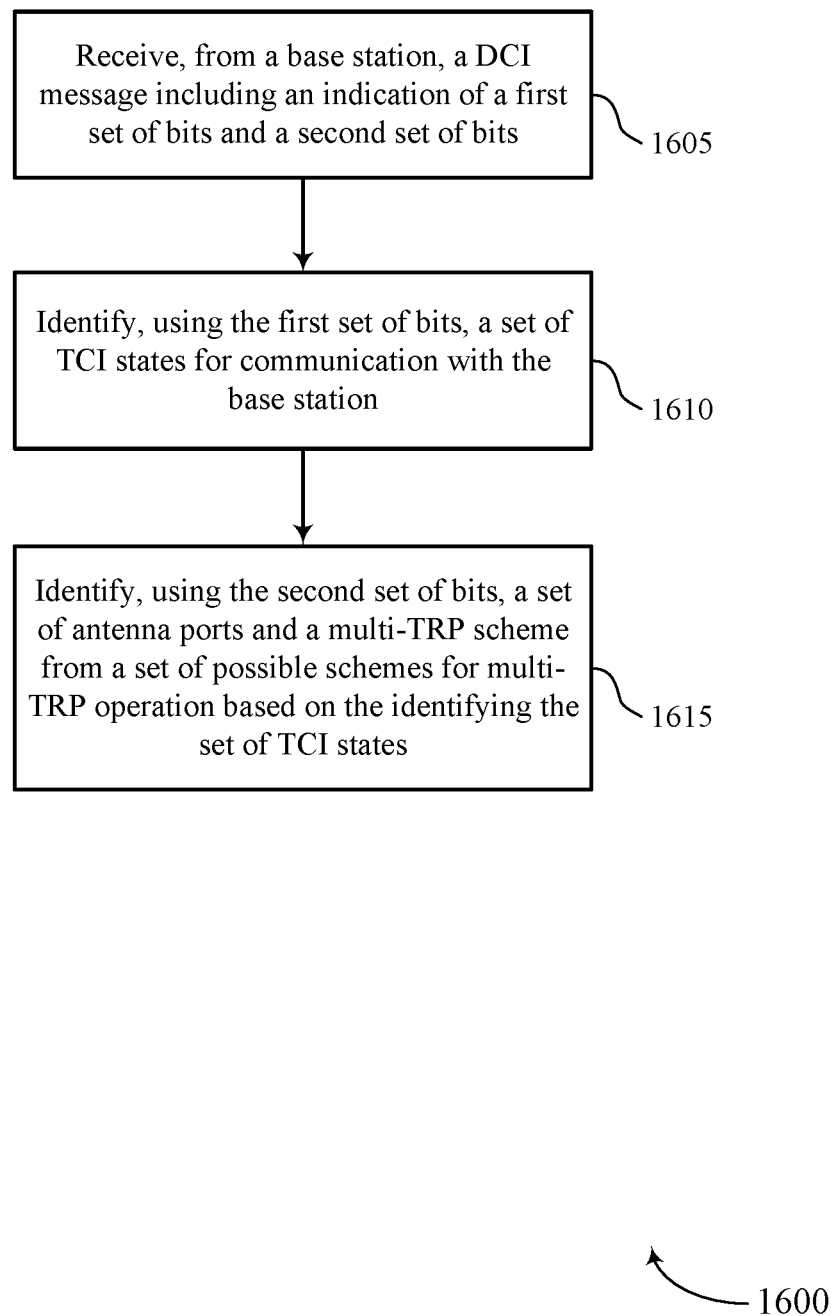

FIG. 16 shows a flowchart illustrating a method 1600 that supports dynamic switching between different multi-TRP schemes in accordance with aspects of the present disclosure. The operations of method 1600 may be implemented by a UE 115 or its components as described herein. For example, the operations of method 1600 may be performed by a multi-TRP manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a DCI message including an indication of a first set of bits and a second set of bits. The operations of 1605 may be performed according to the methods described herein. In some examples, aspects of the operations of 1605 may be performed by a DCI reception component as described with reference to FIGS. 7 through 10.

At 1610, the UE may identify, using the first set of bits, a set of TCI states for communication with the base station. The operations of 1610 may be performed according to the methods described herein. In some examples, aspects of the operations of 1610 may be performed by a TCI field identifier as described with reference to FIGS. 7 through 10.

At 1615, the UE may identify, using the second set of bits, a set of antenna ports and a multi-TRP scheme from a set of possible schemes for multi-TRP operation based on the identifying the set of TCI states. The operations of 1615 may be performed according to the methods described herein. In some examples, aspects of the operations of 1615 may be performed by an antenna port(s) field identifier as described with reference to FIGS. 7 through 10.

Figure 17:
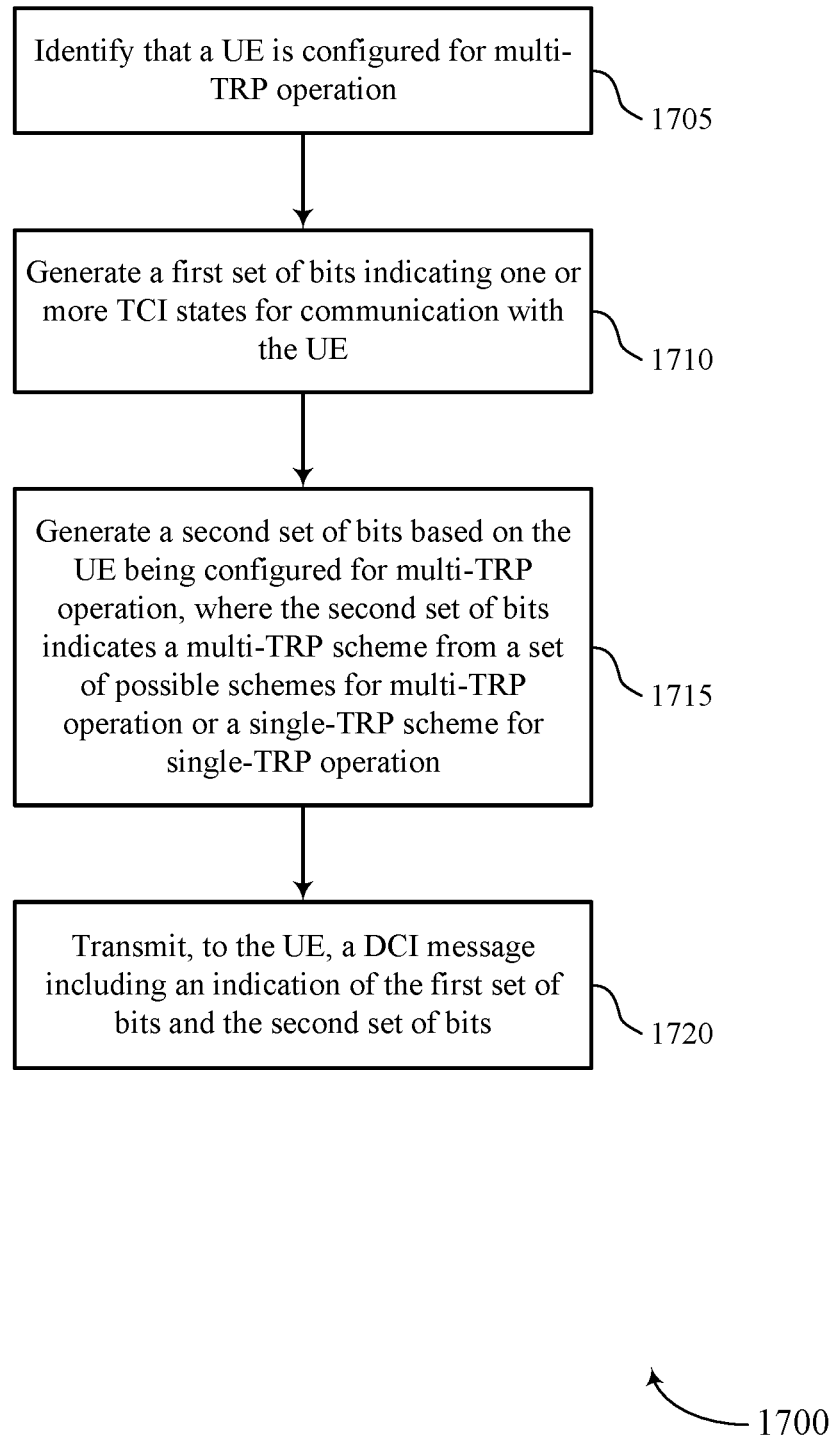

FIG. 17 shows a flowchart illustrating a method 1700 that supports dynamic switching between different multi-TRP schemes in accordance with aspects of the present disclosure. The operations of method 1700 may be implemented by a base station 105 or its components as described herein. For example, the operations of method 1700 may be performed by a multi-TRP manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may identify that a UE is configured for multi-TRP operation. The operations of 1705 may be performed according to the methods described herein. In some examples, aspects of the operations of 1705 may be performed by a UE configuration identifier as described with reference to FIGS. 11 through 14.

At 1710, the base station may generate a first set of bits indicating one or more TCI states for communication with the UE. The operations of 1710 may be performed according to the methods described herein. In some examples, aspects of the operations of 1710 may be performed by a TCI field generator as described with reference to FIGS. 11 through 14.

At 1715, the base station may generate a second set of bits based on the UE being configured for multi-TRP operation, where the second set of bits indicates a multi-TRP scheme from a set of possible schemes for multi-TRP operation or a single-TRP scheme for single-TRP operation. The operations of 1715 may be performed according to the methods described herein. In some examples, aspects of the operations of 1715 may be performed by a multi-TCI scheme field generator as described with reference to FIGS. 11 through 14.

At 1720, the base station may transmit, to the UE, a DCI message including an indication of the first set of bits and the second set of bits. The operations of 1720 may be performed according to the methods described herein. In some examples, aspects of the operations of 1720 may be performed by a DCI transmission component as described with reference to FIGS. 11 through 14.

Figure 18:
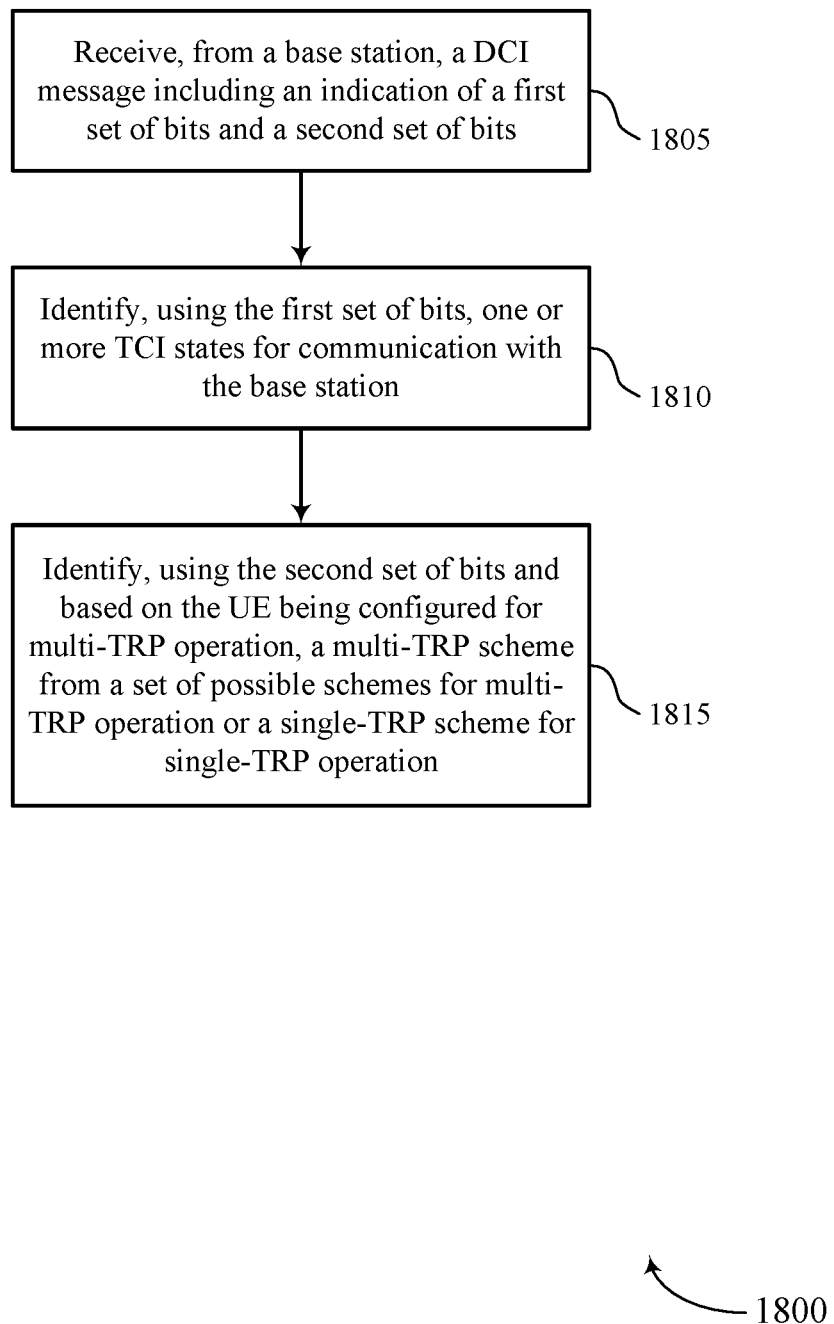

FIG. 18 shows a flowchart illustrating a method 1800 that supports dynamic switching between different multi-TRP schemes in accordance with aspects of the present disclosure. The operations of method 1800 may be implemented by a UE 115 or its components as described herein. For example, the operations of method 1800 may be performed by a multi-TRP manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a DCI message including an indication of a first set of bits and a second set of bits. The operations of 1805 may be performed according to the methods described herein. In some examples, aspects of the operations of 1805 may be performed by a DCI reception component as described with reference to FIGS. 7 through 10.

At 1810, the UE may identify, using the first set of bits, one or more TCI states for communication with the base station. The operations of 1810 may be performed according to the methods described herein. In some examples, aspects of the operations of 1810 may be performed by a TCI field identifier as described with reference to FIGS. 7 through 10.

At 1815, the UE may identify, using the second set of bits and based on the UE being configured for multi-TRP operation, a multi-TRP scheme from a set of possible schemes for multi-TRP operation or a single-TRP scheme for single-TRP operation. The operations of 1815 may be performed according to the methods described herein. In some examples, aspects of the operations of 1815 may be performed by a multi-TCI scheme field identifier as described with reference to FIGS. 7 through 10.

Figure 19:
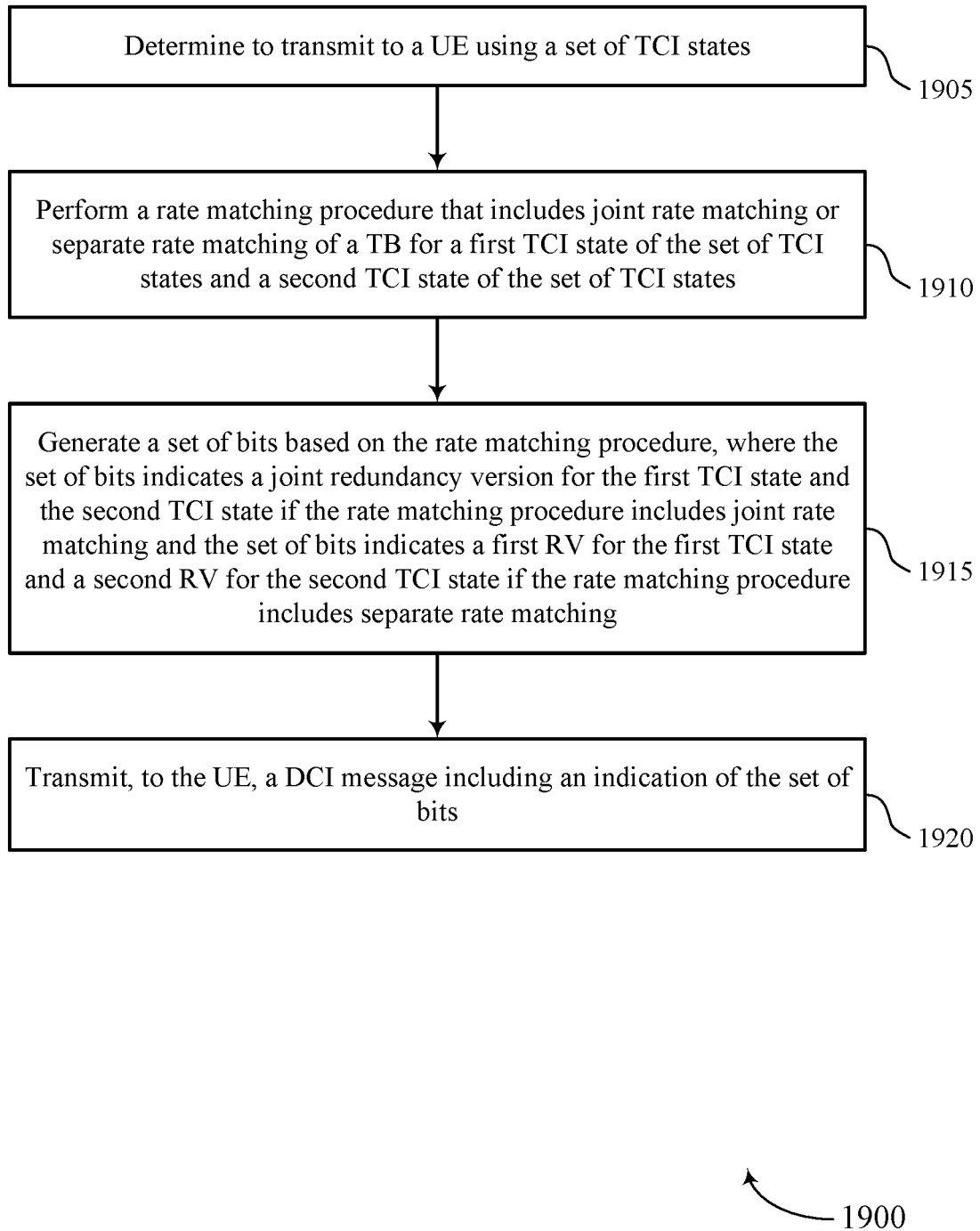

FIG. 19 shows a flowchart illustrating a method 1900 that supports dynamic switching between different multi-TRP schemes in accordance with aspects of the present disclosure. The operations of method 1900 may be implemented by a base station 105 or its components as described herein. For example, the operations of method 1900 may be performed by a multi-TRP manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may determine to transmit to a UE using a set of TCI states. The operations of 1905 may be performed according to the methods described herein. In some examples, aspects of the operations of 1905 may be performed by a TCI state determination component as described with reference to FIGS. 11 through 14.

At 1910, the base station may perform a rate matching procedure that includes joint rate matching or separate rate matching of a TB for a first TCI state of the set of TCI states and a second TCI state of the set of TCI states. The operations of 1910 may be performed according to the methods described herein. In some examples, aspects of the operations of 1910 may be performed by a rate matching component as described with reference to FIGS. 11 through 14.

At 1915, the base station may generate a set of bits based on the rate matching procedure, where the set of bits indicates a joint RV for the first TCI state and the second TCI state if the rate matching procedure includes joint rate matching and the set of bits indicates a first RV for the first TCI state and a second RV for the second TCI state if the rate matching procedure includes separate rate matching. The operations of 1915 may be performed according to the methods described herein. In some examples, aspects of the operations of 1915 may be performed by an RV component as described with reference to FIGS. 11 through 14.

At 1920, the base station may transmit, to the UE, a DCI message including an indication of the set of bits. The operations of 1920 may be performed according to the methods described herein. In some examples, aspects of the operations of 1920 may be performed by a DCI transmission component as described with reference to FIGS. 11 through 14.

Figure 20:
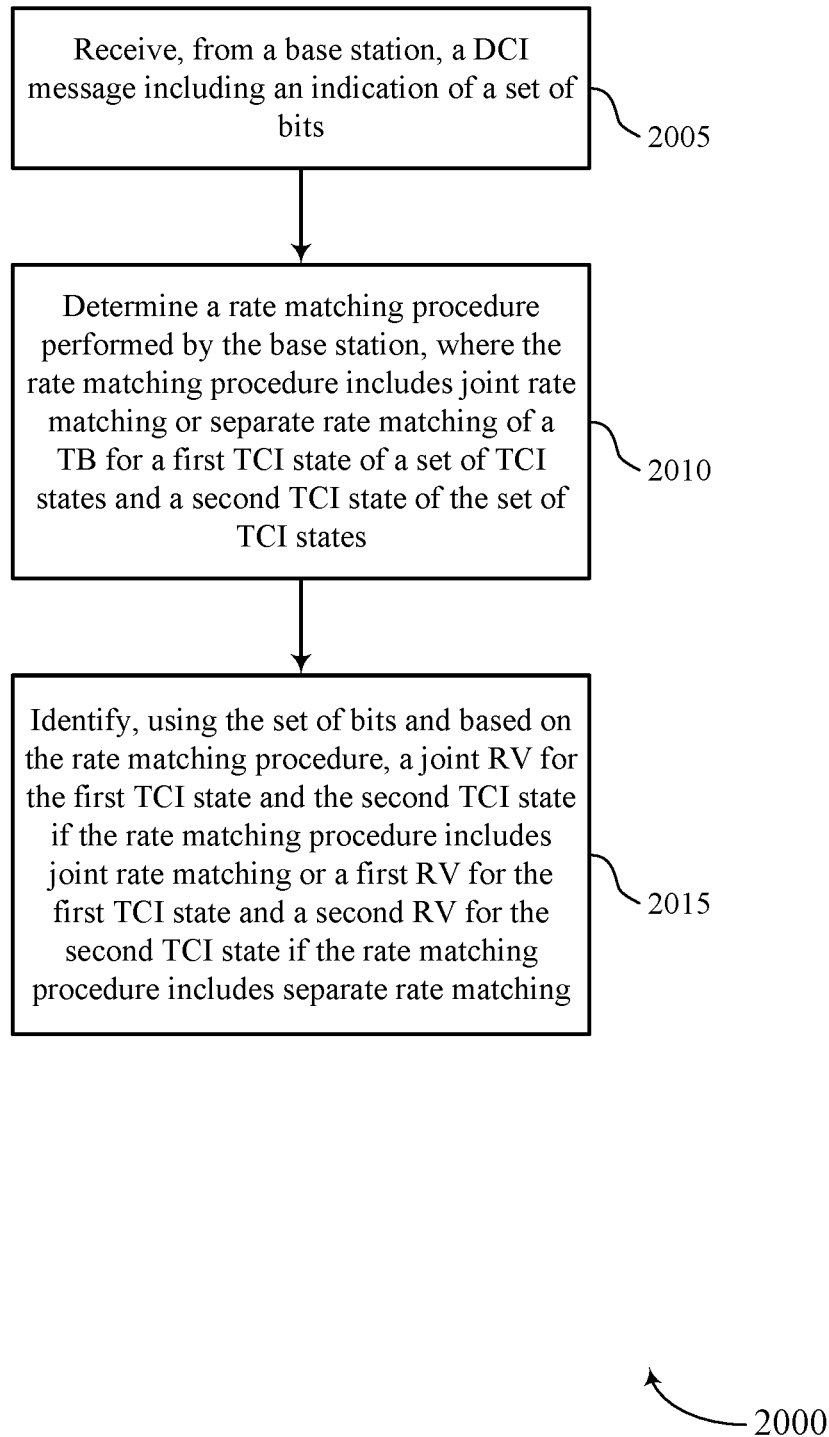

FIG. 20 shows a flowchart illustrating a method 2000 that supports dynamic switching between different multi-TRP schemes in accordance with aspects of the present disclosure. The operations of method 2000 may be implemented by a UE 115 or its components as described herein. For example, the operations of method 2000 may be performed by a multi-TRP manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2005, the UE may receive, from a base station, a DCI message including an indication of a set of bits. The operations of 2005 may be performed according to the methods described herein. In some examples, aspects of the operations of 2005 may be performed by a DCI reception component as described with reference to FIGS. 7 through 10.

At 2010, the UE may determine a rate matching procedure performed by the base station, where the rate matching procedure includes joint rate matching or separate rate matching of a TB for a first TCI state of a set of TCI states and a second TCI state of the set of TCI states. The operations of 2010 may be performed according to the methods described herein. In some examples, aspects of the operations of 2010 may be performed by a rate matching determination component as described with reference to FIGS. 7 through 10.

At 2015, the UE may identify, using the set of bits and based on the rate matching procedure, a joint RV for the first TCI state and the second TCI state if the rate matching procedure includes joint rate matching or a first RV for the first TCI state and a second RV for the second TCI state if the rate matching procedure includes separate rate matching.

The operations of 2015 may be performed according to the methods described herein. In some examples, aspects of the operations of 2015 may be performed by an RV identifier as described with reference to FIGS. 7 through 10.

Figure 21:
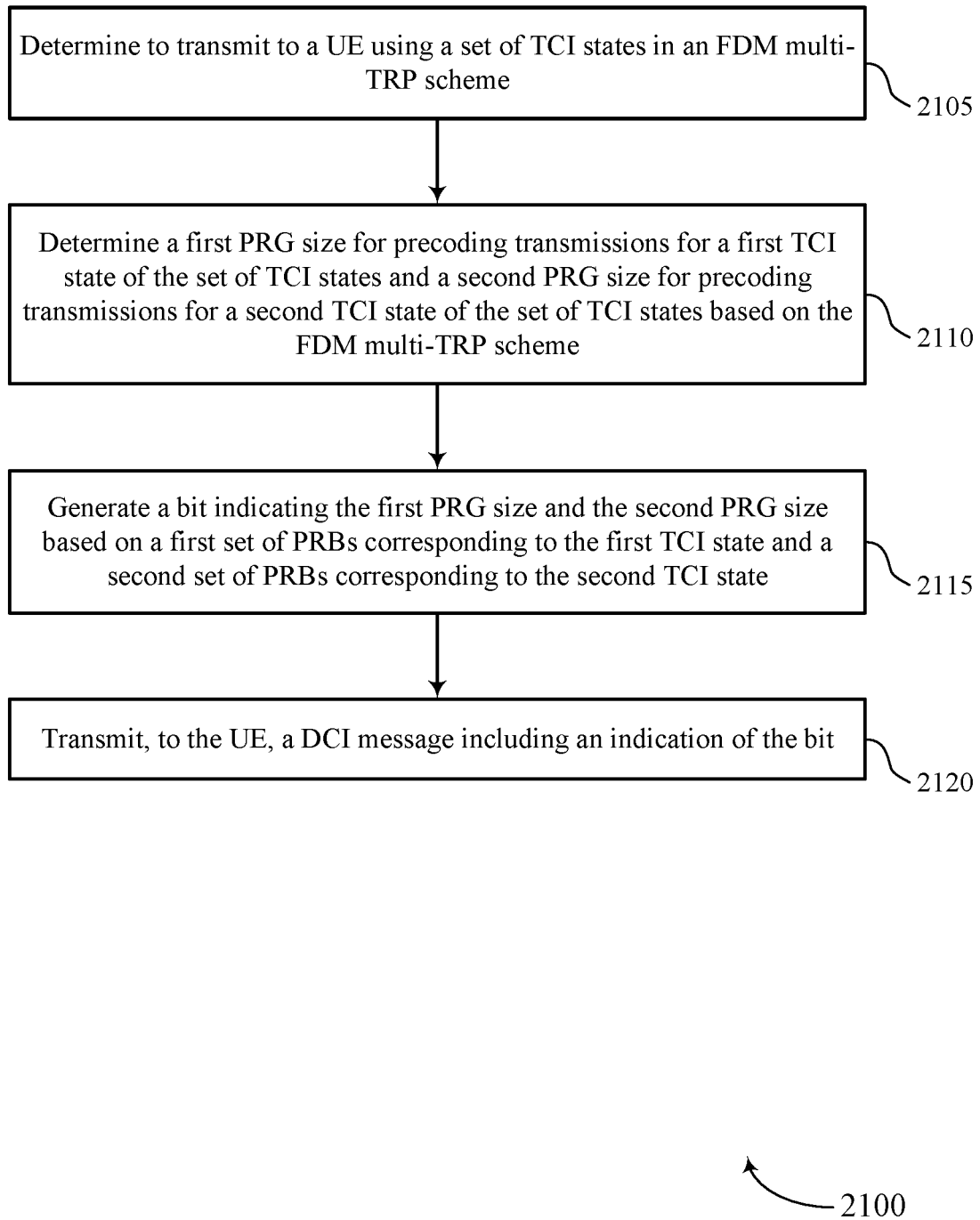

FIG. 21 shows a flowchart illustrating a method 2100 that supports dynamic switching between different multi-TRP schemes in accordance with aspects of the present disclosure. The operations of method 2100 may be implemented by a base station 105 or its components as described herein. For example, the operations of method 2100 may be performed by a multi-TRP manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may determine to transmit to a UE using a set of TCI states in an FDM multi-TRP scheme. The operations of 2105 may be performed according to the methods described herein. In some examples, aspects of the operations of 2105 may be performed by a TCI state determination component as described with reference to FIGS. 11 through 14.

At 2110, the base station may determine a first PRG size for precoding transmissions for a first TCI state of the set of TCI states and a second PRG size for precoding transmissions for a second TCI state of the set of TCI states based on the FDM multi-TRP scheme. The operations of 2110 may be performed according to the methods described herein. In some examples, aspects of the operations of 2110 may be performed by a PRG sizing component as described with reference to FIGS. 11 through 14.

At 2115, the base station may generate a bit indicating the first PRG size and the second PRG size based on a first set of PRB s corresponding to the first TCI state and a second set of PRBs corresponding to the second TCI state. The operations of 2115 may be performed according to the methods described herein. In some examples, aspects of the operations of 2115 may be performed by a PRB bundling size indicator field generator as described with reference to FIGS. 11 through 14.

At 2120, the base station may transmit, to the UE, a DCI message including an indication of the bit. The operations of 2120 may be performed according to the methods described herein. In some examples, aspects of the operations of 2120 may be performed by a DCI transmission component as described with reference to FIGS. 11 through 14.

Figure 22:
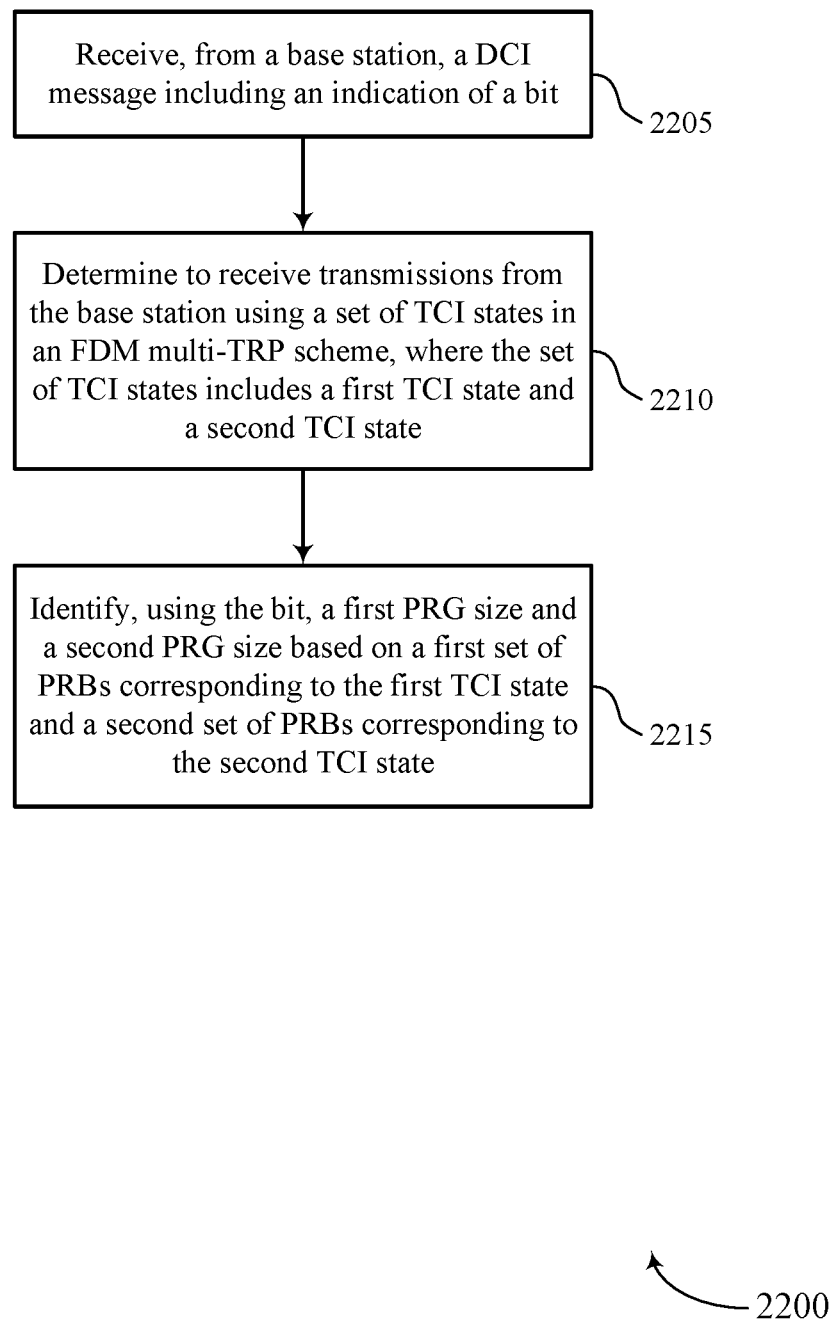

FIG. 22 shows a flowchart illustrating a method 2200 that supports dynamic switching between different multi-TRP schemes in accordance with aspects of the present disclosure. The operations of method 2200 may be implemented by a UE 115 or its components as described herein. For example, the operations of method 2200 may be performed by a multi-TRP manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2205, the UE may receive, from a base station, a DCI message including an indication of a bit. The operations of 2205 may be performed according to the methods described herein. In some examples, aspects of the operations of 2205 may be performed by a DCI reception component as described with reference to FIGS. 7 through 10.

At 2210, the UE may determine to receive transmissions from the base station using a set of TCI states in an FDM multi-TRP scheme, where the set of TCI states includes a first TCI state and a second TCI state. The operations of 2210 may be performed according to the methods described herein. In some examples, aspects of the operations of 2210 may be performed by a TCI state determination component as described with reference to FIGS. 7 through 10.

At 2215, the UE may identify, using the bit, a first PRG size and a second PRG size based on a first set of PRB s corresponding to the first TCI state and a second set of PRB s corresponding to the second TCI state. The operations of 2215 may be performed according to the methods described herein. In some examples, aspects of the operations of 2215 may be performed by a PRB bundling size indicator field identifier as described with reference to FIGS. 7 through 10.

Described below are a number of examples of methods, systems, or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples, and other examples will be readily apparent to those skilled in the art without departing from the scope of the disclosure.

Example 1: A method for wireless communications, comprising: generating a first set of bits indicating a plurality of TCI states for communication with a UE; generating a second set of bits indicating a set of antenna ports and a multi-TRP scheme from a set of possible schemes for multi-TRP operation based at least in part on the first set of bits indicating the plurality of TCI states; and transmitting, to the UE, a DCI message comprising an indication of the first set of bits and the second set of bits.

Example 2: The method of example 1, further comprising: selecting, from a plurality of lookup tables, a lookup table mapping both the set of antenna ports and the multi-TRP scheme to the second set of bits, wherein the generating the second set of bits is based at least in part on the selecting.

Example 3: The method of example 2, further comprising: configuring the lookup table, the plurality of lookup tables, or a combination thereof; and transmitting, to the UE, an indication of the lookup table, the plurality of lookup tables, or a combination thereof.

Example 4: The method of any of examples 1 to 3, wherein the second set of bits further indicates a modulation order for at least one TCI state of the plurality of TCI states.

Example 5: The method of any of examples 1 to 4, wherein the second set of bits further indicates an RV for a TB for at least one TCI state of the plurality of TCI states.

Example 6: The method of any of examples 1 to 5, wherein the multi-TRP scheme comprises a joint SDM scheme, a separate SDM scheme, a joint FDM scheme, a separate FDM scheme, a joint TDM scheme, a separate TDM scheme, or a combination thereof.

Example 7: The method of any of examples 1 to 6, wherein the second set of bits comprises a same number of bits as a set of bits indicating a set of antenna ports for single TRP operation.

Example 8: The method of any of examples 1 to 7, wherein a lookup table mapping both the set of antenna ports and the multi-TRP scheme to the second set of bits is pre-configured in memory.

Example 9: The method of any of examples 1 to 8, wherein the multi-TRP operation comprises communication with the UE by a plurality of TRPs at a base station or a plurality of TRPs distributed across a plurality of base stations.

Example 10: An apparatus comprising at least one means for performing a method of any of examples 1 to 9.

Example 11: An apparatus for wireless communications comprising a processor; memory coupled with the processor; and instructions stored in the memory and executable by the processor to cause the apparatus to perform a method of any of examples 1 to 9.

Example 12: A non-transitory computer-readable medium storing code for wireless communications, the code comprising instructions executable by a processor to perform a method of any of examples 1 to 9.

Example 13: A method for wireless communications at a UE, comprising: receiving, from a base station, a DCI message comprising an indication of a first set of bits and a second set of bits; identifying, using the first set of bits, a plurality of TCI states for communication with the base station; and identifying, using the second set of bits, a set of antenna ports and a multi-TRP scheme from a set of possible schemes for multi-TRP operation based at least in part on the identifying the plurality of TCI states.

Example 14: The method of example 13, further comprising: selecting, from a plurality of lookup tables, a lookup table mapping the second set of bits to both the set of antenna ports and the multi-TRP scheme, wherein the identifying the set of antenna ports and the multi-TRP scheme is based at least in part on the selecting.

Example 15: The method of example 14, further comprising: receiving, from the base station, a configuration of the lookup table, the plurality of lookup tables, or a combination thereof.

Example 16: The method of any of examples 13 to 15, further comprising: identifying, using the second set of bits, a modulation order for at least one TCI state of the plurality of TCI states.

Example 17: The method of any of examples 13 to 16, further comprising: identifying, using the second set of bits, an RV for a TB for at least one TCI state of the plurality of TCI states.

Example 18: The method of any of examples 13 to 17, wherein the multi-TRP scheme comprises a joint SDM scheme, a separate SDM scheme, a joint FDM scheme, a separate FDM scheme, a joint TDM scheme, a separate TDM scheme, or a combination thereof.

Example 19: The method of any of examples 13 to 18, wherein the second set of bits comprises a same number of bits as a set of bits indicating a set of antenna ports for single TRP operation.

Example 20: The method of any of examples 13 to 19, wherein a lookup table mapping the second set of bits to both the set of antenna ports and the multi-TRP scheme is pre-configured in memory.

Example 21: The method of any of examples 13 to 20, wherein the multi-TRP operation comprises communication with a plurality of TRPs at the base station or a plurality of TRPs distributed across a plurality of base stations comprising at least the base station.

Example 22: The method of any of examples 13 to 21, further comprising: receiving a plurality of messages from a plurality of TRPs based at least in part on identifying the multi-TRP scheme.

Example 23: An apparatus at a UE comprising at least one means for performing a method of any of examples 13 to 22.

Example 24: An apparatus for wireless communications at a UE comprising a processor; memory coupled with the processor; and instructions stored in the memory and executable by the processor to cause the apparatus to perform a method of any of examples 13 to 22.

Example 25: A non-transitory computer-readable medium storing code at a UE for wireless communications, the code comprising instructions executable by a processor to perform a method of any of examples 13 to 22.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   generating a first set of bits indicating a plurality of transmission configuration indicator states for communication with a user equipment (UE);
   generating a second set of bits indicating a set of antenna ports and a multi-transmission/reception point scheme from a set of possible schemes for multi-transmission/reception point operation based at least in part on the first set of bits indicating the plurality of transmission configuration indicator states;

generating a third set of bits indicating a set of possible precoding resource block group sizes based at least in part on the multi-transmission/reception point scheme and the plurality of transmission configuration indicator states; and transmitting a downlink control information message comprising an indication of the first set of bits, the second set of bits, and the third set of bits.

2. The method of claim 1, further comprising:
selecting, from a plurality of lookup tables, a lookup table mapping both the set of antenna ports and the multi-transmission/reception point scheme to the second set of bits, wherein the generating the second set of bits is based at least in part on the selecting.

3. The method of claim 2, further comprising:
configuring the lookup table, the plurality of lookup tables, or a combination thereof; and
transmitting an indication of the lookup table, the plurality of lookup tables, or a combination thereof.

4. The method of claim 1, wherein the second set of bits further indicates a modulation order for at least one transmission configuration indicator state of the plurality of transmission configuration indicator states.

5. The method of claim 1, wherein the second set of bits further indicates a redundancy version for a transport block for at least one transmission configuration indicator state of the plurality of transmission configuration indicator states.

6. The method of claim 1, wherein the multi-transmission/reception point scheme comprises a joint spatial division multiplexing scheme associated with a single spatial division multiplexing scheme across the plurality of transmission configuration indicator states, a separate spatial division multiplexing scheme associated with separate spatial division multiplexing schemes by each transmission configuration indicator state of the plurality of transmission configuration indicator states, a joint frequency division multiplexing scheme associated with a single frequency division multiplexing scheme across the plurality of transmission configuration indicator states, a separate frequency division multiplexing scheme associated with separate frequency division multiplexing schemes by each transmission configuration indicator state of the plurality of transmission configuration indicator states, a joint time division multiplexing scheme associated with a single time division multiplexing scheme across the plurality of transmission configuration indicator states, a separate time division multiplexing scheme associated with separate time division multiplexing schemes by each transmission configuration indicator state of the plurality of transmission configuration indicator states, or a combination thereof.

7. The method of claim 1, wherein the second set of bits comprises a same quantity of bits as a set of bits indicating a set of antenna ports for single transmission/reception point operation.

8. The method of claim 1, wherein a lookup table mapping both the set of antenna ports and the multi-transmission/reception point scheme to the second set of bits is pre-configured in memory.

9. The method of claim 1, wherein the multi-transmission/reception point operation comprises communication with the UE by a plurality of transmission/reception points at a base station or distributed across a plurality of base stations.

10. A method for wireless communications at a user equipment (UE), comprising:
receiving a downlink control information message comprising an indication of a first set of bits, a second set of bits, and a third set of bits;

identifying, using the first set of bits, a plurality of transmission configuration indicator states for communication;

identifying, using the second set of bits, a set of antenna ports and a multi-transmission/reception point scheme from a set of possible schemes for multi-transmission/reception point operation based at least in part on the identifying the plurality of transmission configuration indicator states; and identifying, using the third set of bits, a precoding resource block group size from a set of possible precoding resource block group sizes based at least in part on identifying the multi-transmission/reception point scheme and the plurality of transmission configuration indicator states.

11. The method of claim 10, further comprising:
selecting, from a plurality of lookup tables, a lookup table mapping the second set of bits to both the set of antenna ports and the multi-transmission/reception point scheme, wherein the identifying the set of antenna ports and the multi-transmission/reception point scheme is based at least in part on the selecting.

12. The method of claim 11, further comprising:
receiving a configuration of the lookup table, the plurality of lookup tables, or a combination thereof.

13. The method of claim 10, further comprising:
identifying, using the second set of bits, a modulation order for at least one transmission configuration indicator state of the plurality of transmission configuration indicator states.

14. The method of claim 10, further comprising:
identifying, using the second set of bits, a redundancy version for a transport block for at least one transmission configuration indicator state of the plurality of transmission configuration indicator states.

15. The method of claim 10, wherein the multi-transmission/reception point scheme comprises a joint spatial division multiplexing scheme associated with a single spatial division multiplexing scheme across the plurality of transmission configuration indicator states, a separate spatial division multiplexing scheme associated with separate spatial division multiplexing schemes by each transmission configuration indicator state of the plurality of transmission configuration indicator states, a joint frequency division multiplexing scheme associated with a single frequency division multiplexing scheme across the plurality of transmission configuration indicator states, a separate frequency division multiplexing scheme associated with separate frequency division multiplexing schemes by each transmission configuration indicator state of the plurality of transmission configuration indicator states, a joint time division multiplexing scheme associated with a single time division multiplexing scheme across the plurality of transmission configuration indicator states, a separate time division multiplexing scheme associated with separate time division multiplexing schemes by each transmission configuration indicator state of the plurality of transmission configuration indicator states, or a combination thereof.

16. The method of claim 10, wherein the second set of bits comprises a same quantity of bits as a set of bits indicating a set of antenna ports for single transmission/reception point operation.

17. The method of claim 10, wherein a lookup table mapping the second set of bits to both the set of antenna ports and the multi-transmission/reception point scheme is pre-configured in memory.

18. The method of claim 10, wherein the multi-transmission/reception point operation comprises communication with a plurality of transmission/reception points at a base station or distributed across a plurality of base stations comprising at least the base station.

19. The method of claim 18, further comprising:
receiving a plurality of messages from the plurality of transmission/reception points based at least in part on identifying the multi-transmission/reception point scheme.

20. An apparatus for wireless communications, comprising:
a processor;
memory coupled with the processor; and
instructions stored in the memory and executable by the processor to cause the apparatus to:
generate a first set of bits indicating a plurality of transmission configuration indicator states for communication with a user equipment (UE);
generate a second set of bits indicating a set of antenna ports and a multi-transmission/reception point scheme from a set of possible schemes for multi-transmission/reception point operation based at least in part on the first set of bits indicating the plurality of transmission configuration indicator states;
generate a third set of bits indicating a set of possible precoding resource block group sizes based at least in part on the multi-transmission/reception point scheme; and
transmit a downlink control information message comprising an indication of the first set of bits, the second set of bits, and the third set of bits.

21. The apparatus of claim 20, wherein the instructions are further executable by the processor to cause the apparatus to:
select, from a plurality of lookup tables, a lookup table mapping both the set of antenna ports and the multi-transmission/reception point scheme to the second set of bits, wherein the generating the second set of bits is based at least in part on the selecting.

22. The apparatus of claim 21, wherein the instructions are further executable by the processor to cause the apparatus to:
configure the lookup table, the plurality of lookup tables, or a combination thereof; and
transmit an indication of the lookup table, the plurality of lookup tables, or a combination thereof.

23. The apparatus of claim 20, wherein the second set of bits further indicates a modulation order for at least one transmission configuration indicator state of the plurality of transmission configuration indicator states.

24. The apparatus of claim 20, wherein the second set of bits further indicates a redundancy version for a transport block for at least one transmission configuration indicator state of the plurality of transmission configuration indicator states.

25. The apparatus of claim 20, wherein the multi-transmission/reception point scheme comprises a joint spatial division multiplexing scheme associated with a single spatial division multiplexing scheme across the plurality of transmission configuration indicator states, a separate spatial division multiplexing scheme associated with separate spatial division multiplexing schemes by each transmission configuration indicator state of the plurality of transmission configuration indicator states, a joint frequency division multiplexing scheme associated with a single frequency division multiplexing scheme across the plurality of transmission configuration indicator states, a separate frequency division multiplexing scheme associated with separate frequency division multiplexing schemes by each transmission configuration indicator state of the plurality of transmission configuration indicator states, a joint time division multiplexing scheme associated with a single time division multiplexing scheme across the plurality of transmission configuration indicator states, a separate time division multiplexing scheme associated with separate time division multiplexing schemes by each transmission configuration indicator state of the plurality of transmission configuration indicator states, or a combination thereof.

26. The apparatus of claim 20, wherein the second set of bits comprises a same quantity of bits as a set of bits indicating a set of antenna ports for single transmission/reception point operation.

27. The apparatus of claim 20, wherein a lookup table mapping both the set of antenna ports and the multi-transmission/reception point scheme to the second set of bits is pre-configured in memory.

28. The apparatus of claim 20, wherein the multi-transmission/reception point operation comprises communication with the UE by a plurality of transmission/reception points at a base station or distributed across a plurality of base stations.

29. An apparatus for wireless communications at a user equipment (UE), comprising:
a processor;
memory coupled with the processor; and
instructions stored in the memory and executable by the processor to cause the apparatus to:
receive a downlink control information message comprising an indication of a first set of bits, a second set of bits, and a third set of bits;
identify, using the first set of bits, a plurality of transmission configuration indicator states for communication;
identify, using the second set of bits, a set of antenna ports and a multi-transmission/reception point scheme from a set of possible schemes for multi-transmission/reception point operation based at least in part on the identifying the plurality of transmission configuration indicator states; and
identify, using the third set of bits, a precoding resource block group size from a set of possible precoding resource block group sizes based at least in part on identifying the multi-transmission/reception point scheme and the plurality of transmission configuration indicator states.

30. The apparatus of claim 29, wherein the instructions are further executable by the processor to cause the apparatus to:
select, from a plurality of lookup tables, a lookup table mapping the second set of bits to both the set of antenna ports and the multi-transmission/reception point scheme, wherein the identifying the set of antenna ports and the multi-transmission/reception point scheme is based at least in part on the selecting.

31. The apparatus of claim 30, wherein the instructions are further executable by the processor to cause the apparatus to:
receive a configuration of the lookup table, the plurality of lookup tables, or a combination thereof.

32. The apparatus of claim 29, wherein the instructions are further executable by the processor to cause the apparatus to:

identify, using the second set of bits, a modulation order for at least one transmission configuration indicator state of the plurality of transmission configuration indicator states.

33. The apparatus of claim 29, wherein the instructions are further executable by the processor to cause the apparatus to:
identify, using the second set of bits, a redundancy version for a transport block for at least one transmission configuration indicator state of the plurality of transmission configuration indicator states.

34. The apparatus of claim 29, wherein the multi-transmission/reception point scheme comprises a joint spatial division multiplexing scheme associated with a single spatial division multiplexing scheme across the plurality of transmission configuration indicator states, a separate spatial division multiplexing scheme associated with separate spatial division multiplexing schemes by each transmission configuration indicator state of the plurality of transmission configuration indicator states, a joint frequency division multiplexing scheme associated with a single frequency division multiplexing scheme across the plurality of transmission configuration indicator states, a separate frequency division multiplexing scheme associated with separate frequency division multiplexing schemes by each transmission configuration indicator state of the plurality of transmission configuration indicator states, a joint time division multiplexing scheme associated with a single time division multiplexing scheme across the plurality of transmission configuration indicator states, a separate time division multiplexing scheme associated with separate time division multiplexing schemes by each transmission configuration indicator state of the plurality of transmission configuration indicator states, or a combination thereof.

35. The apparatus of claim 29, wherein the second set of bits comprises a same quantity of bits as a set of bits indicating a set of antenna ports for single transmission/reception point operation.

36. The apparatus of claim 29, wherein a lookup table mapping the second set of bits to both the set of antenna ports and the multi-transmission/reception point scheme is pre-configured in memory.

37. The apparatus of claim 29, wherein the multi-transmission/reception point operation comprises communication with a plurality of transmission/reception points at a base station or distributed across a plurality of base stations comprising at least the base station.

38. The apparatus of claim 37, wherein the instructions are further executable by the processor to cause the apparatus to:
receive a plurality of messages from the plurality of transmission/reception points based at least in part on identifying the multi-transmission/reception point scheme.

* * * * *